(12) United States Patent
Duluk, Jr. et al.

(10) Patent No.: US 12,449,473 B2
(45) Date of Patent: Oct. 21, 2025

(54) VIRTUALIZING HARDWARE PROCESSING RESOURCES IN A PROCESSOR

(71) Applicant: NVIDIA Corporation, Santa Clara, CA (US)

(72) Inventors: Jerome F. Duluk, Jr., Palo Alto, CA (US); Gentaro Hirota, San Jose, CA (US); Ronny Krashinsky, Portola Valley, CA (US); Greg Palmer, Cedar Park, TX (US); Jeff Tuckey, Saratoga, CA (US); Kaushik Nadadhur, Bangalore (IN); Philip Browning Johnson, San Jose, CA (US); Praveen Joginipally, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 658 days.

(21) Appl. No.: 17/691,759

(22) Filed: Mar. 10, 2022

(65) Prior Publication Data
US 2023/0288471 A1 Sep. 14, 2023

(51) Int. Cl.
*G01R 31/28* (2006.01)
*G06F 9/46* (2006.01)
*G06F 9/48* (2006.01)
*G06F 9/50* (2006.01)
*G06F 11/07* (2006.01)

(52) U.S. Cl.
CPC ..... *G01R 31/2884* (2013.01); *G01R 31/2839* (2013.01); *G01R 31/2889* (2013.01); *G01R 31/2896* (2013.01); *G06F 9/46* (2013.01); *G06F 9/48* (2013.01); *G06F 9/50* (2013.01); *G06F 11/07* (2013.01)

(58) Field of Classification Search
CPC ............ G01R 31/2884; G01R 31/2896; G01R 31/2851; G06F 9/50
See application file for complete search history.

(56) References Cited

U.S. PATENT DOCUMENTS

| 11,281,195 | B2 * | 3/2022 | Daxer | G05B 19/41875 |
|---|---|---|---|---|
| 2015/0149713 | A1 * | 5/2015 | Woodmansee | G06F 11/16 |
| | | | | 711/120 |
| 2015/0200020 | A1 * | 7/2015 | Jothikumar | G11C 17/18 |
| | | | | 365/96 |
| 2019/0044518 | A1 * | 2/2019 | Subbareddy | G06F 30/30 |
| 2020/0294180 | A1 * | 9/2020 | Koker | G06T 1/20 |
| 2021/0280266 | A1 * | 9/2021 | Parikh | G06F 12/1009 |

OTHER PUBLICATIONS

Mukesh Agrawal, A Distributed, Reconfigurable, and Reusable BIST Infrastructure for Test and Diagnosis of 3-D-Stacked ICs; Feb. 2, 2016, IEEE; (Year: 2016).*

* cited by examiner

*Primary Examiner* — Dong U Kim
(74) *Attorney, Agent, or Firm* — Nixon & Vanderhye P.C.

(57) ABSTRACT

Processing hardware of a processor is virtualized to provide a façade between a consistent programming interface and specific hardware instances. Hardware processor components can be permanently or temporarily disabled when not needed to support the consistent programming interface and/or to balance hardware processing across a hardware arrangement such as an integrated circuit. Executing software can be migrated from one hardware arrangement to another without need to reset the hardware.

12 Claims, 42 Drawing Sheets

Prior Art GPU Hardware Partitions

Prior Art GPU Hardware With
Graphics Processing Clusters

Prior Art μGPU Partitions

Prior Art Hierarchy
Mapping Onto GPU Hardware Partitions

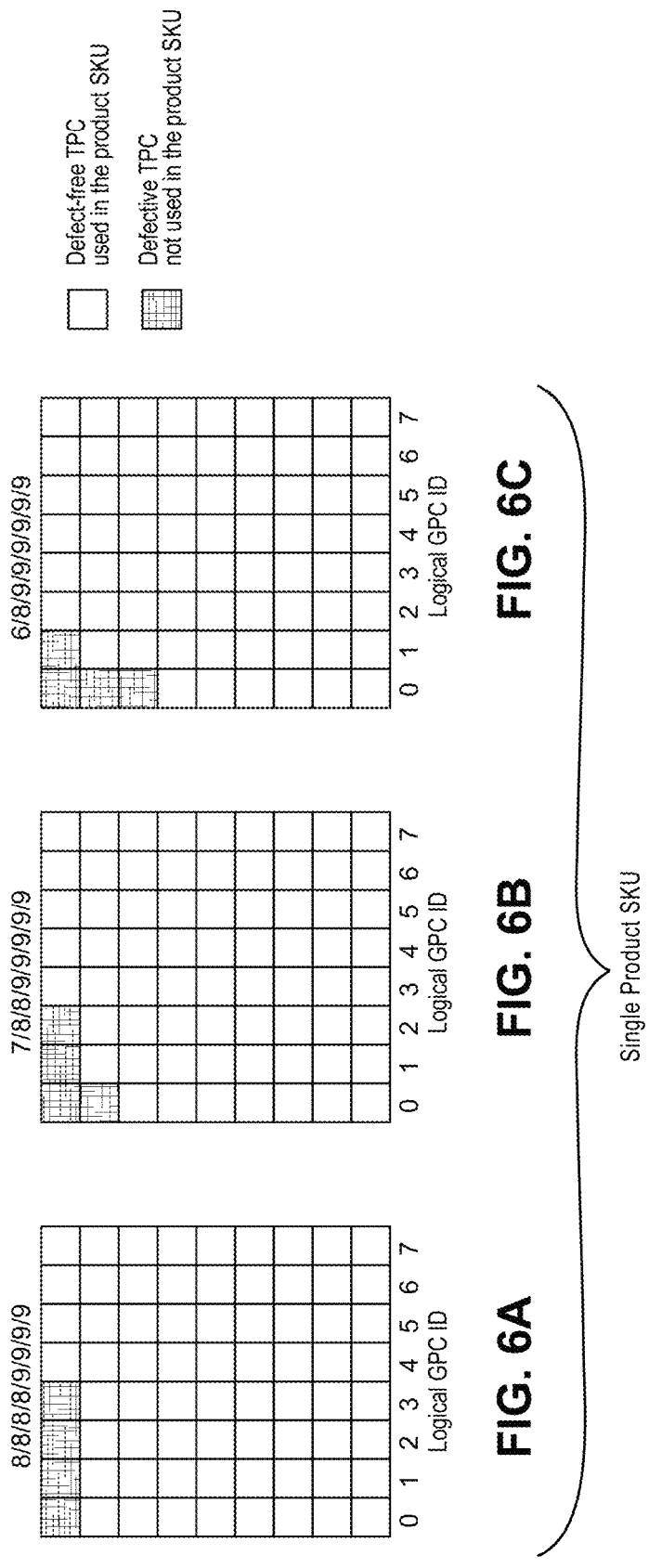

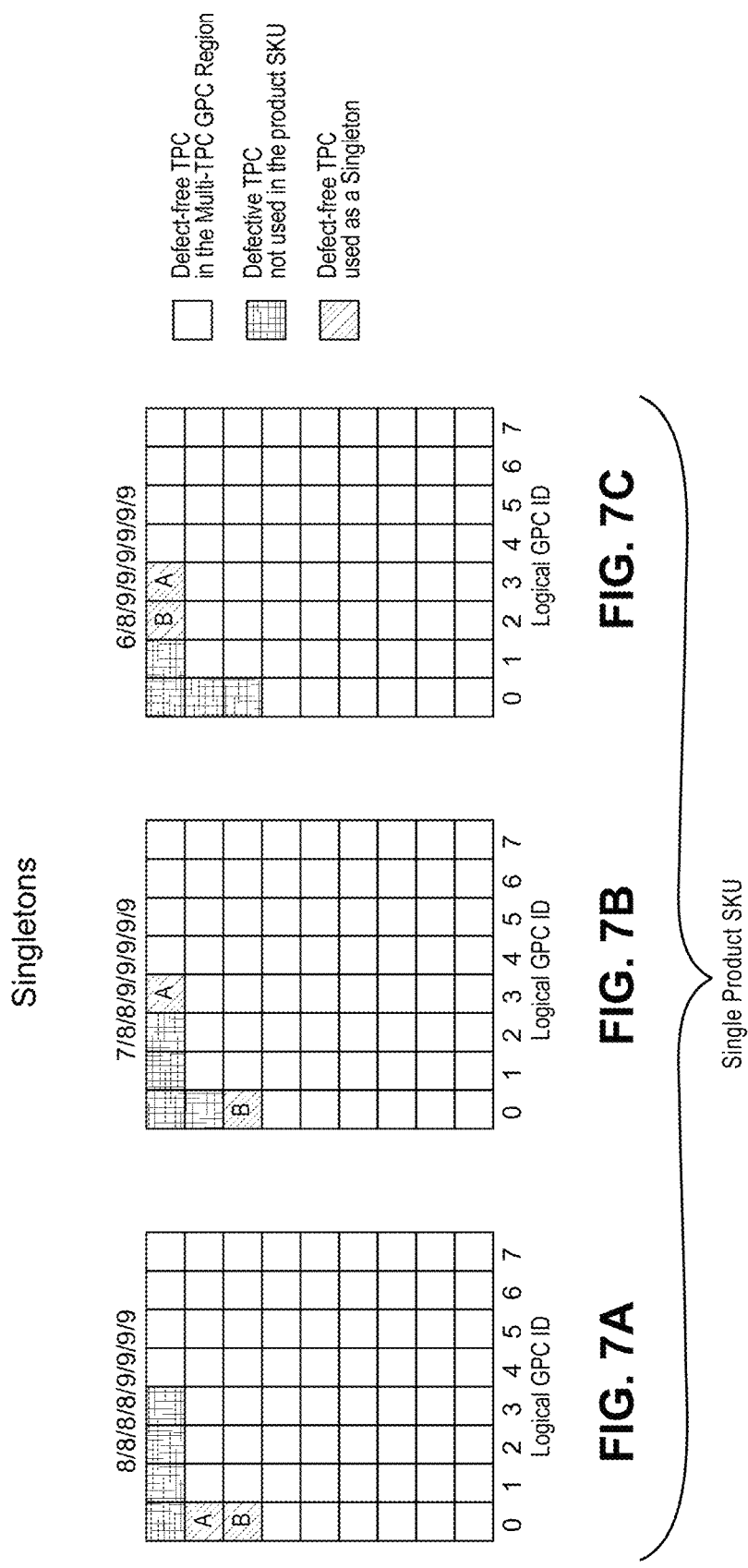

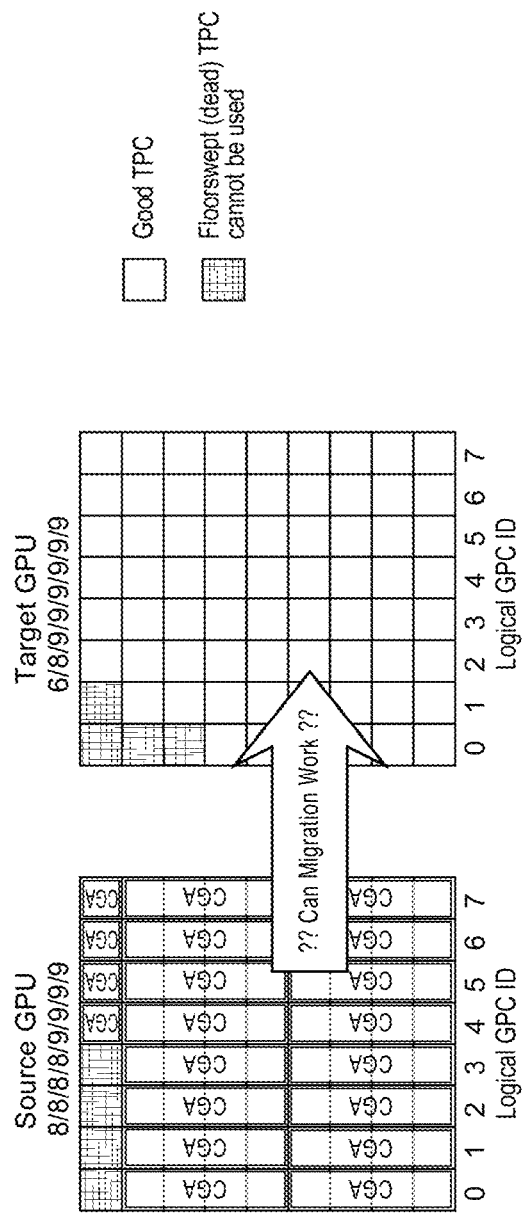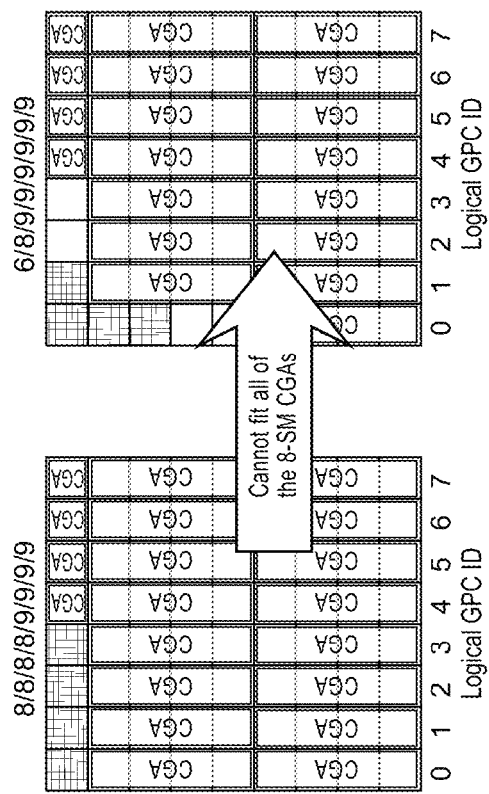
FIG. 10A (Prior Art)
FIG. 10B (Prior Art)

FIG. 12

| | | | | | | |
|---|---|---|---|---|---|---|
| 9/9/9/9/9/9/9/1x0 | 6/8/8/8/9/9/9/1x2 | 6/7/8/8/9/9/9/1x3 | 5/8/8/8/9/9/9/1x3 | 5/8/8/8/8/9/9/1x2 | 6/6/8/8/8/9/9/1x4 | 5/6/8/8/8/9/9/1x5 |
| 6/8/8/8/8/8/8/1x2 | 6/6/8/8/8/8/8/1x4 | 5/8/8/8/8/8/8/1x3 | 5/5/8/8/8/8/8/1x6 | 6/6/7/7/8/8/8/1x6 | 6/7/7/7/7/8/8/1x4 | 6/6/7/7/7/8/8/1x5 |
| 5/7/7/7/7/7/7/1x5 | 5/5/8/8/8/8/8/1x4 | 5/5/7/7/8/8/8/1x7 | 6/6/6/7/7/8/8/1x3 | 6/7/7/7/7/8/8/1x4 | 5/7/7/7/7/8/8/1x5 | 5/5/8/8/8/8/8/1x2 |
| 5/5/7/7/7/7/7/1x6 | 6/6/6/7/7/8/8/1x5 | 6/7/7/7/7/8/8/1x2 | 6/7/7/7/7/8/8/1x3 | 5/7/7/7/7/8/8/1x3 | 6/6/6/7/7/8/8/1x10 | 6/6/7/7/7/7/8/1x12 |
| 5/7/7/7/7/7/7/1x2 | 5/5/7/7/7/8/8/1x4 | 0/6/8/8/8/8/8/1x8 | 0/6/7/7/7/8/8/1x11 | 0/5/7/7/8/8/8/1x9 | 0/5/7/7/7/8/8/1x12 | 0/6/6/7/7/8/8/1x11 |
| 0/5/6/8/8/8/8/1x11 | 0/5/7/7/7/8/8/1x13 | 0/6/8/8/8/8/8/1x6 | 0/6/7/7/7/8/8/1x10 | 0/5/7/7/7/8/8/1x7 | 0/5/7/7/7/8/8/1x11 | 0/6/6/7/7/7/7/1x10 |
| 0/5/5/8/8/8/8/1x10 | 0/5/5/7/7/8/8/1x13 | 0/6/6/6/7/7/8/1x12 | 0/5/5/6/7/7/7/1x14 | 0/6/8/8/8/8/8/1x4 | 0/5/6/7/7/7/7/1x9 | 0/5/7/7/7/7/7/1x8 |
| 0/6/8/8/8/8/8/1x6 | 0/6/6/6/7/8/8/1x10 | 0/5/5/8/8/8/8/1x8 | 0/5/5/7/7/7/7/1x12 | 0/6/6/6/7/8/8/1x11 | 0/6/7/7/7/7/7/1x13 | 0/6/7/7/7/7/7/1x8 |
| 0/5/8/8/8/8/8/1x3 | 0/5/7/7/7/7/8/1x9 | 0/6/6/8/8/8/8/1x4 | 0/6/6/6/7/7/7/1x9 | 0/5/5/8/8/8/8/1x6 | 0/6/6/6/7/7/7/1x11 | 0/5/5/6/7/7/7/1x14 |

FIG. 13

| | |
|---|---|
| 6/8/8/8/9/9/9/1x2 | 3 Configurations |
| 6/6/8/8/8/9/9/1x4 | 6 Configurations |
| 5/6/8/8/8/9/9/1x5 | 8 Configurations |
| 6/6/7/7/8/8/9/1x6 | 12 Configurations |
| 6/6/7/7/8/8/0/1x12 | 24 Configurations |
| 6/6/6/7/7/8/0/1x12 | 32 Configurations |
| 5/5/5/6/7/7/0/1x14 | 63 Configurations |

VIRTUALIZING HARDWARE PROCESSING RESOURCES IN A PROCESSOR

CROSS-REFERENCE TO RELATED APPLICATIONS

This application is related to the following commonly-assigned copending US patent applications, the entire contents of each of which are incorporated by reference:
- U.S. application Ser. No. 17/691,276 filed Mar. 10, 2022, titled "Method And Apparatus For Efficient Access To Multidimensional Data Structures And/Or Other Large Data Blocks";
- U.S. application Ser. No. 17/691,621 filed Mar. 10, 2022, titled "Cooperative Group Arrays";
- U.S. application Ser. No. 17/691,690 filed Mar. 10, 2022, titled "Distributed Shared Memory";
- U.S. application Ser. No. 17/691,288 filed Mar. 10, 2022, titled "Programmatically Controlled Data Multicasting Across Multiple Compute Engines";
- U.S. application Ser. No. 17/691,296 filed Mar. 10, 2022, titled "Hardware Accelerated Synchronization With Asynchronous Transaction Support";
- U.S. application Ser. No. 17/691,303 filed Mar. 10, 2022, titled "Fast Data Synchronization In Processors And Memory";
- U.S. application Ser. No. 17/691,406 filed Mar. 10, 2022, titled "Efficient Matrix Multiply and Add with a Group of Warps";
- U.S. application Ser. No. 17/691,872 filed Mar. 10, 2022, titled "Techniques for Scalable Load Balancing of Thread Groups in a Processor";
- U.S. application Ser. No. 17/691,808 filed Mar. 10, 2022, titled "Flexible Migration of Executing Software Between Processing Components Without Need For Hardware Reset"; and
- U.S. application Ser. No. 17/691,422 filed Mar. 10, 2022, titled "Method And Apparatus For Efficient Access To Multidimensional Data Structures And/Or Other Large Data Blocks".

FIELD

The technology herein relates to integrated circuit design, and more particularly to solving problems relating to manufacturing defects in complex chips including but not limited to graphics processing units (GPUs). The technology further relates to defining virtual GPU processing clusters that are abstractions of logical or physical circuits to provide compatibility between differently structured chips; flexible migration between GPU processing clusters and processing components thereof; taking into account balance of floor-swept/disabled/nonfunctional versus fully functional hardware across an integrated circuit substrate; and dynamic processing resource disablement that allows hardware to be selectively turned off when not needed.

BACKGROUND & SUMMARY

An overall GPU integrated circuit or chip design objective is to deliver maximal performance and maximal chip manufacturing yield. Bigger chips have more circuits, thereby achieving higher performance. But bigger chips tend to have lower yields due to higher probability of manufacturing defects, because the number of manufacturing defects on a chip is roughly proportional to chip area.

Because of high tolerances required in manufacturing complex chips such as GPU chips, it is not uncommon for some circuit or operation of a particular manufactured chip to be defective. Sometimes, the defect is so fundamental to the chip's operation that the chip needs to be scrapped. However, since modern GPU chips are designed to be massively parallel, in many cases defects affect only one or some of the parallel functional blocks, leaving the other parallel function blocks fully operational.

One technique for increasing semiconductor manufacturing yield is known as "floorsweeping". To overcome the reduced yield on larger chips, it is possible to turn off, disable or make inaccessible defective circuitry, making a fully functional chip, but with less total functional circuitry when compared to a defect-free chip. "Floorsweeping" is thus a process or technique by which manufacturing defects or other errors present in integrated circuits can be disabled and/or bypassed or otherwise made inaccessible (e.g., such as by blowing fuses to open internal wiring) such that the integrated circuit maintains some or all of its designed functionality. Each chip may further include an on-chip programmable floorsweeping circuit that is able to implement floorsweeping on the chip in response to commands applied externally by a chip testing/programming device. Such floorsweeping can enable an integrated circuit, such as a GPU or CPU, to maintain consistent operation despite one or more manufacturing defects. See e.g., US20150149713A1. Occasionally, for the sake of consistency across multiple chips, floorsweeping is also used to permanently disable unneeded fully functional portions of an over-capable chip e.g., to reduce power consumption and heat generation. This was sometimes done in the prior art so that all chips in a given stock-keeping unit ("SKU") product designator had the same number of accessible/operational TPCs.

FIG. 1 shows an example GPU chip die manufactured on a semiconductor wafer or substrate. The chip die includes literally billions of circuits that work together to deliver high performance computing and 3D graphics. From FIG. 1, one can get an idea of how tremendously complex the chip design is. For example, this particular chip shown includes 8 graphics processing clusters (GPCs) with 8 TPCs per GPC (TPC=Texture Processing Cluster), 2 SMs per TPC (SM=Streaming Multiprocessor), 16 SMs per GPC, 128 SMs per full GPU, 64 FP32 CUDA Cores per SM, 8192 FP32 CUDA Cores per full GPU, 4 Tensor Cores per SM, 512 Tensor Cores per full GPU, 6 HBM2 stacks, and twelve 512-bit memory controllers—comprising over 28 billion transistors on a die size of 628.4 mm². In this particular chip, two SMs together comprise a Texture Processor Cluster, or TPC. Eight of these TPCs (and therefore sixteen of the SMs) comprise a higher level block called a GPU Processing Cluster ("GPC"), and eight of these GPCs make up the full GPU. There are also eight Multi-Instance GPU, or MIG, slices that can independently be used as virtual inference engines and virtual GPUs for desktop infrastructure. See e.g., https://docs.nvidia.com/pdf/Ampere_Tuning_Guide.pdf; https://developer.nvidia.com/blog/nvidia-ampere-architecture-in-depth/; NVIDIA A100 Tensor Core GPU Architecture V1.0 (NVIDIA 2020); and FIG. 29.

Manufacturing defects are statistically likely to occur on a die of this complexity. If any chip discovered to have any defect were discarded, then most chips would be discarded and yield would be very low. For example, a GPU design with 72 physical parallel processing blocks called Texture Processing Clusters or "TPCs" will have a very low yield if the shipped product SKU for the part requires all 72 TPCs to be functional. However, just like a "baker's dozen" is more than 12 just in case some of the baked items are underweight, suppose the product SKU for the chip assumes 4 TPCs are defective. Then, chips with 68 or more working TPCs can be included in the product SKU. This means chips with 72, 71, 70, 69, or 68 good TPCs can be sold as a 68-TPC GPU under the product SKU.

Some chip manufacturers routinely have multiple product SKUs from one chip design, where the product SKUs have differing numbers of functional circuit blocks. For example, in many cases each GPU chip family has multiple physically different chip designs, differentiated mostly by number of GPCs and TPCs. For each chip design, the manufacturer may do a tradeoff between yield (more floor sweeping means higher yield) and performance (more floor sweeping means lower performance). Often, especially for big chips, a manufacturer may have multiple SKUs for a given chip design, where they have substantially different floorsweeping, so that performance differences are not subtle. Thus, there are important scenarios in which all chips designated with a particular product SKU are required to have a consistent capability profile.

In particular, as described above, the chip shown in FIG. 1 is organized to have a certain number of GPCs, each of which has a certain number of TPCs, each of which has a certain number of SM processor core arrangements. For example, suppose the FIG. 1 physical chip layout were designed to have 8 GPCs, where each GPC were to have 9 TPCs. Then, with 4 TPCs turned off e.g., due to being defective, the product SKU could have 4 GPCs with 8 TPCs each and 4 GPCs with 9 TPCs each. An example nomenclature for this "Configuration" is 8/8/8/8/9/9/9/9. In this nomenclature, GPCs are sorted from fewest to most TPCs. After sorting, the GPCs are numbered as Logical GPCs from 0 to 7. In particular, TPCs may have a Physical TPC ID (e.g., a continuous numbering of the physical TPCs as laid out on the GPC substrate) as well as a Logical TPC ID (e.g., a continuous numbering assigned to the TPCs within a GPC after determining the above configuration). The Logical TPC ID numbering may follow a uniform pattern, for example it may start at 0 for the first operational TPC in every GPC.

For chips to be included in the product SKU, it would not matter which GPCs have 8 TPCs, because in example GPU designs the boot-up time Logical GPC numbering process can order the physical GPCs from fewest to most TPCs, by assigning Logical GPC IDs. Thus, even though different physical TPCs may have failed in different chips, these differences can be hidden using the logical TPC ID and/or Logical GPC ID to provide consistency across a product SKU by: (a) standardizing the SKU to use less than the maximum number of physical TPCs, (b) testing and binning the parts so parts with too many failed TPCs will not be included in the SKU, and (c) dynamically assigning Logical GPC IDs at power-up/reboot. Such consistency is useful for example when GPU usage in High-Performance Computing (HPC) and cloud computing requires migration of Contexts from one GPU to another GPU, since migration typically requires matching profiles between the GPUs in the same product SKU. See above-identified U.S. application Ser. No. 17/691,808 filed Mar. 10, 2022, titled "Flexible Migration of Executing Software Between Processing Components Without Need For Hardware Reset".

FIGS. 2A, 2B, 2C graphically show three different configurations of a GPU designed and fabricated to have 8 logical GPCs (labelled 0-7), each GPC having 9 TPCs. In this diagram, each cell in each configuration represents a TPC. The x axis is labelled with "logical" GPC IDs as discussed above, and the blocks in the vertical columns above each Logical GPC ID reflect the number of TPCs in each GPC. The diagram also shows that some of those TPCs are no good. In particular, the blocks shown in dark cross-hatch are "dead" and cannot be used for processing.

By way of example, each of the three GPU configurations shown in FIGS. 2A, 2B, 2C have 68 fully functional TPCs with 4 failed TPCs shown in cross-hatch. There could be a rule that says that any chip with more than 4 failed TPCs cannot be included in a particular product SKU. Then, the difference between the three example configurations shown is how the failed TPCs are distributed across the chip's GPCs. In the left-hand configuration, GPCs 0, 1, 2 and 3 each have one single failed TPC (8/8/8/8/9/9/9/9)—that is, the failed TPCs are distributed so no GPC has more than one failed TPC. However, since manufacturing defects occur essentially randomly, many other distributions are likely. For example, in the righthand configuration, GPC0 has three failed TPCs and GPC1 has a single failed TPC (6/8/9/9/9/9/9/9). In the center configuration, GPC0 has two failed TPCs, and GPC1 and GPC2 each have one failed TPC (7/8/8/9/9/9/9/9). It would also be possible to have two failed TPCs in each of two GPCs, and to have four failed TPCs all in the same GPC. Note that because these diagrams reflect logical GPC ID, they are presorted so the failed TPCs all appear on the left sides of the diagrams, but that if we looked at physical GPC ID the failed TPCs could be anywhere on the chip.

A goal is to make these three different chips appear to "be the same" to software and human programmers even though they are quite different inside. One criteria for such an arrangement is to look at the number of failed TPCs within each GPC. A rule could be made that to be acceptable for a particular product SKU, a GPC can have no more than one failed TPC. Under this profile matching strategy, a chip with the Configuration of 7/8/8/9/9/9/9/9 (FIG. 2B) could not be included in the product SKU with 8/8/8/8/9/9/9/9 (FIG. 2A), even though the total number of functional TPCs match, because the TPC per GPC profile does not match. That is, the Logical GPCs do not match one-to-one in their TPC counts. In particular, the product SKU with 8/8/8/8/9/9/9/9 would require each GPC to have at least 8 functional TPCs, so a chip with the Configuration of 7/8/8/9/9/9/9/9 would not comply with that requirement.

But disallowing 7/8/8/9/9/9/9/9 chips from being included in the product SKU may substantially reduce usable yield. Discarding a 7/8/8/9/9/9/9/9 chip with 68 fully functional TPCs just because the four non-functional TPCs happen to be distributed differently is potentially quite wasteful. This problem gets worse as more hardware units are defective—for example, FIG. 2C shows a 6/8/9/9/9/9/9/9 configuration of a CPU chip again having 68 fully functional TPCs but this time with one of its GPC having only 6 fully functional TPCs. Or consider examples such as 5/9/9/9/9/9/9/9 which once again has 68 fully functional TPCs but where all four failed TPCs are in the same GPC.

Of course, it is possible to create several different product SKUs and "bin" the chips into those different SKUs depending on how many TPCs per GPC have failed. This is like buying apples or tomatoes from the "seconds" bin at the farmer's market—the customer might pay less for less capable chips. But proliferation of product SKUs is often not a solution to the problem because it causes customer confusion and logistical complications, and also because applications being written for modern GPUs are more demanding than ever in terms of requiring certain minimum degrees of parallelism and performance in a variety of contexts. In particular, while there may be a limited market for less capable GPU chips, many applications now require the ability to migrate executing software from one chip to another in a datacenter. Better solutions are therefore needed.

Example Hardware Background

By way of further information, FIGS. 3 and 4 illustrate that modern GPUs may provide a variety of different hardware partitions and hierarchies. In these examples, SMs within a GPU may themselves be grouped into larger functional units. For example, Graphics Processing Clusters (GPCs) of a GPU may comprise plural Texture Processing Clusters (TPCs) (each of which may include one or a plurality of SMs) and an additional array of SMs (e.g., for compute capabilities) along with other supporting hardware such as ray tracing units for real time ray tracing acceleration.

FIG. 3 shows GPU hardware partitioned into a plurality of GPU processing clusters ("GPCs") each comprising a plurality of texture processing clusters ("TPCs") each comprising one or a plurality (e.g., two) streaming multiprocessors (SMs), each of which in turn may comprise a plurality of processing cores. A GPC may also include an additional population of SMs that are not assigned to TPCs. FIG. 4 is a block diagram showing how an array 230 of GPCs 208 are supported by an I/O unit 205, a host interface 206, a front end 212, a task/work unit 207 that may include a compute work distributor (CWD), a crossbar 210, and memory interface partition units 215 and associated on-chip memory 220. FIG. 4 further shows that an overall system may include any number of such multi-GPC processing units 202 and associated memories 204 that are coupled to a host CPU via a memory bridge 105.

Each SM in turn may be partitioned into plural independent processing blocks, each with one or several different kinds of cores (e.g., FP32, INT32, Tensor, etc.), a warp scheduler, a dispatch unit, and a local register file as reflected in FIG. 5. The FIG. 5 example architectural diagram of a modern SM includes advanced compute hardware capabilities comprising many parallel math cores such as multiple tensor cores in addition to texture processing units. For example, as of this writing, the 2017 NVIDIA Volta GV100 SM is partitioned into four processing blocks, each with 16 FP32 Cores, 8 FP64 Cores, 16 INT32 Cores, two mixed-precision Tensor Cores for deep learning matrix arithmetic, an L0 instruction cache, one warp scheduler, one dispatch unit, and a 64 KB Register File—and future GPU designs are likely to continue this trend. Such increased compute parallelism enables dramatic decreases in compute processing time. As discussed above, each TPC may include one or a plurality of SMs. For example, in one embodiment, each TPC includes a pair of SMs, but other embodiments can have different arrangements.

FIGS. 5A and 5B show how some GPU implementations (e.g., NVIDIA Ampere) may enable plural partitions that operate as "micro GPUs" such as μGPU0 and μGPU1, where each micro GPU includes a portion of the processing resources of the overall GPU. When the GPU is partitioned into two or more separate smaller μGPUs for access by different clients, resources—including the physical memory devices 165 such as local L2 cache memories—are also typically partitioned. For example, in one design, a first half of the physical memory devices 165 coupled to μGPU0 may correspond to a first set of memory partition locations and a second half of the physical memory devices 165 coupled to μGPU1 may correspond to a second set of memory partition locations. Performance resources within the GPU are also partitioned according to the two or more separate smaller processor partitions. The resources may include level two cache (L2) resources 170 and processing resources 160.

In addition, there is a Multi-Instance GPU ("MIG") feature (which is not the same as "micro GPUs") that allows the GPU to be securely partitioned into many separate GPU Instances for CUDA™ ("Compute Unified Device Architecture") applications, providing multiple users with separate GPU resources to accelerate their respective applications. MIG for example divides the GPU into N partition on GPC boundaries, typically 8, 4, 2, or 1 GPC per partition. For Cloud Service Providers (CSPs), who have multi-tenant use cases, MIG ensures one client cannot impact the work or scheduling of other clients, in addition to providing enhanced isolation for customers. With MIG, each instance's processors have separate and isolated paths through the entire memory system—the on-chip crossbar ports, L2 cache banks, memory controllers, and DRAM address busses are all assigned uniquely to an individual instance. This ensures that an individual user's workload can run with predictable throughput and latency, with the same L2 cache allocation and DRAM bandwidth, even if other tasks are thrashing their own caches or saturating their DRAM interfaces. MIG can partition available GPU compute resources (including streaming multiprocessors or SMs, and GPU engines such as copy engines or decoders), to provide a defined quality of service (QoS) with fault isolation for different clients such as VMs, containers or processes. MIG thus enables multiple GPU Instances to run in parallel on a single, physical GPU. See e.g., https://youtu.be/lw_YwPpMpSQ; https://www.nvidia.com/en-us/technologies/multi-instance-gpu/; and https://docs.nvidia.com/datacenter/tesla/mig-user-guide/; and FIG. 29.

FIG. 5C shows that multithreaded software is organized as cooperative thread groups or CTAs that are able to run concurrently on different hardware partitions. For example, each CTA may run on a different SM, with all threads of a CTA running concurrently on the same SM. However, in prior designs, different CTAs a programmer wishes to launch at the same time may end up running on different SMs at different times. Similarly, the MIG feature described above enables different programs of the same or different users to run simultaneously on the same GPU hardware on a non-interfering basis.

For more information on such prior GPU hardware architectures and arrangements, see for example U.S. Pat. Nos. 8,112,614; 7,506,134; 7,836,118; 7,788,468; U.S. Ser. No. 10/909,033; US20140122809; Lindholm et al, "NVIDIA Tesla: A Unified Graphics and Computing Architecture," IEEE Micro (2008); https://docs.nvidia.com/cuda/parallel-thread-execution/index.html (retrieved 2021); Choquette et al, "Volta: Performance and Programmability", IEEE Micro (Volume: 38, Issue: 2, March/April 2018), DOI: 10.1109/MM.2018.022071134.

Migration Challenges

Enterprises are increasingly turning to cloud-based solutions. For example, cloud-based solutions offer the flexibility and simplified management required by businesses supporting the new normal of work from anywhere. With cloud adoption of NVIDIA GPUs and software, the possibilities are unlimited. Modern workloads, including artificial intelligence (AI), High-Performance Computing (HPC), data science, and graphics workstations can be supported from the cloud with the performance of a physical system.

High-Performance Compute (HPC) cloud installations often make use of virtualization of the computational resources. In a virtualized environment that's powered by NVIDIA virtual GPUs, the NVIDIA virtual GPU (vGPU) software is installed at a virtualization layer along with a hypervisor. This software creates virtual GPUs that let every virtual machine (VM) share the physical GPU installed on the server. For more demanding workflows, a single VM can harness the power of multiple physical GPUs. For example, an installation can include many nodes, where each node may include several CPUs and several GPUs. Each node can support multiple Virtual Machines (VMs), where each VM runs its own instance of an Operating System (OS). Such GPU Sharing relies on VDI software to provide a layer of abstraction that lets the client application behave as though it has its own physical, dedicated GPU, while the server's GPU (and driver) can think it's responding to one master host. A VDI hypervisor running on the server intercepts API calls and translates commands, drawing contexts, and process-specific address spaces, before passing along to the graphics driver. Software can include a graphics or compute driver for every VM. Since work that was typically done by the CPU in prior cloud-based solutions is now offloaded to the GPU, the user has a much better experience. See e.g., Herrera, "Nvidia Grid: Graphics Accelerated VDI With The Visual Performance Of A Workstation (NVIDIA May 2014); US20150067672; US20150009222; and L. Shi et al, "vCUDA: GPU-Accelerated High-Performance Computing in Virtual Machines," IEEE Transactions on Computers, vol. 61, no. 6, pp. 804-816, June 2012, doi: 10.1109/TC.2011.112.

HPC installations should be able to migrate a VM from one part of the installation to another. For example, when a node is taken down for maintenance, all the VMs on that node are migrated to different nodes. As another example, an entire rack can be powered down, but only after all active VMs have been migrated to different racks. At the time of migration, the programs running on migrating VMs are preempted off the CPU(s) and GPU(s), memory images and context save buffers are moved to different places in the HPC installation, where the VMs can begin running again.

On a more fundamental level, some forms of migration involve taking all of the work running on one GPU chip and moving it to another GPU chip. This type of migration typically requires a uniform profile of TPCs per GPC across the source and target GPU chips. But in the cloud, there could potentially be hundreds or even thousands of GPU chips that could constitute the target GPU chip. This is why, in some embodiments, uniformity of the TPC per GPC profile is desired across a GPU product SKU. That way, uniformity will exist across any GPU chips with the same SKUs.

Before, in order to allow migration of VMs between GPUs, the profile of TPCs per GPC was required to be consistent across all chips in a product SKU. For example, if a chip layout has 8 GPCs, where each GPC has 9 TPCs, then, with 4 TPCs turned off due to being defective, the product SKU could have 4 GPCs with 8 TPCs each and 4 GPCs with 9 TPCs each. Our nomenclature for this "Configuration" is 8/8/8/8/9/9/9/9. Note that in this nomenclature, GPCs are sorted from fewest to most TPCs. After sorting, the GPCs are numbered as Logical GPCs from 0 to 7. For chips to be included in the product SKU, it does not matter which GPCs have 8 TPCs, because a boot-up time Logical GPC numbering process can order the physical GPCs from fewest to most TPCs, by assigning Logical GPC IDs. However, in previous designs, a chip with the Configuration of 7/8/8/9/9/9/9/9 could not be included in the product SKU with 8/8/8/8/9/9/9/9, even though the total number of TPCs match, because the TPC per GPC profile did not match. That is, the Logical GPCs did not match one-to-one in their TPC counts. Identical TPC per GPC profiles made migration possible because preempted programs on a GPC at the migration source had one-to-one TPC correspondence to GPCs at the migration destination. So, in the past, GPUs in the same product SKU were required to have identical TPC per GPC profiles. In the past, to include both 7/8/8/9/9/9/9/9 and 8/8/8/8/9/9/9/9 chips (both with 68 total TPCs), it was necessary to downgrade both chips to the "worst" common TPC per GPC profile, namely 7/8/8/8/9/9/9/9 (with 67 total TPCs). This problem gets even worse as more hardware units are turned off due to being defective.

Using the MIG feature referenced above, GPU Instances were required to allow migration, just as full GPUs had the requirement for migration. For example, a 2-GPC GPU Instance with the Configuration 7/9 needs to migrate to/from a 2-GPC GPU Instance with the Configuration 8/8. This is another example of migration, except it is applied to GPU Instances rather than full GPUs.

For MIG, an additional complication arises when dividing the GPU into GPU Instances. For example, when an 6/7/8/9/9/9/9/9 GPU (66 TPCS total) is divided into four 2-GPC GPU Instances with 16 TPCs each, the number of in-use TPCs decreases from 66 TPCs to 64 TPCs. In prior designs, changing the number of in-use TPCs meant doing a full reset. If the GPU is not running anything at the time (e.g., no VMs exist on the GPU Instances), then a full reset might be possible, but when there are multiple GPUs in a node, then the entire node probably needs to be reset. This is potentially a big problem that must be solved. Furthermore, if the GPU has been divided into two 4-GPC GPU Instances, and 2nd of these two GPU Instances is no longer in use, then the 2nd GPU Instance can be further divided into two 2-GPC GPU Instances. However, if the total number of in-use TPCs needs to change, there is a problem, because a full reset would destroy the work running on the 1st of the two 4-GPC GPU Instances.

There is an additional problem for MIG: sometimes repacking the GPU Instances is needed. Essentially, this is migration within one GPU. For example, if a GPU is divided into four 2-GPC GPU Instances, numbered 0 (using GPCs 0 and 1), 1 (using GPCs 2 and 3), 2 (using GPCs 4 and 5), and 3 (using GPCs 6 and 7), for use by four VMs. Then VMs using GPU Instances 1 and 3 are shut down, leaving 0 and 2 still running. Then, the system administrator wants to create a 4-GPC GPU Instance, which should be possible, since 4 GPCs are unused. Thus, further improvements are needed.

BRIEF DESCRIPTION OF THE DRAWINGS

FIGS. 6A, 6B & 6C show an example collection of multiple chip configurations into a common product SKU.
FIGS. 7A, 7B & 7C show occurrence of "Singletons" in the FIGS. 6A, 6B & 6C configurations.

FIGS. 10A & 10B show example failed migration in the prior art.

FIG. 12 shows example GPU configurations.

FIG. 13 shows how multiple GPU configurations can be collected into the same product SKUs.

FIG. 21C-1 is a flowchart of an example launch command generation by the FIG. 21A CPU.

FIG. 21C-2 is a flowchart of an example launch process the compute work distributor performs.

DETAILED DESCRIPTION OF NON-LIMITING EMBODIMENTS

It is desirable to include all chips with at least the same number of TPCs in a given product SKU irrespective of how the defective TPCs are distributed across the individual chips. Example non-limiting embodiments of the present technology allow differing TPC per GPC profiles to be included in the same product SKU to provide specific technical and compatibility objectives such as migration of software between chips, thereby increasing yield. The present technology provides improvements to chip circuitry and functionality to provide these and other advantages.

The present specification describes product SKUs choices (GPU chips can be structured or configured differently inside on the circuit/physical silicon level and yet present to programmers and applications as being "the same"); flexible TPC migration (so the work in a TPC can be migrated across GPCs); flexible GPC migration (allowing migration between GPUs with different numbers of GPCs); Cooperative Group Arrays (CGAs); Skylines; Virtual GPCs (vGPCs) with virtual GPC IDs; Product SKU Configurations (more configurations can now be included in the same SKU); Permutations (in addition to Configurations) that provide a measure of the balance of floorswept/disabled/nonfunctional versus fully functional hardware across a GPU chip; Permutation-Culling Floorsweeping Rules to reduce imbalance between plural µGPUs; and Dynamic TPC Disablement which provides migration compatibility between GPU instances with different number of TPCs and making larger GPC MIG instances, and also allows hardware to be selectively turned off when not needed in order to reduce power consumption and heat generation.

Some technical advances include:
- Chips with differing TPC per GPC profiles can be included in the same Product SKU yet appear the same to the programmer using CGAs
- new Virtual GPCs (vGPCs)
- The programmer sees a number of GPCs (i.e., vGPCs) that are different than the number of physical GPCs.
- Example embodiments differentiate between TPCs that are in a Multi-TPC CGA Region (i.e., capable of running software that requires multiple TPCs) and TPCs that are used as Singletons.

New Design Requirements For CGAs

Figure 5:
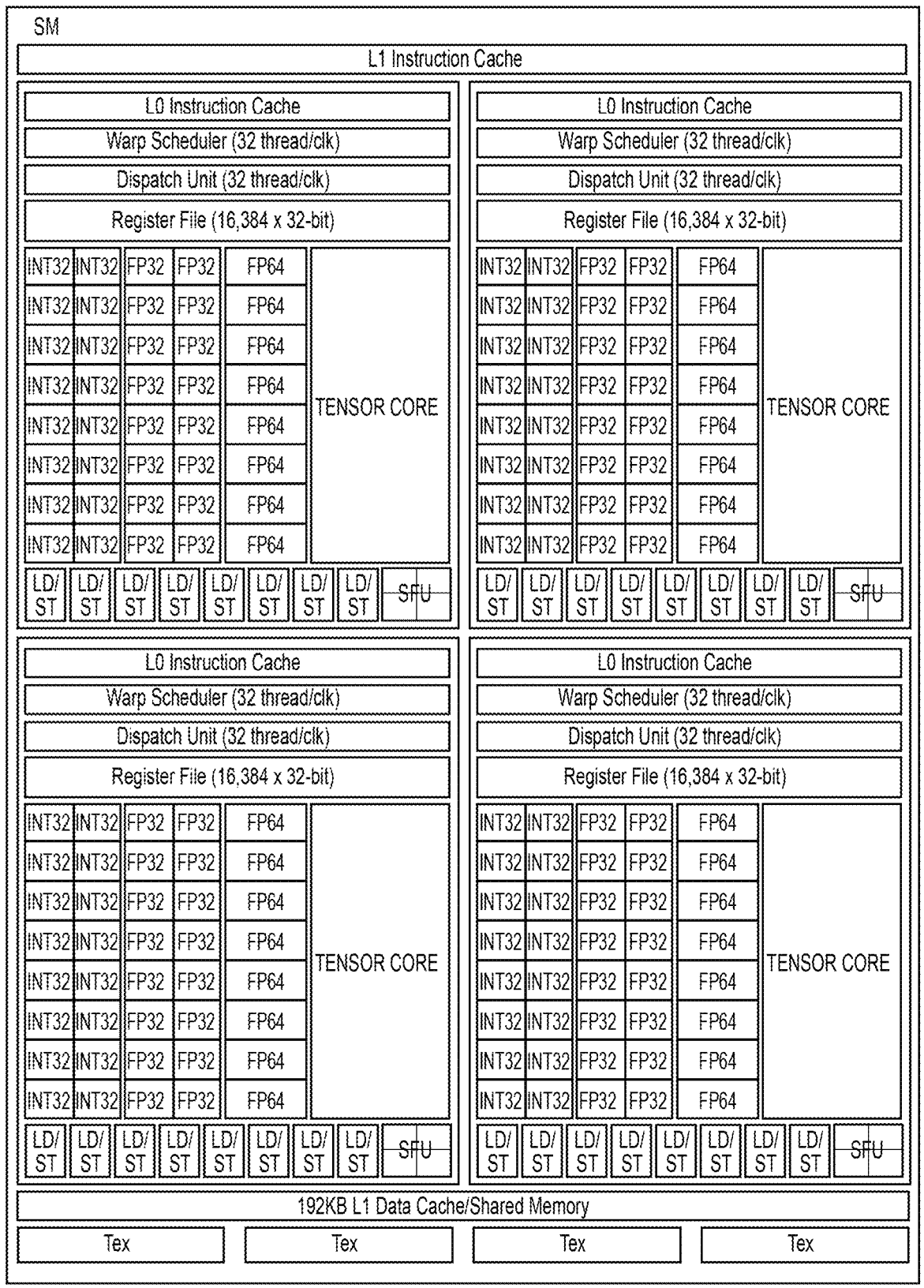
FIG. 5 shows an example streaming multiprocessor.
Figure 5A:
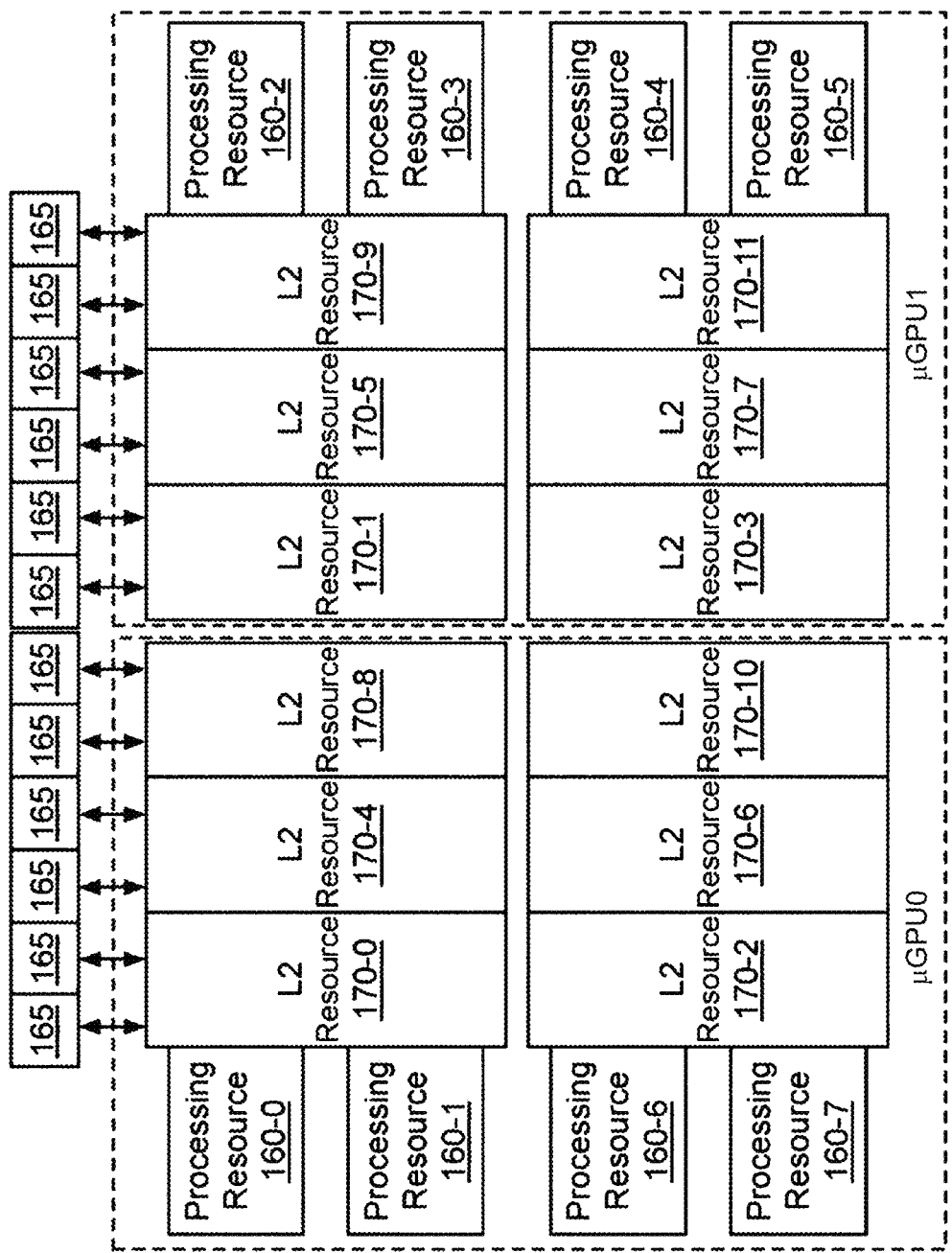
FIG. 5A shows example prior art μGPU partitions.
Figure 5B:
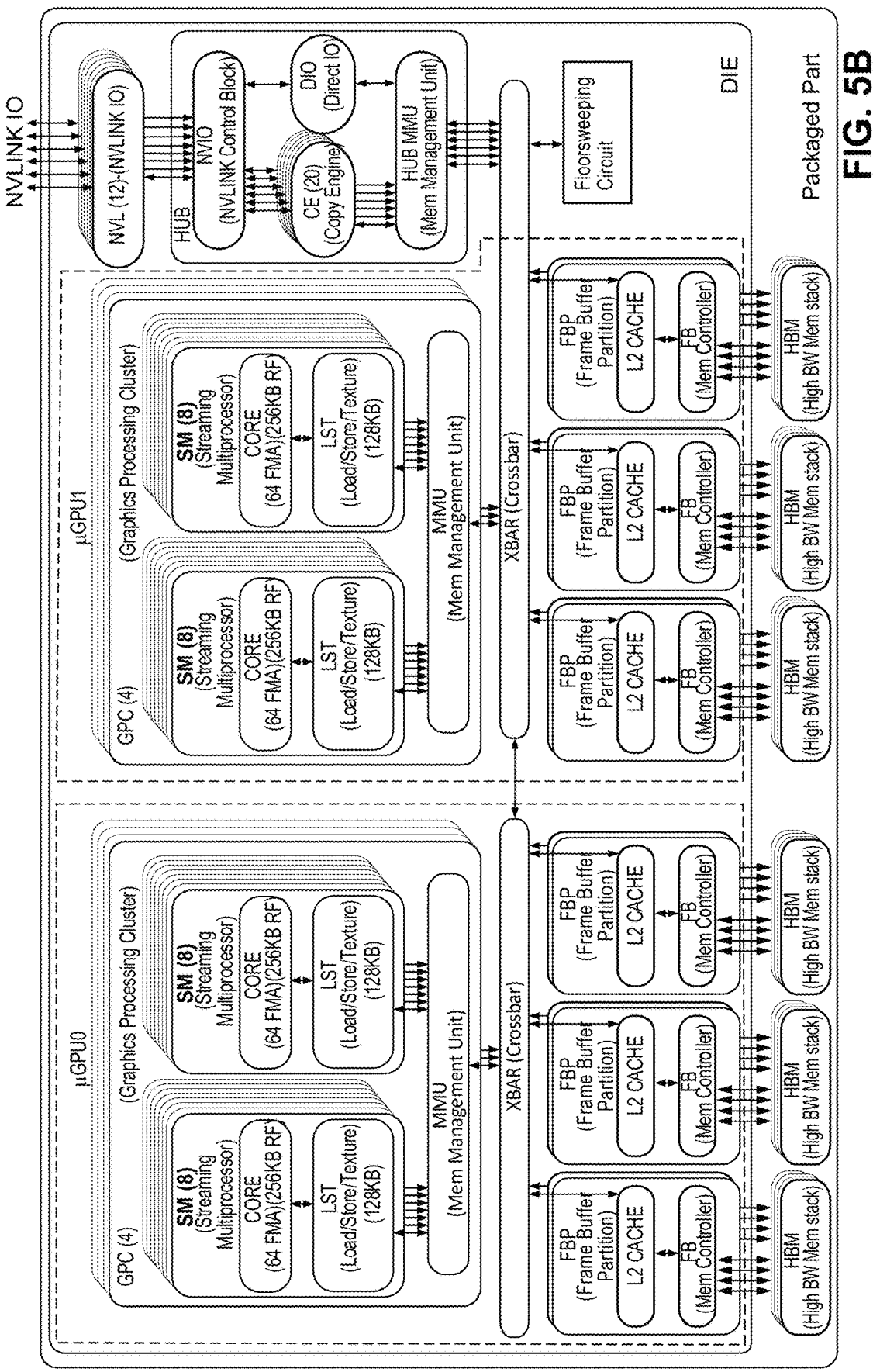
FIG. 5B shows example prior art μGPU partitions.
Figure 5C:
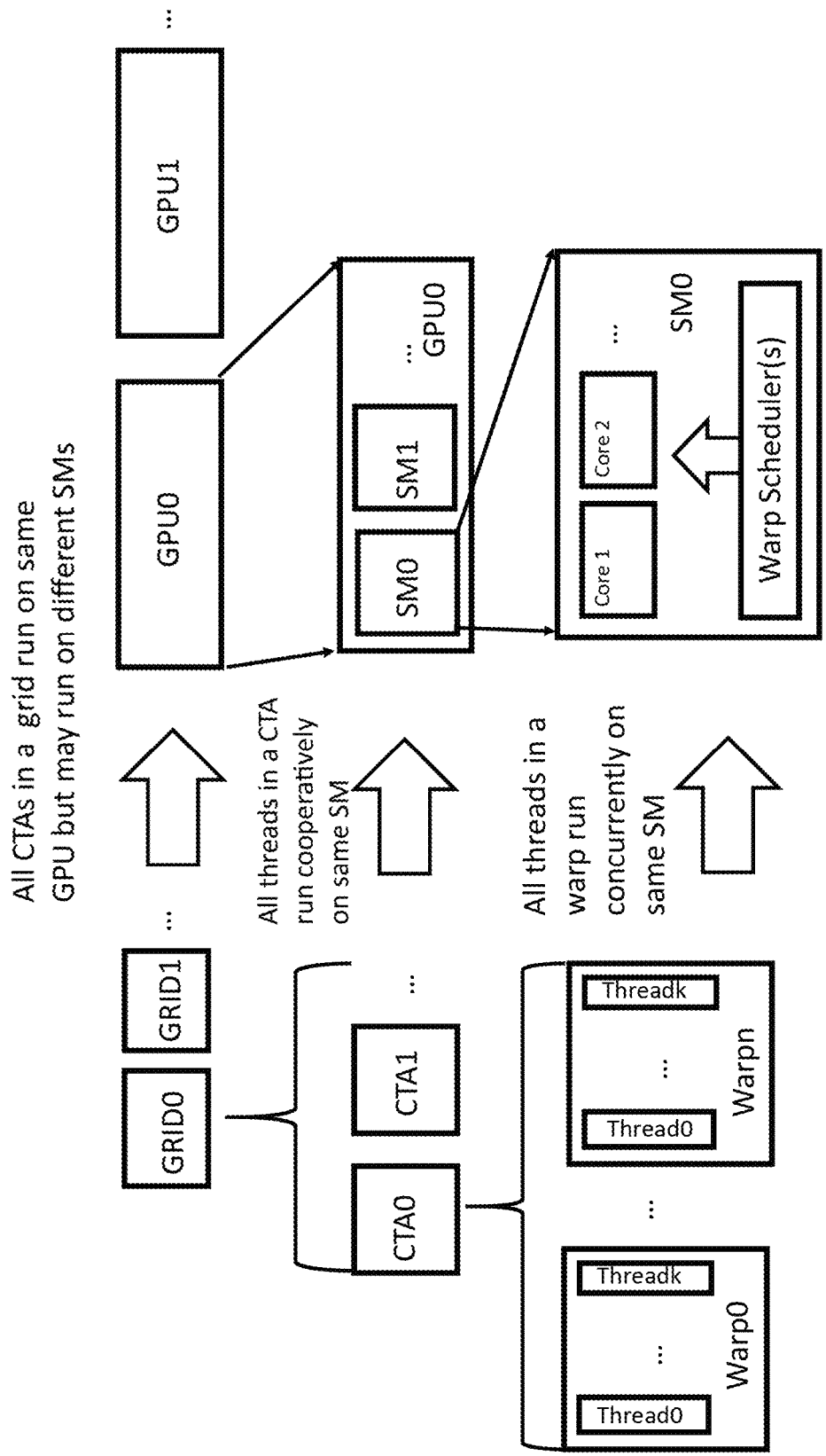
FIG. 5C shows an example prior art hierarchy mapping onto GPCs.

Unlike what is shown in FIG. 5C, in new GPU chip designs, we introduce a new feature called Cooperative Group Array (CGA) that guarantees a group of execution thread blocks or CTAs that cannot "fit" on a single SM will nevertheless run simultaneously in one GPC or other hardware partition. Using CGAs, CTAs that are guaranteed to be simultaneously running across multiple SMs can programmatically share data and computation more efficiently, allowing more threads across multiple SM to work together, thereby increasing throughput. See above-identified U.S. application Ser. No. 17/691,621 filed Mar. 10, 2022, titled "Cooperative Group Arrays". Such GPUs configured to run GPC CGAs provide a hardware guarantee that all CTAs in a GPC CGA will run concurrently on the same GPC.

CGAs have a "size" expressed as its number of CTAs. If each CTA consumes most of a particular resource in an SM, then the CGA "size" can be thought of as the number of streaming multiprocessors (SMs) it uses. For example, some example embodiments have a particular number (e.g., two) SMs per TPC, so the "size" of a CGA can also be thought of as the number of TPCs it uses. The number of TPCs used by a CGA can be anywhere between one and all the TPCs in a GPC. This creates a challenge in terms of ensuring that a CGA capable of running on one GPU chip will also be able to run on a different (non-identical) GPU chip.

CGAs and Product SKUs

Figure 21A:
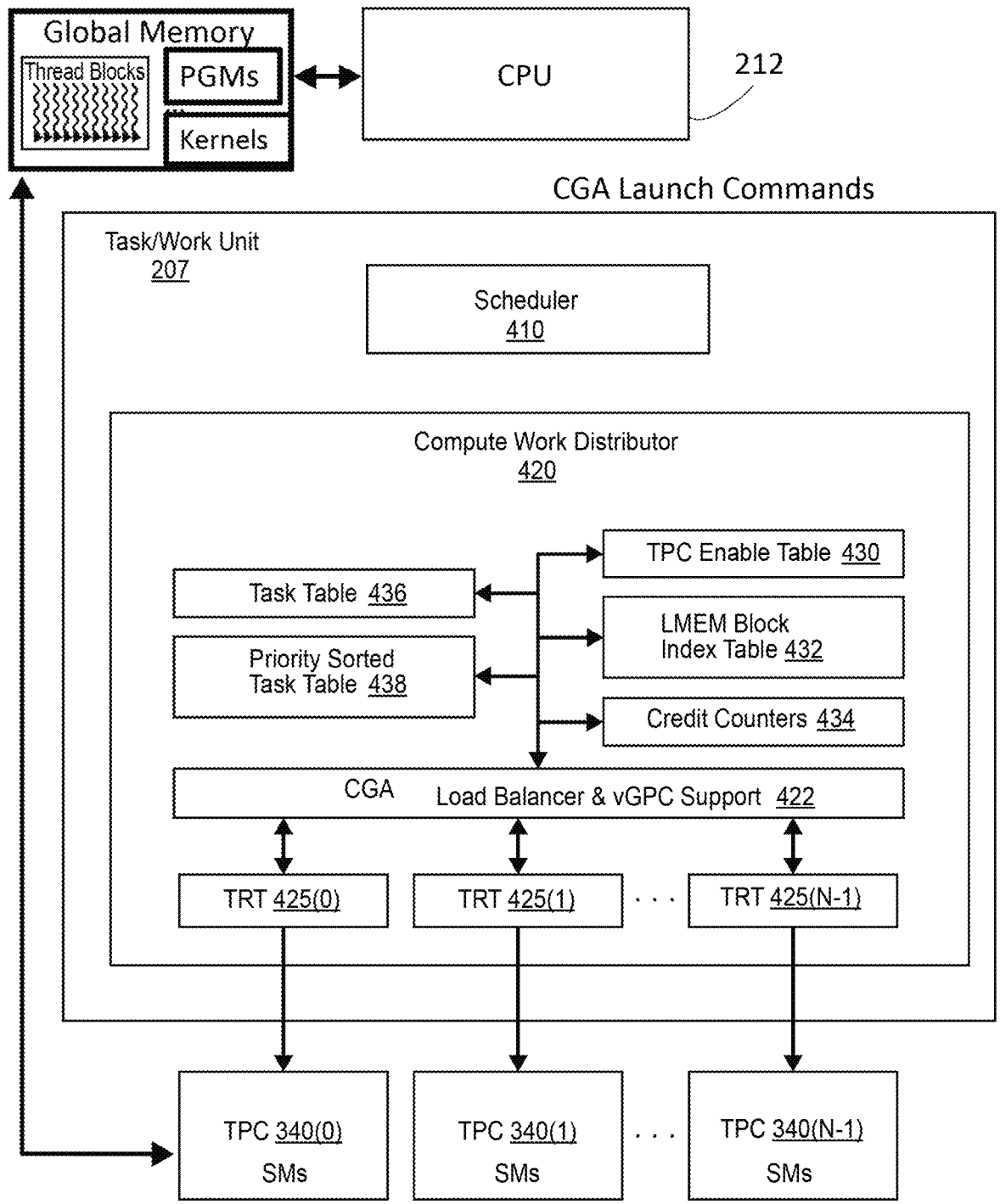
FIG. 21A shows an example overall block diagram of a system including a CPU and a GPU having a compute work distributor.
Figure 21B:
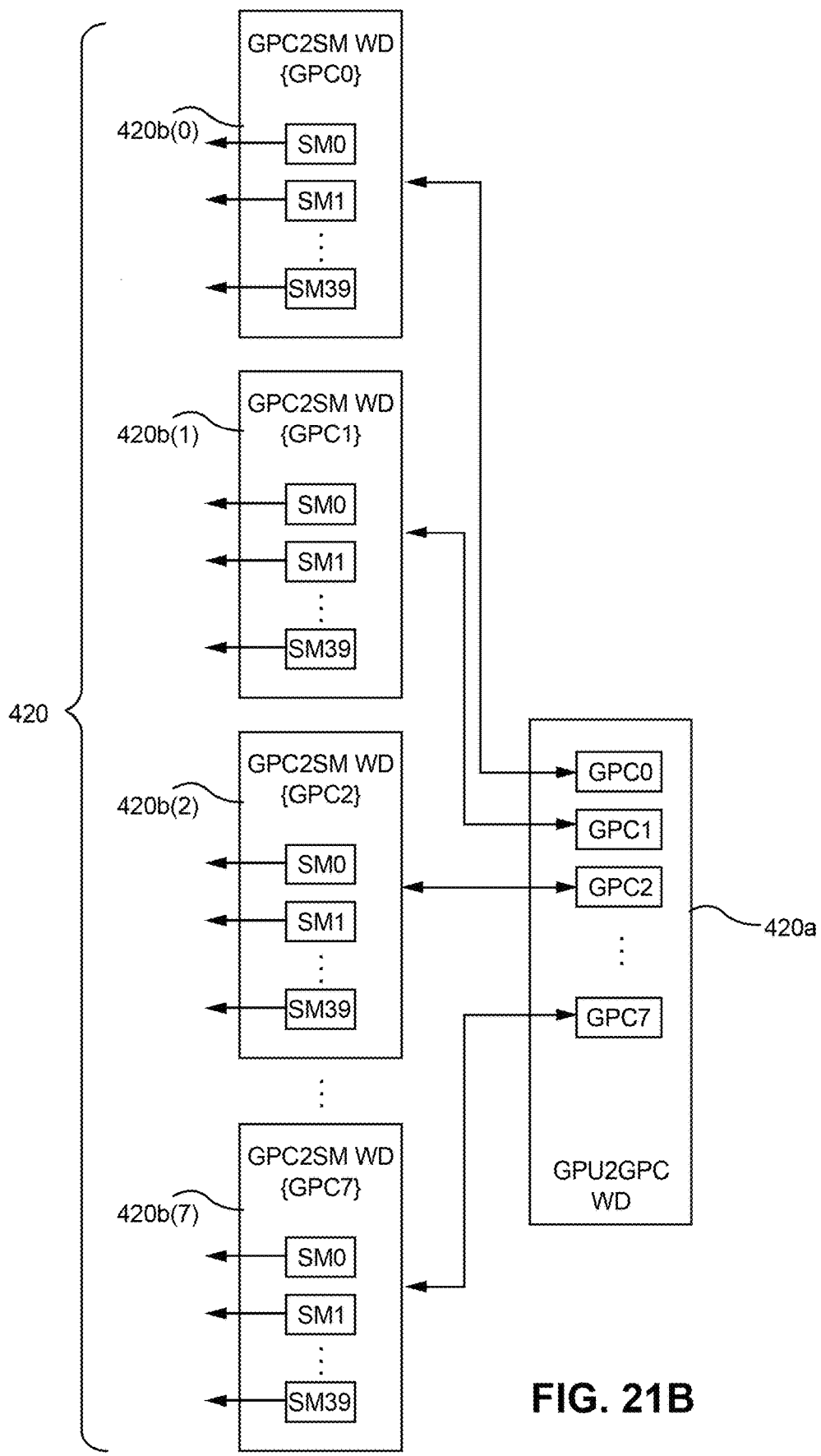
FIG. 21B shows an example block diagram of a compute work distributor.
Figures 1, 21C:
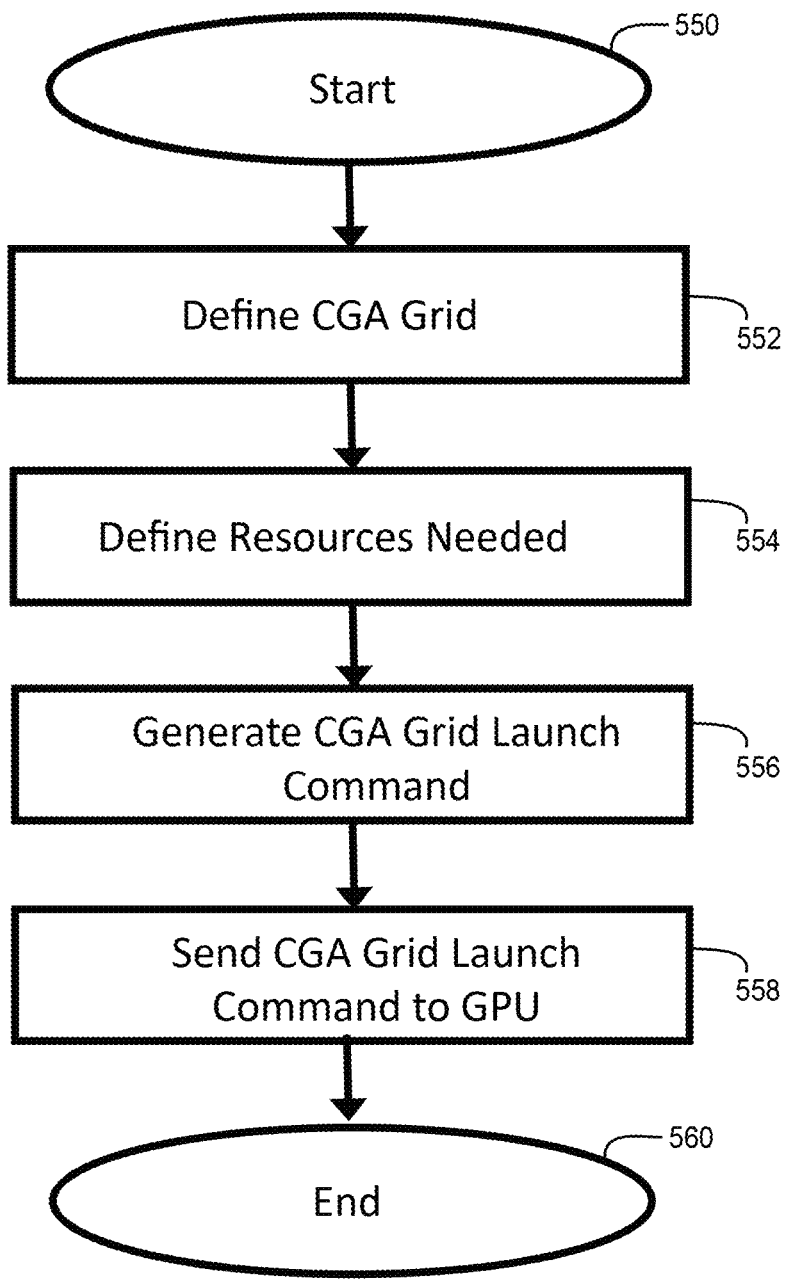
Figures 2, 21C:
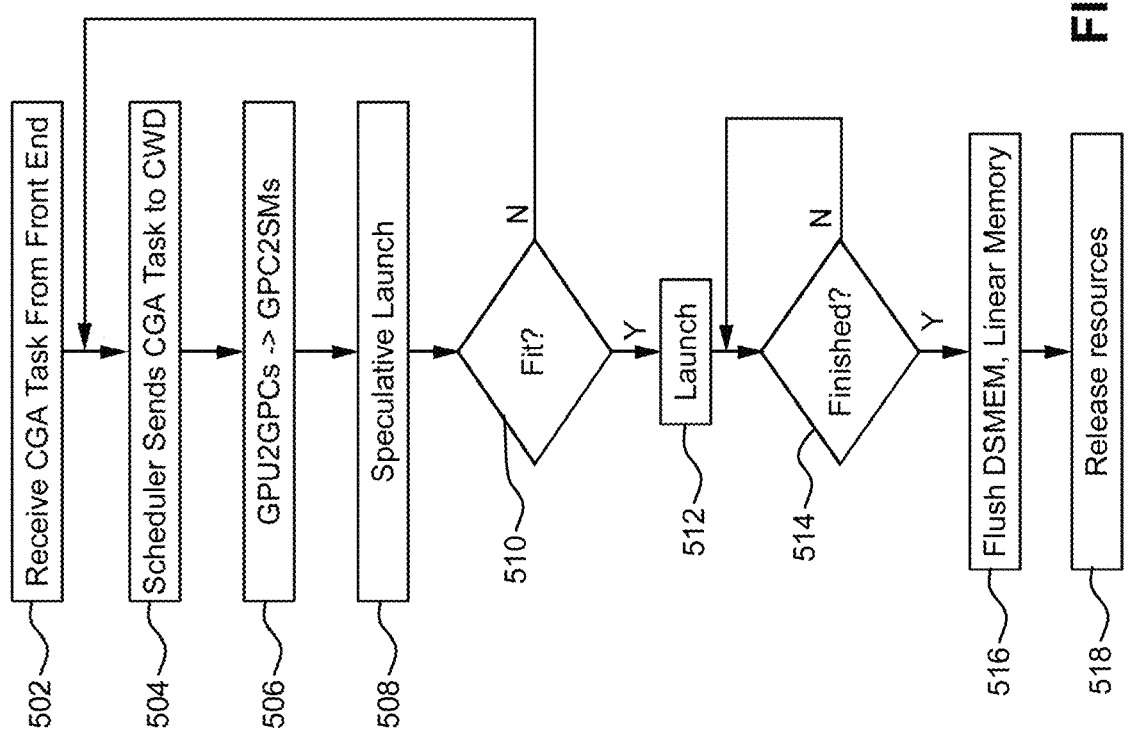

In new chip families, we would like to allow differing TPC per GPC profiles such as shown in FIG. 2 in the same product SKU. For example, it would be desirable to include different GPC Configurations such as 7/9 (i.e., one GPC with 7 TPCs and one GPC with 9 TPCs) and 8/8 (i.e., two GPCs each with 8 TPCs) to be in the same product SKU. However, if CGAs that use 8 TPCs are considered, 8/8 can execute two 8-TPC CGAs whereas 7/9 can execute only one 8-TPC CGA. This is important because all CTAs of a given GPC CGA running on a source GPU need to stay together on the same GPC when migrating to a different GPU, or a different physical location within the same GPU. That is, CGAs need to stay together as they are migrating from one GPC to another. Migration and compatibility that might have worked for prior contexts e.g., where CTAs executing on different SMs were not guaranteed to run concurrently, will no longer necessarily work with the new CGA programming model.

Furthermore, the new CGA programming model exposes the availability of the various sizes of CGAs to the programmer. For various reasons, the programmer's view of the GPU should be consistent for every chip in the same product SKU. For example, it may not be reasonable to require the programmer designing software based on CGAs to have to worry about different configurations of different GPU chips across a particular SKU. Yet, without the present technology, differing TPC per GPC profiles such as shown in FIG. 2 provide an inconsistent view to the programmer.

The Present Technology Solves These Problems

The example non-limiting technology herein solves this inconsistency problem. For example, it allows the three example Configurations of FIGS. 6A,6B, 6C to look the same to work distributors within the chips so that work is identically launched on any of the three represented GPUs; and the 3 Configurations also look the same to the programmer, such that optimizations to fill the GPU are the same for all chips in a SKU.

In brief summary, example non-limiting embodiments herein provide solutions including:
  (1) Increasing chip yield by allowing chips with differing TPCs/GPC profiles to be in the same product SKU and thereby used by applications that require consistent TPCs/GPC profiles across several (or all) chips with that product SKU; and
  (2) Providing a consistent view to the programmer and to programs that are to run on the GPU despite differing TPCs/GPC profiles.

The problems above are solved e.g., by innovation of a "Virtual GPC" (vGPC), where the number of vGPCs a chip can provide is larger (different) than the number of Logical GPCs within the chip or physical GPCs as put down on silicon as part of the chip's design and fabrication. This vGPC construct allows the set of all of the GPCs in a GPU chip to "look the same" to a compute work distributor (CWD) responsible for launching the thread blocks (CTAs) of a GPC CGA, and also to appear to be the same (consistent) to the programmer and to applications running on the GPU—even though the internal structures of the various chips in the product SKU can be very different.

Flexible TPC & GPC Migration

The technology herein further provides the following flexible migration solutions:
  (1) Flexible TPC Migration (FTM) and Flexible GPC Migration (FGM), which increase chip yield and the total TPC count by allowing migration between chips (and within chips) with differing TPCs/GPC profiles, thereby allowing them to be in the same product SKU, resulting in increased yield; and
  (2) Dynamic TPC Disablement (DTD), which allows GPUs to be reconfigured without having to do a full reset, thereby avoiding destruction of other running work on the GPU. Additionally DTD avoids having to downgrade all the GPCs to the size of the smallest GPC, maximizing the use of available TPCs thereby providing larger and more number of GPU Instances.

Example Non-Limiting Virtual GPC Representation

Figure 8:
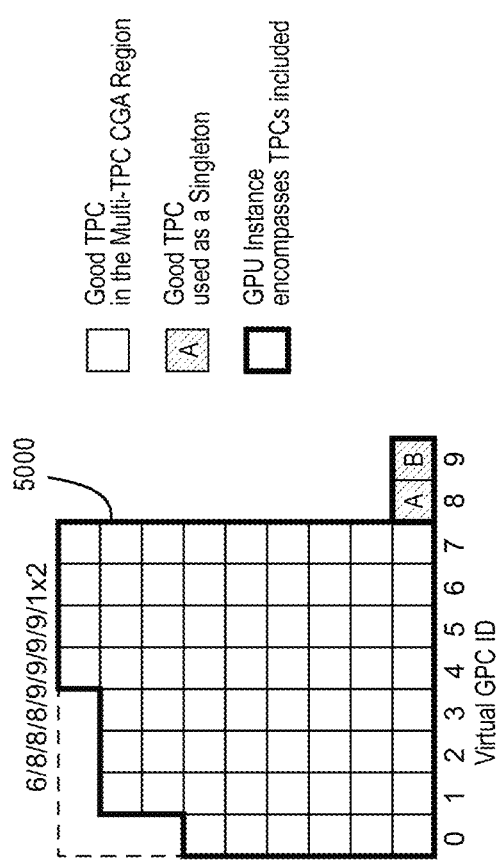
FIG. 8 shows an example virtual GPC Skyline with two TPCs each used as Singletons.

Referring to the FIG. 8 (new) representation of an example GPU of FIGS. 6A, 6B, 6C, the x axis is now relabeled "virtual GPC ID" and has more (e.g., ten) virtual GPCs than the original fewer (e.g., eight) logical or physical GPCs the chip was designed to have. The x axis is thus relabeled vGPC0-vGPC9. In this example, the hardware based work distributors on the chip will now "see" 10 GPCs instead of 8 GPCs. These 10 GPCs are referred to as "Virtual GPCs" because they are abstractions that façade and are decoupled from the underlying technology of the logical/physical GPC realities that are part of the chip design. The virtual GPCs are a kind of abstraction of the physical chip structure—organizing processing resources of the chip for interfacing with software and the software developers in ways that may be quite different from how those processing resources are patterned and disposed on the chip's semiconductor substrate.

The hardware of each chip is modified to keep track of more GPCs than actually exist on the chip (for example, a fixed number such as 24, even though in reality there are only 8 physical GPCs). And for virtual GPC ID starting at e.g., 8, the chip hardware "knows" that the virtual GPC can contain only 1 TPC, namely a "Singleton" TPC.

Such "Singletons" are shown in FIGS. 7A, 7B, 7C represented as TPCs marked with a letter "A" or "B". These "Singletons" are fully functional TPCs that are in reality usually closely connected to and physically associated with a physical GPC including multiple such TPCs within the chip hardware. In other words, the underlying physical chip design does not need to be fabricated to have separate TPCs that are not interconnected to other TPCs. Rather, these "Singletons" are in general chosen from a population of fully functional TPCs that are fully interconnected with other TPCs as part of a GPC and so could participate for example in a concurrent launch of CTAs to multiple TPCs across a GPC. But in example embodiments, the "Singletons" are abstracted so they become "free agents" and thus can function independently as their own virtual GPCs. This "free agent" capability provides tremendous advantages in terms of software compatibility, occupancy and flexibility, which has direct consequences for binning and product SKU classification.

The term "Singleton" implies a set with a single element in it—in this case only one TPC within its own virtual GPC. In one embodiment, each TPC contains two SMs and thus a Singleton TPC comprises plural processors (each SM can itself contain multiple processors) but the TPC is regarded as a processing "unit" in some embodiments. In other embodiments, a Singleton could comprise a single SM, four SMs, etc. In some embodiments, the processing "unit" of a Singleton can be the same processing "unit" that is tested and floorswept and the same processing "unit" that is dynamically enabled/disabled (see below).

Where do these Singletons come from? Consider a GPU designed to have 72 TPCs organized in 8 physical GPC clusters. For any given chip, some of those TPCs will be good and some of those TPCs may be bad. Assume that 68 TPCs are good and four TPCs are bad. The four bad TPCs may, as a result of testing, be permanently disabled and inaccessible as part of "floorsweeping" as discussed herein. Where will those four bad TPCs be located? They could be anywhere on the chip substrate. Sometimes they will be grouped together and be physically close to one another due to a defect on the substrate, but in the general case they could be distributed randomly across the chip substrate.

Floorsweeping rules meanwhile may impose constraints on where the bad TPCs are allowed to be (e.g., one physical GPC can have as many as three bad TPCs, and all the rest of the GPCs may have at most one bad TPC) so that chips that don't meet this constraint will not be included in the product SKU (they might be included in a different product SKU, or they could be discarded). Nevertheless, floorsweeping will in general affect each chip differently, such that any given population of GPU chips designed and fabricated to be identical to one another will in reality be quite different physically from one another as a result of the floorsweeping process and the underlying manufacturing flaws each chip contains. A few may be fully functional, but many will have manufacturing defects that require circuits on them to be abandoned and made inaccessible. Despite these significant differences in hardware and physical structure, a goal is to make all chips in a given population "look the same" (i.e., present the same technological interface) to applications written to run on them and to programmers who are writing those applications. This has nothing to do with appearance or aesthetics—it means for example that all of those chips present a common technological interface to CGA based applications written for them so that CGA based software that is technologically compatible within one chip in the population is technologically compatible with all other chips in the population, e.g., in the sense that any application that can run on one chip can run on any other chip. Similarly, the internal schedulers within the chips in a given product SKU should be able to successfully schedule the same work despite hardware differences between chips.

In terms of technological improvements on the hardware level, in the example embodiment there is a full crossbar in between the "syspipe" communications links from compute work distributors and the GPCs within the chips. The chip can thus mix and match which GPCs go with which syspipes. There is also a full crossbar between compute work distributors and the TPCs that allow any mapping between the (virtual) TPC IDs used by CWD and the (physical) TPC IDs (conversion between the different ID conventions can in one embodiment be performed by components called M-Pipe Controllers ("MPCs") that are present in each GPC). This hardware-based mapping effectively hides or facades the complexities of floorsweeping and chip defects from the application and the application programmer, presenting an interface based on virtual GPCs that can be uniform and consistent across a population of chips that in fact are or may be significantly different from one another in terms of structure, function and operational capabilities.

Accordingly, the hardware of a chip can now create a virtual GPC from any of the 72 TPCs. This enables a configurator to select "Singletons" and to seed those Singletons into virtual GPCs that are then mapped into physical GPCs, in order to make the resulting array defining TPCs for each virtual GPC of one floorswept chip be the same as the resulting array of another floorswept chip—even though the two floorswept chips in reality contain very different internal circuitry and associated processing functionality due to reasons including for example manufacturing defects and responsive floorsweeping. In example embodiments, such arrays are a measure of chip processing capabilities and in particular define ratios of processing cores or other processing hardware per virtual hardware partition/grouping. Thus, the two chips may in the general case be radically different inside, yet the present technology allows those two radically different chips to appear to the programmer and to application programs as being technologically "the same" in terms of the technological interfaces and compatibility they present to application programs intended to run on them.

In one embodiment, disregarding graphics capable GPCs and focusing on compute capabilities is a reason why virtual GPC IDs can be introduced. However, in some embodiments, a graphics-capable virtual TPC mask is also provided if not all TPCs are graphics-capable. Such a mask could be used for migration of graphics applications.

Meanwhile, vGPC0-vGPC7 together define a Multi-TPC CGA Region 5000 having a TPC per GPC profile that is common to all chips in a product SKU. As one can see by comparing FIG. 8 with FIGS. 6A, 6B, 6C, the Multi-TPC CGA Region 5000 that FIG. 8 defines for vGPC0-vGPC7 is common to all FIGS. 6A, 6B, 6C configurations, i.e. it will be common for all chips in the same product SKU. Meanwhile, vGPC8 and vGPC9 each contain a "Singleton" (i.e., a set of exactly one TPC element) that may be logically associated with any of the logical GPCs but which is now abstracted into its own virtual GPC so that it can run CGAs that need only two SMs.

In more detail, we shall again consider a GPU design with 8 GPCs, that has 9 TPCs per GPC. FIGS. 6A, 6B, 6C shows a single product SKU including three different chip Configurations each with 68 TPCs: (1) 8/8/8/8/9/9/9/9 (FIG. 6A); (2) 7/8/8/9/9/9/9/9 (FIG. 6B); and (3) 6/8/9/9/9/9/9/9 (FIG. 6C). GPCs are represented by vertical columns of squares, where each square represents a TPC (which in turn includes one or more—and in one example, exactly two— SMs). Non-cross-hatched (white) squares are defect-free TPCs. and cross-hatched squares are defective TPCs that are turned off due to manufacturing defects. The GPCs are sorted from fewest to most non-defective TPCs, with the GPCs numbered with their Logical GPC IDs (see numbers along the x axis). The example technology herein allows all three GPU Configurations in FIGS. 6A, 6B, 6C to be in the same product SKU, thereby increasing chip yield.

The non-crosshatched squares in FIGS. 6A, 6B, 6C show the TPCs that are good in all three Configurations. That is, of the 68 good TPCs in each of the three Configurations, 66 of them are good across all three Configurations. The union of these 66 non-crosshatched TPCs is the set of TPCs where CGAs that use more than one TPC can run. We call this the "Multi-TPC GCA Region" 5000. This set excludes the dotted-line crosshatched TPCs, described next.

For each of the three Configurations, FIGS. 7A, 7B, 7C shows two dotted-line crosshatched squares, labeled "A" and "B", that represent "Singleton" TPCs. These "Singletons" are defect-free TPCs. However, as FIGS. 7A, 7B and 7C show, the Singletons are not in the same place across the different Configurations. For example, in FIG. 7A, the "A" and "B" Singletons are both found in logical GPC 0; in FIG. 7B the "A" Singleton is in logical GPC3 and the "B" Singleton is in logical GPC 0; and in FIG. 7C the "A" Singleton is in logical GPC 3 and the "B" Singleton is in logical GPC2. Furthermore, the logical GPC-oriented illustration of FIGS. 7A, 7B, 7C itself hides an additional complexity of the underlying physical reality in which each of those Singletons could be anywhere on the chip substrate within their respective physical GPCs.

Singletons can run CGAs that are small enough to run on a single TPC (e.g., two SMs), but cannot be used to run GPC-CGAs that require multiple TPCs (i.e., more than two SMs). Singleton TPCs in general cannot be guaranteed (across the product SKU) to be located in the same GPC as any other TPC and thus are not guaranteed to be able to communicate and interconnect with other TPCs in the manner that CGAs may need (although, as discussed above, the present technology does include features that can leverage such groupings/interconnections when they are present).

Overall, TPCs in the same GPC within the Multi-TPC CGA Region 5000 are guaranteed to always be together in a GPC, whereas Singleton TPCs cannot be guaranteed to be in the same GPC with any other TPCs. In terms of migration between GPUs, the introduction of CGAs brings in a requirement that TPCs that are part of the CGA region 5000 in a source GPC should migrate together and perform work within a CGA region in the destination. On the other hand, the Singleton TPCs in that source GPC may or may not move to the same destination GPC as the CGA region TPCs and in particular cannot be guaranteed to do so. Accordingly, in some circumstances herein, embodiments provide interfaces with each Singleton as its own virtual GPC capable of doing work sized to fit the processing capabilities of a single TPC.

Skylines

As discussed above, the FIG. 8 layout or representation of TPCs per virtual GPC results from the union of all "good" TPCs across the three different FIG. 6A, 6B, 6C chip configurations. In particular, the "lowest common denominator" between these three FIG. 6A, 6B, 6C configurations is that vGPC0 has 6 functional TPCs, vGPCs 1-3 each have 8 functional TPCs, and vGPCs 4-7 each have 9 functional TPCs. We call this layout or representation of a set of vGPCs as shown in FIG. 8 a "Skyline" because of its vague resemblance to a city Skyline. A "Skyline" is a representation declaring processing capabilities, such as concurrent processing capabilities, of a processor, processing chip or other processing arrangement, including (a) a declared quantity of virtual processing clusters, and (b) a declared quantity of processors for each declared virtual processing cluster, where different virtual processing clusters declared for the same processor, processing chip or other processing arrangement may have the same or different declared quantities of processors. Thus, in one embodiment, a Skyline may represent a collection of groups of parallel processors, where each group may have a different number of parallel processors (e.g. each vGPC may have a different number of TPCs). In one embodiment, the Skyline thus declares a quantity of virtual processing clusters that includes both (i) virtual processing clusters comprising more than one processor "unit" and (ii) virtual processing clusters with Singleton processor units (where a processor "unit" may in some embodiments comprise one or a multiplicity of hardware processors such as a pair of hardware processors configured for example as a TPC). In one embodiment, a Skyline designates one or a multiplicity of hardware processors as within a virtual GPC designated by a virtual GPC identifier (ID). In one embodiment, a "Skyline" can be graphically represented as a two-dimensional arrangement, such as shown in FIG. 8, of rows and columns, where each column represents a declared virtual processing cluster, each row represents a given declared quantity of processors or processing units, and the ordering of declared virtual processing clusters from left to right assigns a virtual ID to the virtual processing cluster. Thus, the quantity of columns in the Skyline of FIG. 8 is the declared quantity of virtual processing clusters, how "tall" each column is represents the declared quantity of processors or processing units within the corresponding virtual processing cluster (much like the height of a skyscraper represents the number of stories of the building), and total number of blocks in the Skyline indicates the total declared quantity of processors or processing units of a processor, processing chip or other processing arrangement. Notice also that in one embodiment such as shown in FIG. 8, the Skyline follows a convention in which declared virtual processing clusters having fewer declared processor units are to the left of declared virtual processing clusters having more declared processor units with the exception that declared virtual processing clusters comprising Singletons are rightmost. Many other ways to express this same representation of this Skyline information are possible such as for example the non-graphical notation string "6/8/8/8/9/9/9/1x2" at the top of FIG. 8 (or for example "6888999911" in decimal, hexadecimal or other numbering base) which encodes the declared quantity of virtual processing clusters (length of string) and the declared quantity of processor units within each processing cluster (value), with a virtual processing cluster ID being inferable for each declared collection of processor units based on the order of the collection within the notation string. It is this "Skyline" that in one embodiment defines the virtual interface that software and software developers use to define work assignments to the population of chips within a product SKU. In one embodiment, for all chips in a product SKU, it is desired to have an identical Skyline. Thus, in one embodiment, the Skyline assigned to a particular processor, processing chip or other processing arrangement declares quantities that are less than or equal to the actual hardware capabilities of the processor, processing chip or other processing arrangement.

In previous chips, the Compute Work Distributor (CWD) within each chip sent work to TPCs based on Logical GPCs. For the programmer to see a consistent model of the GPU, the CWD in a new example chip design now provides an identical set of TPCs/GPC across all the Configurations in FIGS. 6A, 6B, 6C. This can be done by CWD treating all Configurations as 6/8/8/8/9/9/9/1/1, which is a set of 10 Virtual GPCs, rather than 8 Logical GPCs (as those shown in FIGS. 6A, 6B, 6C).

The last two ("1") entries in the above nomenclature are Singletons. In our nomenclature, rather than ending the Configurate with a string of "/1/1/1 . . . " representing the Singletons, we can abbreviate it with 1×N, where N is the number of Singletons (in one embodiment, each virtual GPC containing a Singleton has only one Singleton, and so the number of additional GPCs attributable to Singletons will be the number of Singletons). For example, the Configurate or Skyline of 6/8/8/8/9/9/9/1x2 shown by way of example in FIG. 8 has two Singletons. In the FIG. 8 example, CWD "sees" 10 GPCs, rather than 8 GPCs organized into a Multi-TPC CGA Region TPC per GPC profile common to all chips in a product SKU. Singletons are each by themselves in their own vGPC, with the "1×N" at the right end of the Skyline representing N Singletons.

The Skyline shown in FIG. 8 is the same for all chips in a product SKU—which means that this or any collection or combination of CGAs that can run on one chip in the product SKU can run on any other chip in the product SKU. In particular, for the Configurations in a SKU:

The Multi-TPC CGA Region is always the same shape and size

The number of Singletons is always the same

Therefore, the Skyline is always the same.

In other words, a programmer can use the Skyline for a product SKU to define the CGA based software the programmer develops for that product SKU. If the software is designed to run on the Skyline, it will be compatible with any chip having that product SKU. Furthermore, the programmer can optimize the software to take advantage of the Skyline—for example, by providing a certain number of smaller 2-SM CGAs as well as a certain number of larger sized CGAs precisely as the Skyline can accommodate to maximize TPC occupancy.

Different SKUs (which are defined by floorsweeping/binning rules) will generally have different Skylines, and optimizations for CGA occupancy might be different for different SKUs. For example, an SKU offering 68 TPCs and an SKU offering 64 TPCs will have different Skylines. However, because floorsweeping/binning can be based on a variety of different hardware divisions or clusters (e.g., TPCs which are 1/9 of a GPC, groups of TPCs called CPCs that constitute 1/3 of a GPC, an entire GPC, more than one GPC, etc.), different SKUs could also have the same Skyline.

From the programmer's perspective, Singleton TPCs should be treated as being unable to participate in a CGA with other TPCs. However, Singleton TPCs can run any CGA that fits into one TPC. The programmer always sees the same Skyline for all chips in the same product SKU, even though the underlying physical and logical Configurations within the product SKU may be quite different from one chip to another.

Figure 9:
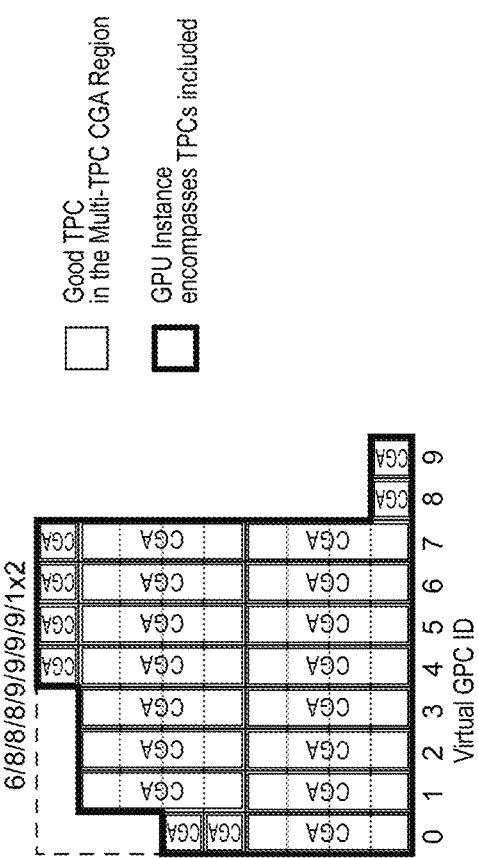
FIG. 9 shows example CGA mapping onto the FIG. 8 Skyline.

As mentioned above, in one example, not all CGAs can run on a Singleton or on a virtual GPC that consists of a Singleton. CGAs that can use a Singleton comprise CTAs that need no more processing resources than two SMs (i.e., one TPC) provide. For example, in one embodiment, each SM can run K CTAs concurrently, where K is a platform-independent value that might for example be 10 in one embodiment. This means that in one embodiment, a vGPC based on a Singleton TPC could run a GPC CGA comprising K×2 CTAs. See FIG. 9, which shows an example Launch "Grid" with exactly Fifteen 8-SM CGAs, and then a Grid with smaller 2-SM CGAs. In this example, fifteen 8-SM CGAs and eight 2-SM CGAs fit.

The above Skyline example is a very simple case. Actual product SKU Skylines could be more complex such as for example, 5/5/7/7/7/8/8/8/1x7 or 6/6/7/7/8/8/8/0/1x12, where the number of Configurations are 20 and 17, respectively—far too many to draw in a simple diagram.

Example GPC CGA Migration with vGPCs and Skyline Definition/Discipline

Migration is a special case of compatibility, where software that is running on one chip is shifted to run on a different chip. As discussed herein, migration in some contexts includes additional technical challenges of interrupting running software, storing its state and context, transporting the software to a different chip(s) and/or different portion(s) of the same chip(s), and resuming software execution to continue where it left off—all without requiring a hardware reset that would require interruption or termination of other software running on the destination chip(s).

Figure 11:
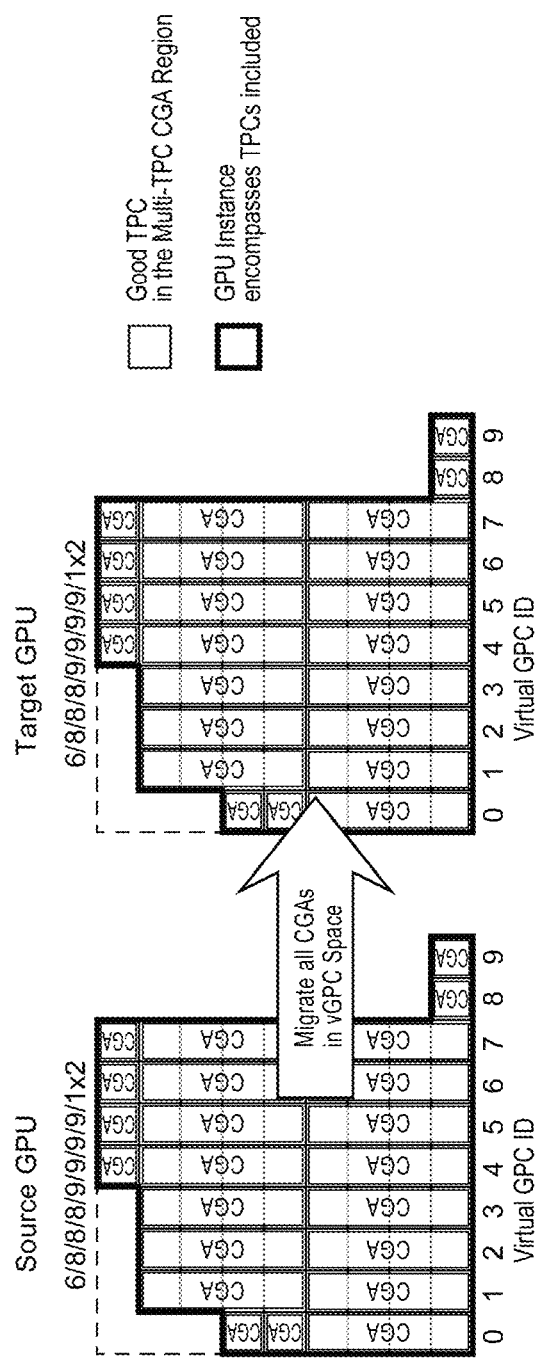
FIG. 11 shows example successful migration using virtual GPCs.

FIGS. 10A, 10B and 11 show example before and after migration results. FIGS. 10A. 10B show a prior art attempt to migrate after launching a GPC CGA Grid with exactly 16 8-SM CGAs, and a Grid with 2-SM CGAs from a GPU chip with a logical GPC ID configuration 8/8/8/8/9/9/9/9 to a GPU chip with logical GPC ID Configuration 6/8/9/9/9/9/9/9. In the source chip, sixteen 8-SM CGAs and four 2-SM CGFAs fit into the 8/8/8/8/9/9/9/9 configuration. As FIGS. 10A, 10B shows, the migration is impossible because there is only room for fifteen 8-SM CGAs in the target GPU.

FIG. 11 in contrast shows a migration from the same source GPU chip to the same target GPU chip—but in this case each chip is configured using the vGPCs technology with a Configurate of 6/8/8/8/9/9/9/1x2—including two Singleton-based virtual GPCs 8 & 9. FIG. 11 shows the migration is not a problem and works because it happens in the vGPC ID Space, which is always consistent across a product SKU. The migration works fine because the vGPC Skyline is the same in both the source chip and the destination chip—even though as FIG. 10A shows, the underlying physical and logical hardware functionality of the two chips are quite different. In one embodiment, there is always a perfectly consistent Skyline across a given SKU, so that migration can happen successfully no matter what two chips in the product SKU are selected as source and destination GPUs.

As described in detail below, state/context information can be synthesized for the additional GPCs on the destination chip if there is no state information on the source chip corresponding to the extra GPCs (e.g., if a source chip has fewer GPCs than the destination chip). For example, in one embodiment, the state information for a source chip GPC can be duplicated for multiple GPCs in the destination chip (in one embodiment, the number of vGPCs is constant between source and target by virtue of the Skyline, so that such state synthesis/replication is used when the number of physical GPCs differs).

Example Skyline Choices

FIG. 12 shows an example table of sensible Skyline choices that could be selected to define a product SKU. The particular selection or selections can be based on performance versus yield. Meanwhile, FIG. 13 shows that different SKUs can encompass or include different numbers of logical configurations and that some SKUs can include a large number of different logical or physical configurations. For example, the configuration 5/5/5/6/7/7/7/0/1x14 can encompass 63 different chip configurations that the vGPC technology will ensure all "look the same" to the programmer and to CGA based applications to be run on the GPUs. The present technology thus enables chips that have radically different structures on the inside to be presented to the outside world (e.g., to programmers) as being "the same."

Figure 13A:
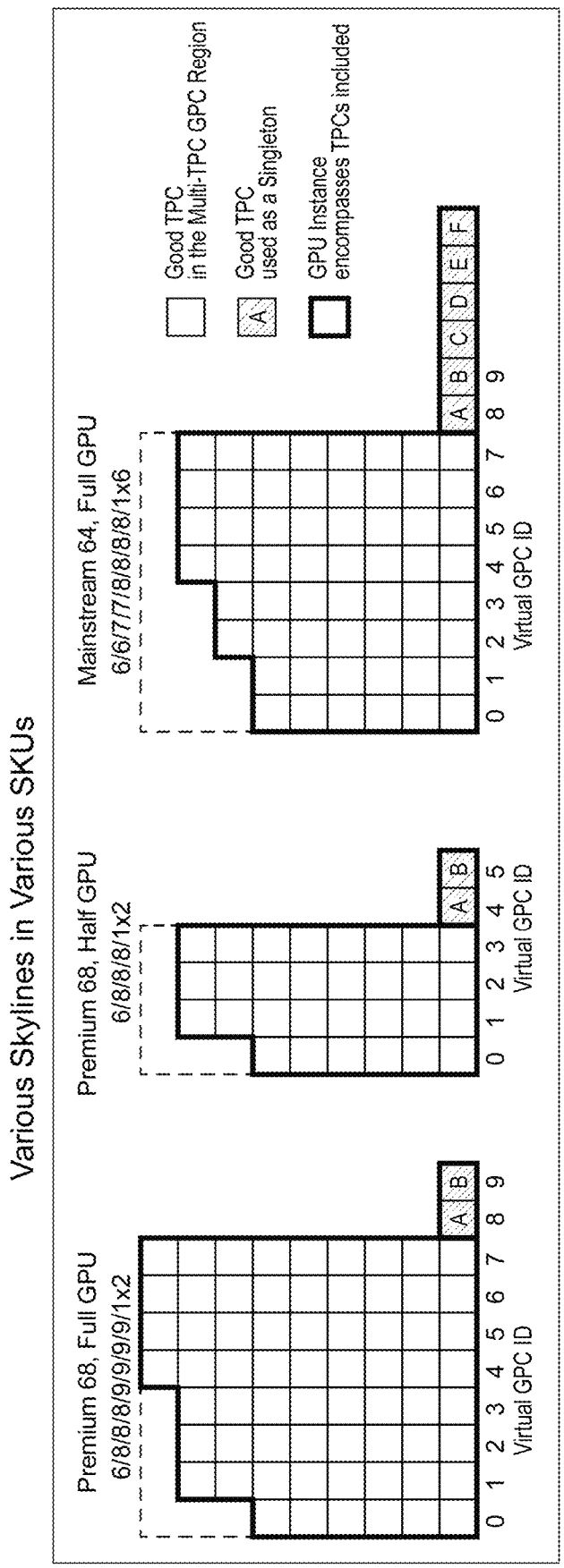
FIG. 13A shows example Skylines for various GPU configurations.

SKUs that allow more TPCs or other hardware subdivisions or clusters to be floorswept will encompass more variations of chips—meaning that yield goes up. But this may be at the expense of performance. Performance decreases in such cases because CGA launch cannot take advantage of the increased relative performance of any chip in the SKU but must instead treat all chips as being "the same"—and as the "lowest common denominator" in a particular product SKU offers a decreased number of functional TPCs per GPC, parallel processing performance goes down. Thus, designing an SKU to encompass more configuration variations will decrease the value of any chip in the SKU but will result in more total chips that can be sold as part of the SKU. See for example FIG. 13A showing example Skylines for various GPU Instance configurations. The technology herein allows chip manufacturers to flexibly make different decisions based on customer performance requirements.

Permutations and Balance

While the above considerations will dictate the Skyline, there is yet another factor that can change the product performance—balance of processing resources across groups of GPCs. In some embodiments, GPCs are grouped together into an additional level of the hierarchical organization of the chip. For example, a chip could have 8 GPCs, where the GPCs are organized into two "micro GPUs" (abbreviated μGPU) with 4 GPCs each. It can be desirable to define a SKU with a maximum amount of imbalance, in terms of the number of TPCs, between the two μGPUs. The imbalance can also be important for MIG. In this consideration, "configuration" may comprise a sorted list of TPCs/GPC, from the fewest TPCs to the most TPCs. For example, with 62 total TPCs, one possible Configuration is: 6/6/6/8/

9/9/9/9. Meanwhile, "permutation" may comprise a sorted list of GPU Instances (a subset of the GPCs within a μGPU—for example half the GPCs within the GPU, a quarter of the GPCs, 1/8 of the GPCs, etc.), with TPCs/GPU Instances further sorted. For example, the above Configuration has four Permutations (the first four digits reflecting the sorted TPCs/GPC within a first GPU Instance, and the second four digits reflecting the sorted TPCs/GPC within a second GPU Instance, and the GPU Instances themselves also being sorted):

6/6/6/8/ /9/9/9/9

6/6/6/9/ /8/9/9/9

6/6/8/9/ /6/9/9/9

6/6/9/9/ /6/8/9/9

Note that 6/8/9/9/ /6/6/9/9 is not a Permutation since it is not sorted properly (it would be redundant with 6/6/9/9/ /6/8/9/9)

Floorsweeping/binning rules can reduce the number of Permutations in a SKU. For example, "Maximum imbalance of 8 TPCs between μGPUs" eliminates 6/6/6/8/ /9/9/9/9. 6/6/6/8/ /9/9/9/9 has 26 and 36 TPCs in its μGPUs, so it has an imbalance of 10 TPCs. Such an imbalance will increase yield (fewer chips will need to be discarded or binned out of the SKU) but may degrade performance. It is possible to eliminate certain Permutations (e.g., some chips that have correct configurations but are too imbalanced) to increase performance as the expense of yield. Including fewer permutations in an SKU will generally increase the performance of the SKU for certain uses such as MIG because there is less imbalance in chip capabilities across the chips in the SKU.

In particular, NVIDIA previously introduced a Multiple Instance GPU ("MIG") feature that allows a GPU to be spatially subdivided into multiple smaller GPU Instances, each GPU Instance of which can be running a different instance of an operating system (or separate containers under one OS). The "size" of a GPU Instance is the number of GPCs in the GPU Instance. As examples, an 8-GPC GPU could be split into four 2-GPC GPU Instances, or split into one 4-GPC GPU Instance and two 2-GPC GPU Instances. However, GPU Instances of the same size are, or have in the past been, generally required to have an identical number of TPCs. This allows migration of contexts between GPU Instances of the same "size", similar to migration of contexts running on the entire GPU. See https://www.nvidia.com/en-us/technologies/multi-instance-gpu/. This is where the "balance" issue measured by the number of permutations comes in. In particular, including chips with more permutations in the SKU can result in decreased performance between GPU Instances in cases where all equal-sized GPU Instances within the chip, and for all chips in a SKU, are to have the same number of TPCs.

Here are two examples:

Example A

6/6/6/8/9/9/9/9 with 10 TPC max imbalance allowed (ignoring other Configurations)

6/6/6/8/ /9/9/9/9 (26+36, imbalance of 10 TPCs)

6/6/6/9/ /8/9/9/9 (27+35, imbalance of 8 TPCs)

6/6/8/9/ /6/9/9/9 (28+34, imbalance of 6 TPCs)

6/6/9/9/ /6/8/9/9 (29+33, imbalance of 4 TPCs)

Size for a 4-GPC GPU Instance is 26 TPCs

Example B

6/6/6/8/9/9/9/9 with 8 TPC max imbalance allowed (ignoring other Configurations)

6/6/6/9/ /8/9/9/9 (27+35, imbalance of 8 TPCs)

6/6/8/9/ /6/9/9/9 (28+34, imbalance of 6 TPCs)

6/6/9/9/ /6/8/9/9 (29+33, imbalance of 4 TPCs)

Size for a 4-GPC GPU Instance is 27 TPCs

Example B is better for MIG "Halves" than Example A, but yield will be lower. Other examples will apply for quarters, eighths, etc. Note that these particular division sizes are exemplary.

Permutations increase the total number of pairs that can be involved in Migration, and also have a big effect on GPU Instances for MIG. As a subtlety, there are circumstance where not all possible Permutations, for a set of Configurations, are allowed. Continuing with the example, we could constrain the maximum imbalance between the two μGPUs to be a maximum of two TPCs, which would cause Permutation 6/8/9/9/9/9/9/9 to be excluded from the SKU because its imbalance across GPU Instances is three TPCs.

While the example embodiments are useful in connection with such MIG features, the described technology can be used in other contexts including any architecture having a "front end" interface which can divide computation resources of a "back end." In such architectures, isolation between divided resources can be provided by various techniques such as memory/cache partitioning, allocation of addition engines such as copy, video decoding/encoding, jpeg decoding, optical flow etc. The present technology in some embodiments also allows time slicing of a single simultaneous multiple context engine (which may comprise multiple GPCs for example), where two or more contexts share the engine. The described technology further allows load balancing between plural such engines where 3 or more processes may be balanced across two or more engines.

Dynamic TPC Disablement (DTD)

Figures 2A, 2B, 2C:
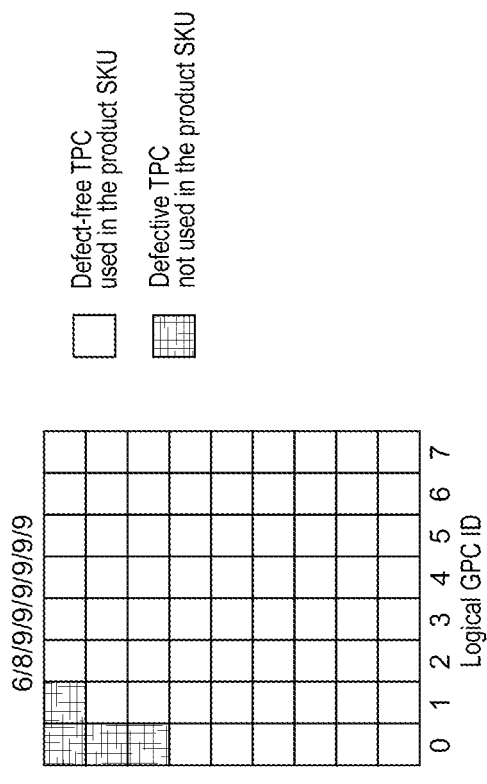
FIGS. 2A, 2B & 2C show three different example GPU chip configurations.
Figure 3:
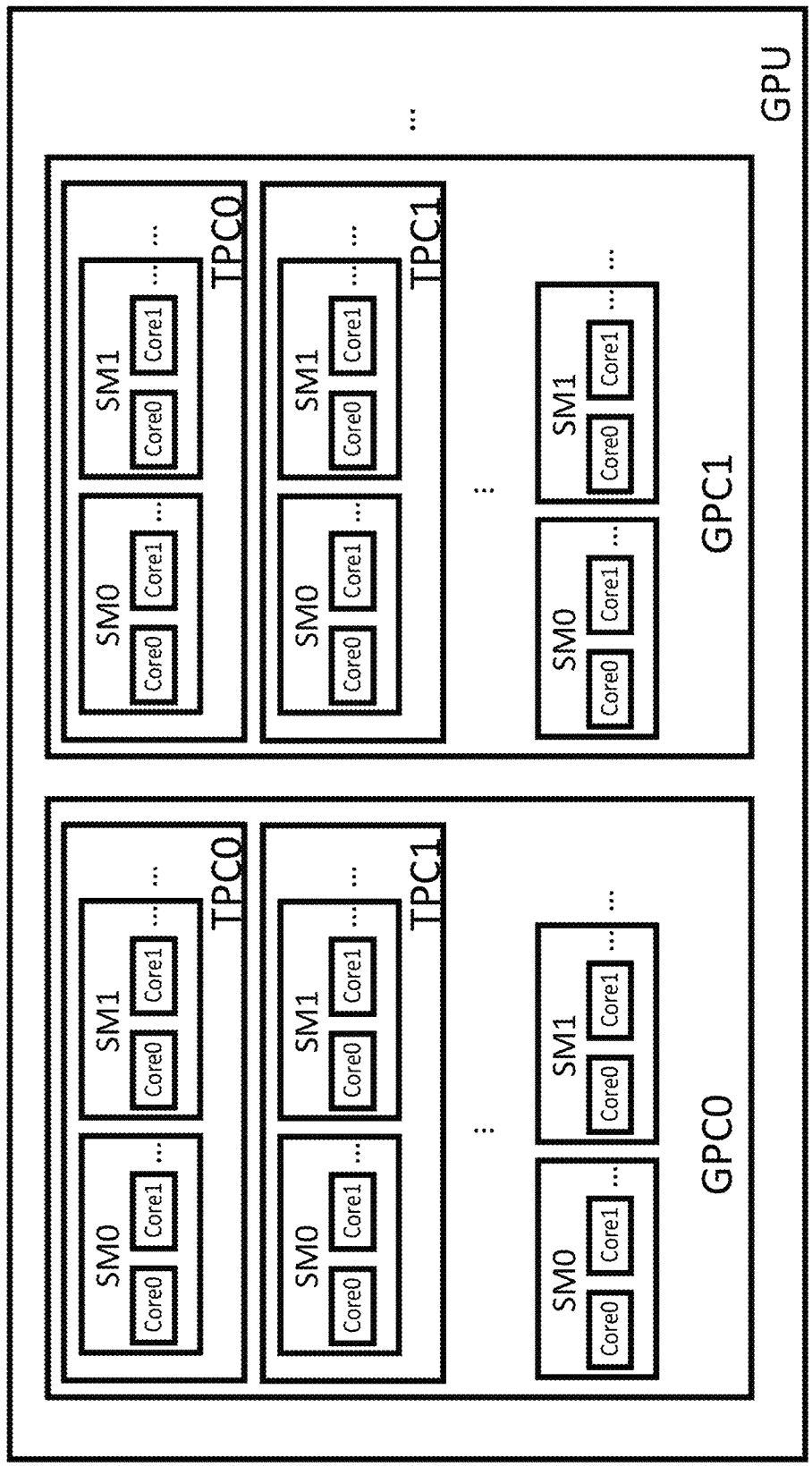
FIG. 3 shows example prior art GPU Graphics Processing Clusters (GPCs).
Figure 4:
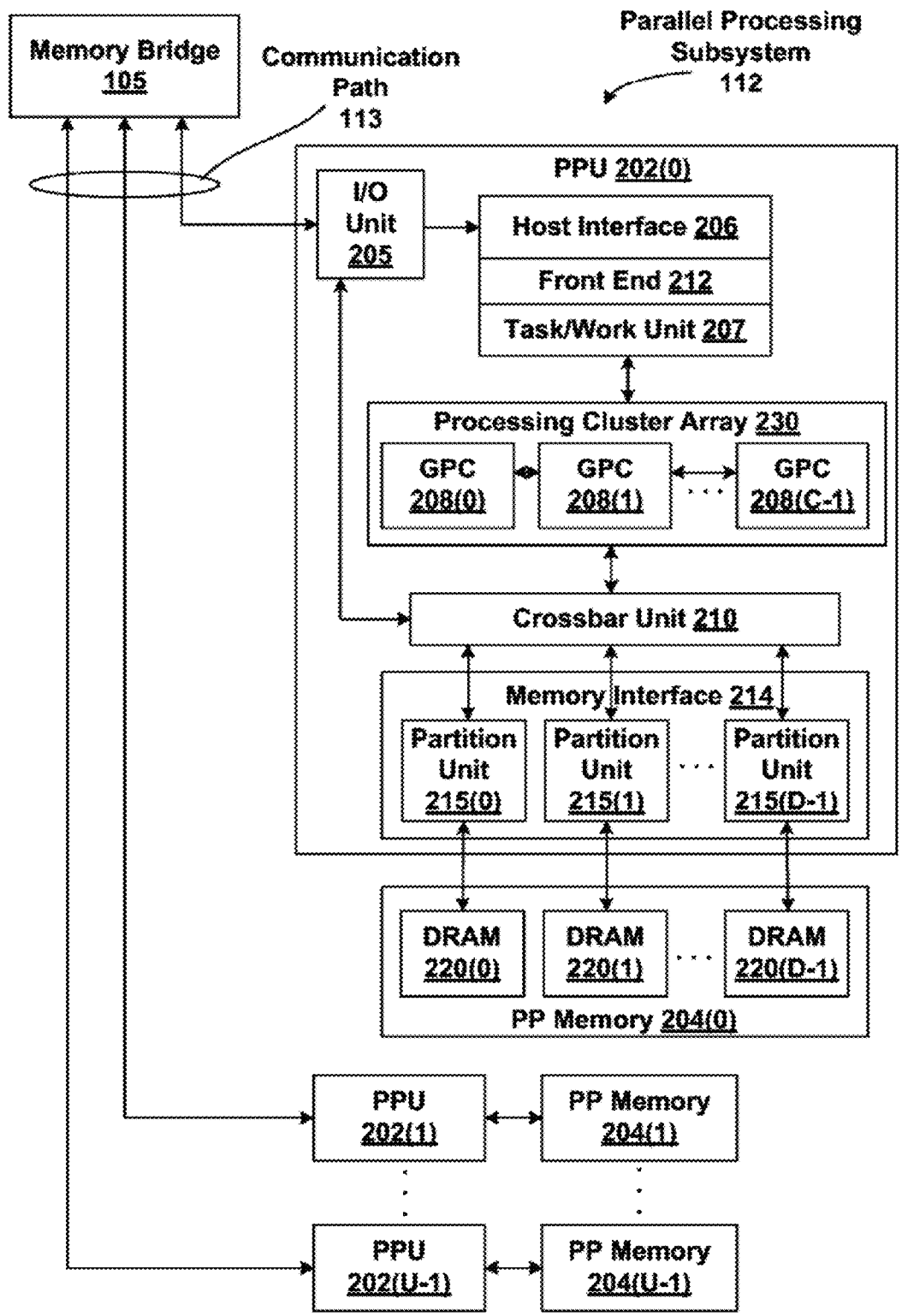
FIG. 4 shows an example prior art GPU hardware with an array of graphics processing clusters.

Referring back to three configurations of FIGS. 2, 2B, 2C, the previous way to split chips in a corresponding SKU for MIG was to make 8 Instances by reducing all GPCs to 6 TPCs. This means that 20 TPCs will not be used. But turning off 20 functional TPCs is undesirable from a performance perspective. In such an arrangement, half of the GPU would have 24 TPCs, a quarter of the GPU would have 12 TPCs, and an eighth of the GPU would have 6 TPCs.

In contrast, using the new vGPC technology, it is possible to make 8 Instances and selectively enable/disable TPCs as reconfiguration proceeds. Thus, each half GPU has 32 TPCs, each quarter GPU has 15 TPCs, and each eighth GPU has 6 TPCs. In this case, the halves and quarters are much better than in the prior arrangement. Such a solution can also avoid a full reset that may be needed to reconfigure a GPU chip while allowing unused portions of the chip to be turned off when not needed and turned back on when needed, and also to dynamically reconfigure hardware partitions of the GPU so different numbers of users and/or applications can make use of differently sized hardware/processing partitions depending upon need.

Figure 14:
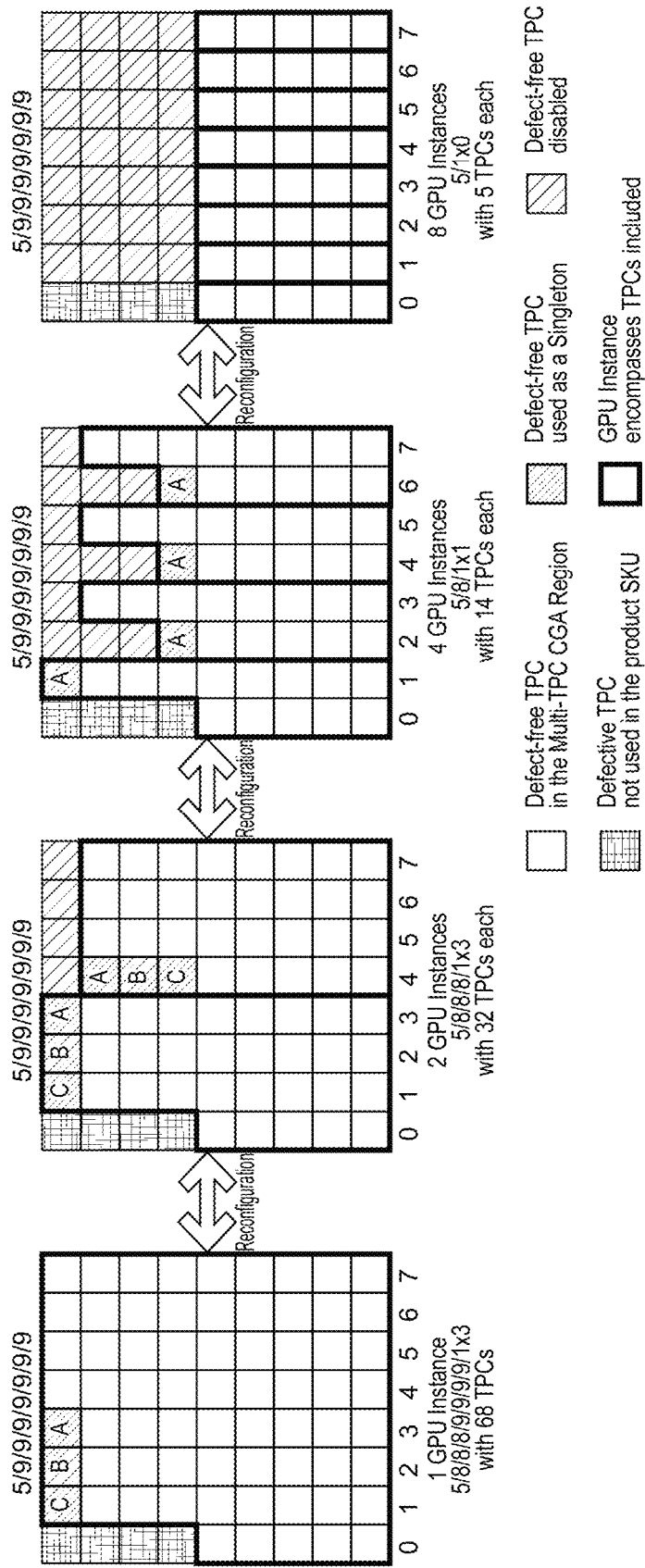
FIG. 14 shows example dynamic reconfiguration for multiple GPU Instances.

FIG. 14 shows such MIG transitions between a full GPU, two half GPU Instances, four quarter GPU Instances, and eight ⅛ GPU Instances using virtual GPUs. In the FIG. 14 diagram, the blocks with a large-spaced vertical crosshatch (as indicated in the legend) show TPCs that are dynamically, selectively, temporarily "turned off" by software ("soft floorsweeping") in order to have an identical number of active TPCs in each GPC Instance. This facilitates migrating contexts between GPU Instance. Such dynamic, selective disablement is not typical "floorsweeping" since there is no permanent TPC disablement in a way in which the hardware becomes "aware" that the floorswept TPCs do not exist, the TPC outputs are clamped to certain defined fixed levels, and the TPCs are thus effectively cut out of the circuit and made inaccessible. Rather, this type of selective disablement is dynamic and reversible, is controlled by software, and is being performed not because there is anything wrong with the TPCs that are being turned off but instead is used to balance the number of TPCs between GPU Instances so that a single GPU can be dynamically subdivided to appear to software to comprise several smaller identical (or otherwise specified) chips (i.e., multiple GPU Instances each having the same or otherwise specified processing resources).

Some embodiments provide additional hardware to selectively turn TPCs on and off as needed without requiring a reset of the chip. A simple approach used by some embodiments is to dynamically, selectively, temporarily disable/enable sending work to TPCs on a selective basis without "floorsweeping" the TPCs, powering them on and off, making them inaccessible, etc. Such approach is equivalent to telling the other circuitry that the dynamically disabled TPCs are still present but should not be used. Because no work is sent to the dynamically disabled TPCs, their presence does not create any obstacles to migration. By way of analogy, this is like a hotel closing off a certain number of guest rooms simply by not assigning guests to stay in them, but continuing to heat, clean and otherwise support the rooms. By continuing to support the dynamically disabled TPCs with state updates, etc., the Work Distributor Circuit can reenable them at any time without any need to reconfigure the hardware in a more substantial way that may require a hardware reset.

In more detail, FIG. 14 shows an example single GPU configuration with three Singletons and a total number of 68 TPCs. When reconfiguring the GPU into two GPU Instances, each half GPU will also have a Skyline (in this case 8/8/8/5/1x3) because Singletons can be in different places relative to the GPCs. If the GPU were split into quarters (i.e., four GPU Instances), the same thing happens (i.e., all four subdivisions have the same Skyline 8/5/1x1 for a total of 14 TPCs) because Singletons can be in still different places relative to the GPCs. Migration might thus require Singletons to move between GPCs within the MIG instance. Furthermore, each GPU Instance will have its own Skyline, and uniform Skylines are helpful across GPU Instances to maintain the same number of TPCs in each GPU Instance.

Figure 14A:
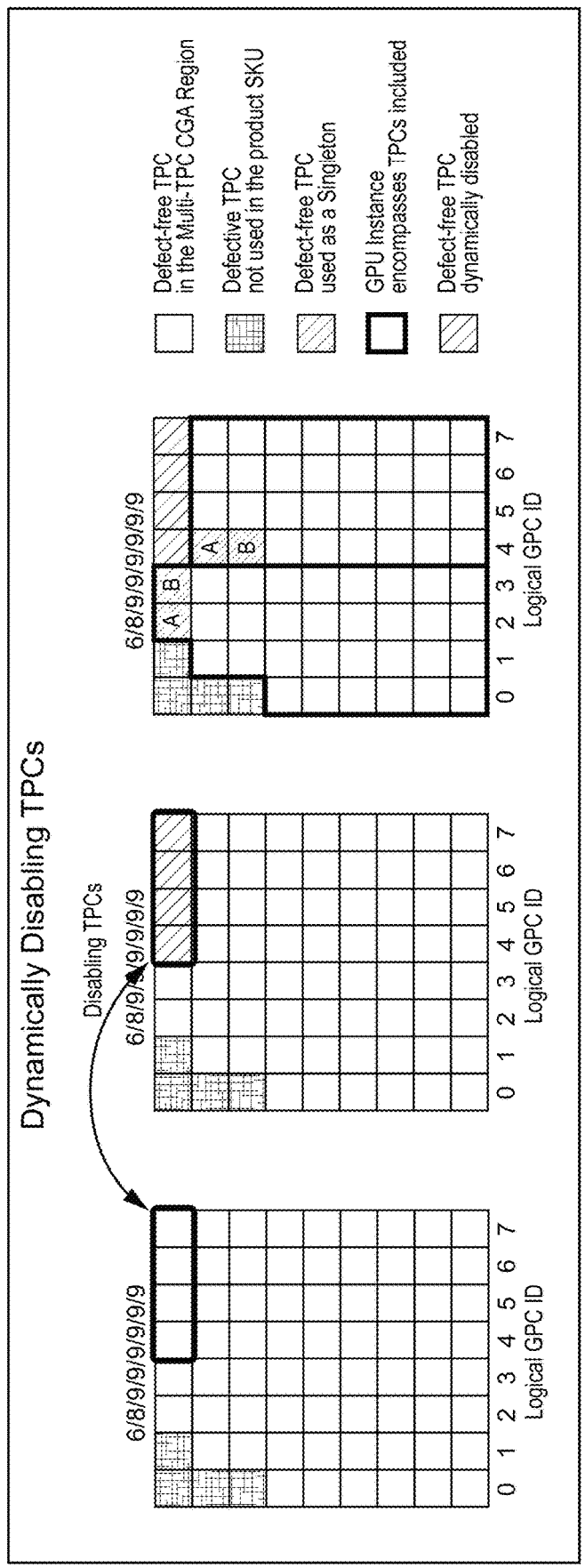
FIGS. 14A, 14B and 14C show example dynamic disablement of TPCs.
Figure 14B:
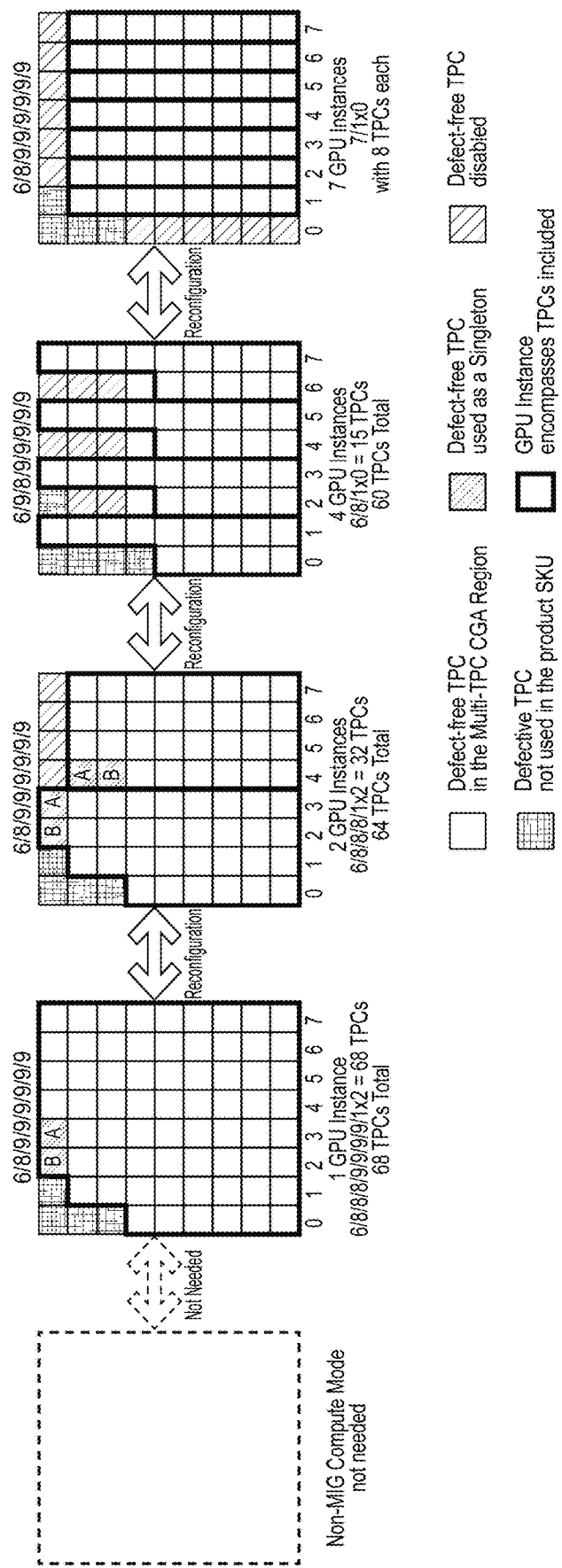
Figure 14C:
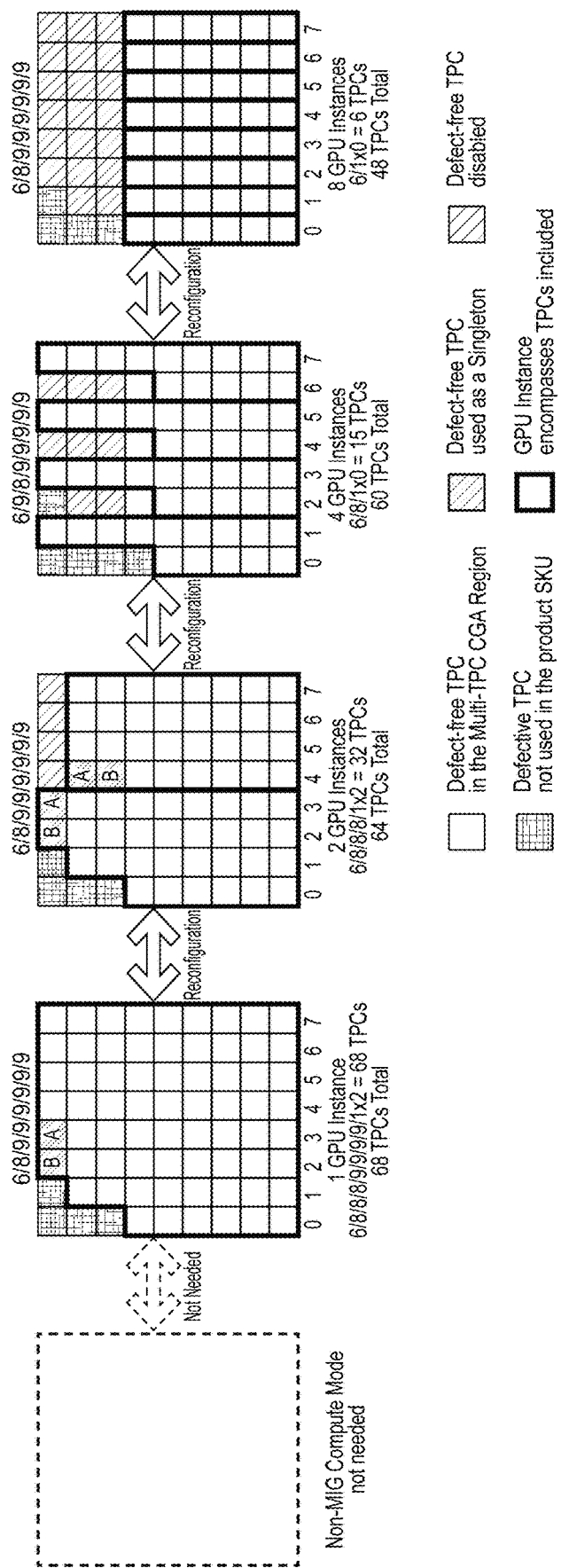

FIGS. 14A-14C illustrate TPCs being disabled under Dynamic TPC Disablement (DTD). On the left of this diagram is a 6/8/9/9/9/9/9/9 Configuration that is to be divided into two 4-GPC GPU Instances. In the transition from the left diagram to the central diagram, four TPCs are dynamically disabled. In the transition from the center diagram to the right diagram, two 4-GPC GPU Instance are created, both with 32 TPCs.

In one embodiment, Dynamic TPC Disablement ("DTD") is done without performing a full reset. Innovatively, Compute Work Distributor (CWD) 420 is programmed to not send work to disabled TPCs, but the TPCs remain functional. This dynamic disablement can be performed on one part of a GPU while another part of the GPU is busy doing work. Disabled TPCs still receive state updates, but never do any work because CWD is programmed to never send them any work. Floorsweeping per se sounds nice for TPC disablement until the designer faces questions of how to deal with a TPC disappearing, which changes how to enumerate logic GPCs, which changes all classes of access to TPC such as work distribution, register access, and potentially more (e.g., memory options in some architectures) while dozens of orthogonal processes are using shared resources affected by the floorsweeping changes. Thus, the technique used in example embodiments of just disabling scheduling to a specific TPC as described herein can solve a host of challenges that would may otherwise need to be addressed depending on the particular architecture, for example:

Any mechanism needing to disable TPCs should guarantee that no confidential user state can leak across disablement boundaries. For example, if the floorsweeping "clamps" are engaged and then software tears down the context, the state in the TPC would be retained. A further mechanism(s) would thus need to be provided to clear state, such as scan chain reset, clearing through Memory Built-In Self-Test ("MBIST"), asynchronous/synchronous reset, or provide a hardware guarantee of state clear after being reenabled—introducing opportunities for confidential state leakage. In contrast, by just disabling scheduling to a specific TPC, the TPC receives all of the commands to clear state between contexts and retains the same threat diagram.

Any such disabling mechanism should provide a way to maintain/restore engine state once the context is reenabled. This state is context independent state such clock gating enables. If the floorsweeping clamps are enabled and reset is applied as described above, a mechanism for restoring or a reset domain to retain state across floorsweeping enablement would be needed. In contrast, by just not distributing work, all power state and power state updates are received and executed on by the TPC.

Any such disabling mechanism should provide a way to handle out of band ("OOB") management of the disabled TPC(s). If floorsweeping is used, this implies register access to the TPC is disabled. There are a variety of ways a command bus and/or software can deal with this, but changes to hardware/software would be needed. In contrast, by leaving the TPC enabled but unscheduled, the register access or other OOB access simply works.

Any such disabling mechanism should be designed to not induce glitches. For example, floorsweeping clamps in one example GPU architecture are applied asynchronously—which means signals from the TPC may change values such that single cycle time constraints are not met. In previous hardware, changes are made and then all logic surround the boundary is reset—clearing any glitches. This forced the reset in previous architectures. It is possible to time/retime floorsweeping signals in a variety of ways to resolve this issue, but once again hardware changes would be needed. By leaving the TPC enabled but unscheduled, the glitch problem does not exist as the floorsweeping signals are not modified.

An aspect of DTD is providing larger GPU Instances than are possible without DTD. For example, in the past, the three Configurations in FIGS. 6A, 6B, 6C would have required reducing the number of TPCs in all the GPCs to be only 6, for a total of 48 in-use TPCs (i.e., 2 GPU Instances with 24 TPCs each). DTD allows the same Configurations to use a total of 64 TPCs (i.e., 2 GPU Instances with 32 TPCs each).

Another example aspect of DTD is providing more GPU Instances than without DTD. For example, in past designs, a 7-GPC GPU could only have one "Half" Instance that has 4 GPCs. With DTD, a 7-GPC could have one "Half" with 4 GPCs and the other "Half" having 3 GPCs, as long as the total number of TPCs in each "Half" is equal and the Skylines are equal.

FIGS. 14B & 14C show some of these concepts. Using dynamic TPC disable, it is possible to now change the number of TPCs per GPC without a reset (e.g., Halves use 64, Quarters use 56). In addition, comparing FIGS. 14B & 14C, one can see that it is now possible to pick between seven 8-TPC "Eighths" (56 TPCs) and eight 6-TPC "Eighths" (48 TPCs). In contrast, the prior art approach did not allow this flexibility.

Example Improvements to Compute Work Distributor

The present technology provides further improvements to the CWD 420 circuit relating to scheduling work to a particular TPC. The compute work distributor (CWD) in each GPU chip includes various innovations to make vGPCs and Skylines work. These innovations include a means for determining which TPCs need to be treated as Singletons, and special case hardware to deal with Singletons.

In one embodiment, a Virtual TPC ID is a Primitive Engine Shared ("PES")-aware numbering assigned to the TPCs within a GPC after "floorsweeping" (see below). As is known to those skilled in the art, PES is used to implement Direct 3D StreamOut functionality of DirectX. See e.g., https://devblogs.microsoft.com/pix/hardware-counters-in-gpu-captures/. The Virtual TPC ID numbering may follow a uniform pattern such as starting at 0 for the first non-floorswept TPC of the first PES in every GPC, assigning the next ID to a non-floorswept TPC in the next PES and so on. This effectively ensures that continuous virtual TPC IDs will be in different PESs and will help PES balanced distribution of work.

The following tables show example mappings between physical TPC IDs, logical TPC IDs and virtual TPC IDs for two different floorswept configurations:

TABLE I

| Physical TPC ID | GPC0 Logical TPC ID | GPC0 Virtual TPC ID |
|---|---|---|
| 0 | 0 | 0 |
| 1 | 1 | 3 |
| 2 | 2 | 6 |
| 3 | Bad/floorswept | — |
| 4 | 3 | 1 |
| 5 | 4 | 4 |
| 6 | Bad/floorswept | — |
| 7 | 5 | 2 |
| 8 | 6 | 5 |

TABLE II

| Physical TPC ID | GPC0 Logical TPC ID | GPC0 Virtual TPC ID |
|---|---|---|
| 0 | 0 | 0 |
| 1 | 1 | 3 |
| 2 | 2 | 5 |
| 3 | 3 | 1 |
| 4 | 4 | 4 |
| 5 | 5 | 6 |
| 6 | Bad/floorswept | — |
| 7 | Bad/floorswept | — |
| 8 | 6 | 2 |

Figure 23:
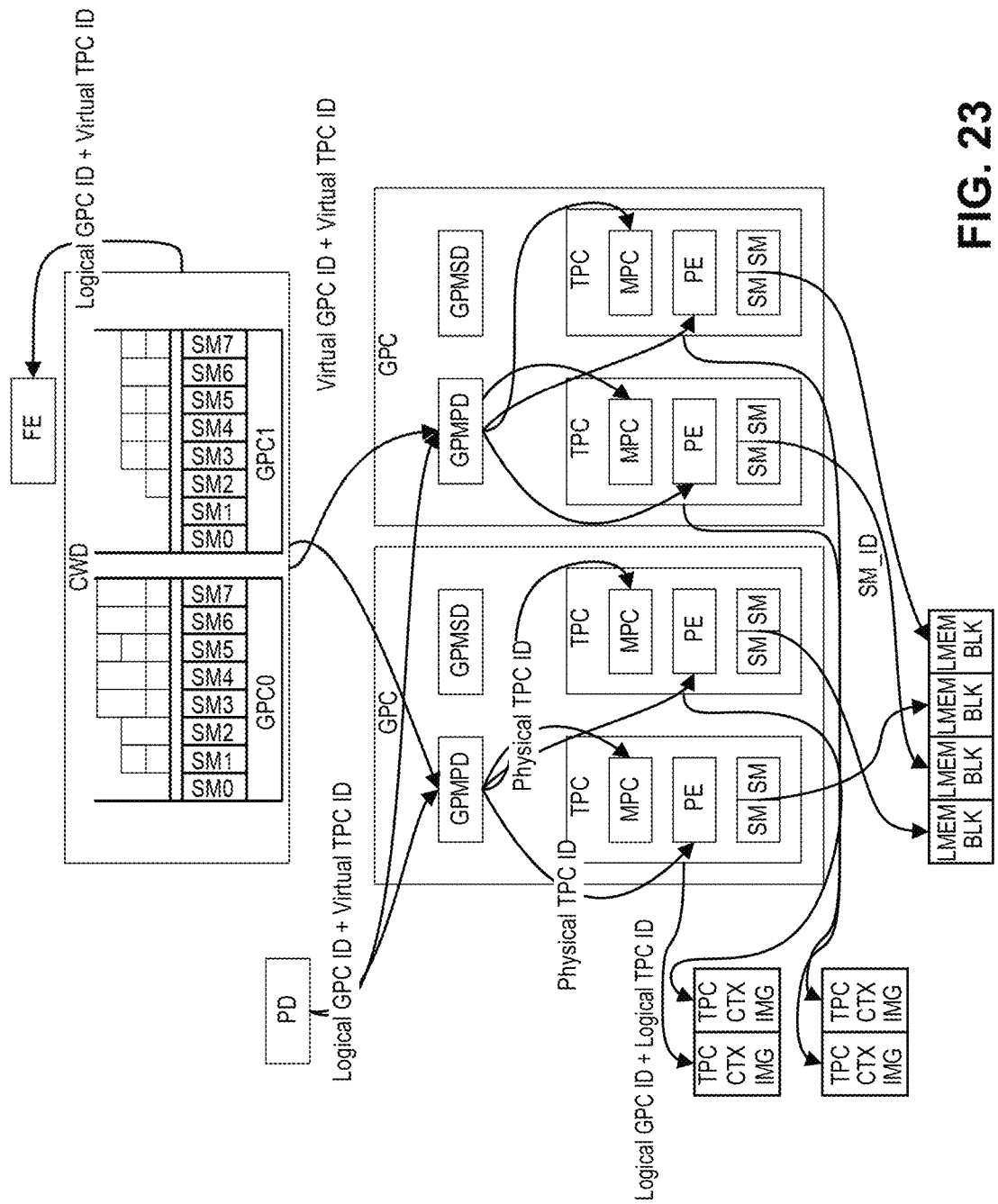
FIG. 23 is a block diagram of an example conversion to and from virtual GPC IDs.

In example embodiments, the GPM uses physical TPC ID to index to MPC and PE (see FIG. 23), and the TPC uses its logical TPC ID to map its TPC context image for context saves/restores. In more detail, FIG. 23 shows that in one embodiment, CWD 420 (which receives launch commands from a host CPU) issues launch commands to the hardware processing resources based on virtual GPC ID and virtual TPC ID. A crossbar provides flexible communication transport of such launch commands from the CWD 420 and any/all physical GPCs on the chip. Within each GPC, a circuit called "GPMPD" converts the virtual GPC ID and virtual TPC ID to a physical TPC ID which addresses or selects the appropriate TPC processing circuit(s). Each TPC includes an MPC (multi-pipe controller) and a PE engine block that receive and process based on the physical TPC ID. The PE block saves context and state for migration and other purposes based on logical GPC ID and logical TPC ID as informed by a "PD" register block that provides GPMPD with the mappings between logical GPC ID and virtual GPC ID.

In previous designs, the CWD 420 sent compute work to GPM based on SM-IDs—namely, global TPC IDs obtained by interleaving virtual TPC ID across all GPCs. The present technology provides a new "Virtual GPC ID" obtained by numbering GPCs in decreasing order of TPC counts, i.e., the GPC with lowest number of floor-swept TPCs (meaning highest number of functioning TPCs) is assigned to have the lowest virtual GPC ID. To resolve ties between two GPCs with same number of TPCs, it is possible to use logical GPC ID (lower logical GPC ID will receive the lower virtual GPC ID).

CWD 420 may now view the GPU in terms of two IDs: migratable TPC ID+virtual GPC ID. Migratable TPC ID may be the same as Virtual TPC ID in previous implementations for Virtual GPC ID 0-7 (as FIG. 23 shows). For Virtual GPC ID 8-23, this value can always be 0. Thus, when we need the Virtual TPC ID for TPCs in Virtual GPC 8-23, it may be converted from '0' to original Virtual TPC ID. It is possible to refer to CWD's Virtual TPC ID as "Migratable TPC ID" to make this distinction for virtual GPC ID 8-23.

There is a certain amount of circuitry within the CWD 420 that is used to schedule work onto a given TPC. Since there are many TPCs within a GPC or other hardware partition, a substantial amount of chip substrate area is devoted to such per-TPC scheduling. Furthermore, to accommodate the MIG innovation described above (which in one embodiment can divide a GPU into multiple, e.g., up to 8, independently operable GPU Instance portions), a GPU now needs eight CWD 420 circuits (one for each of the eight GPU Instances). Furthermore, one example GPU implementation is able to support N Singletons and associated N virtual GPCs (e.g., where N could equal 16 as one example to provide vGPC8, cGPC9, . . . vGPC23).

A straightforward way to implement the CWD 420 would be to construct it to support the maximum number of TPCs that could be provided on a GPU chip including the additional virtual GPCs that each support a Singleton TPC. However, such an implementation might require a significant amount of chip area.

Figure 15:
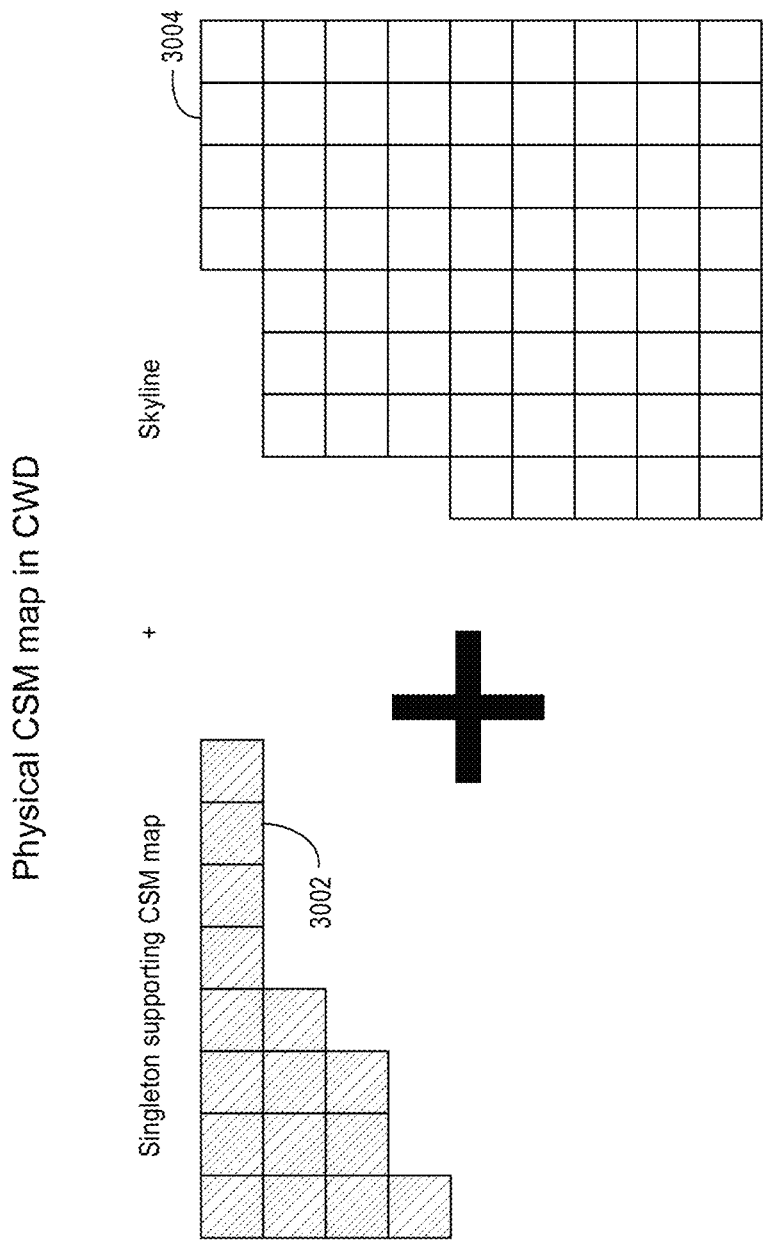
FIG. 15 shows a Singleton supporting CSM map and a Skyline.

In another example implementation, a mapping is provided to per-TPC subunits within CWD 420 See FIG. 15 which shows mappings to a first section 3002 providing vGPCs to up to a certain number N of Singleton TPCs and also to a second section 3004 of up to a certain number Q of TPCs provided as part of a multi-TPC CGA Region for a given product SKU.

Figure 16:
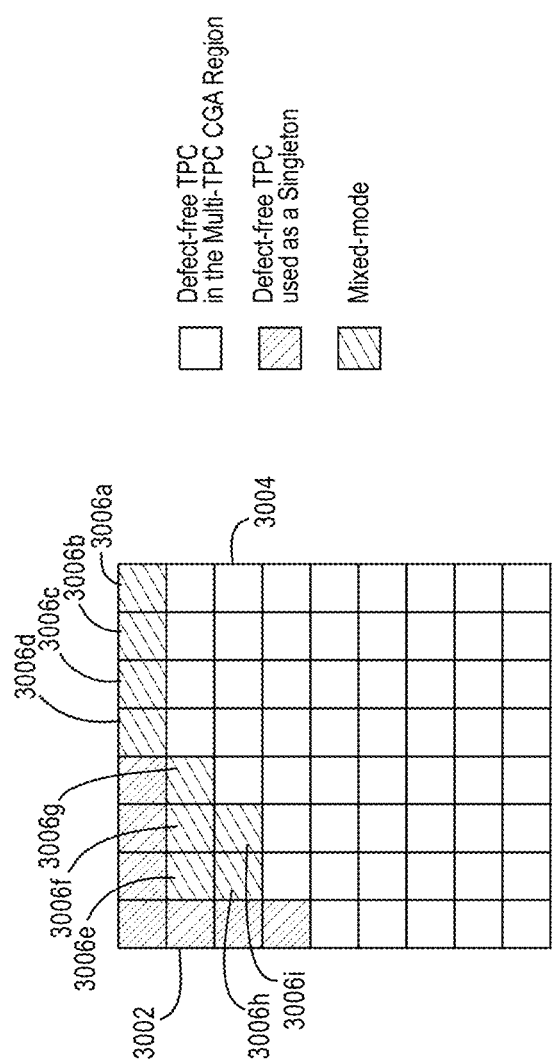
FIG. 16 shows how the Singleton supporting CSM and the Skyline can be combined together.

FIG. 16 shows the first section 3002 combined with the second section 3004. In the combined representation, there are sixteen TPCs that can be used as Singletons and 56 non-Singleton TPCs. In the example shown, because Singletons are in fact embedded within the chip's physical GPC circuitry and are interconnected with other TPCs within that circuitry, the 16 TPCs shown can each be assigned to act as a Singleton or they could be assigned to act as a TPC within the virtual GPCs from vGPC0-vGPC7. There need not be any Singletons and the Skyline would be built higher with TPCs that are part of the physical GPCs. Thus, the cross-hatched block in FIGS. 15 & 16 could be assigned as virtual GPCs 8-23 or they can have the modular TPC ID represented by M of 0-8 within the virtual GPCs 0-7. The total sum of Singletons and non-Singleton TPCs within the GPCs cannot exceed 72 in this particular example. However, the shapes of the two regions shown in FIG. 16 are quite useful for building a GPU. Chips manufactured with fewer defects can be designated with product SKUs that define more TPCs within region 3004 and fewer Singletons within region 3002. In such a case, as FIG. 16 shows with the blended or "mixed mode" cells 3006, some of the TPCs 3002 that could be configured as either Singletons or as TPCs that are part of a multi-TPC CGA Region (and are thus capable of executing CTAs of a CGA that will occupy more than one TPC). Thus, in this example, only the TPCs 3002 can be configured as Singletons to support this particular Skyline but each processor that can be configured as a Singleton can alternatively be mapped to other vGPCs in the GPU. The Skyline can reduce supportable Singleton count if a Singleton-capable TPC is used to participate in a multi-TPC GCA Region instead.

It may be noted here that in one embodiment, collecting a plurality of processors that could be configured as Singletons together to form a new multi-TPC virtual GPC may not be possible if the GPC is to be compatible with CGAs. In particular, as described in the copending commonly-assigned patent applications identified above, the concurrent-processing guarantees that the hardware provides for CGAs in some embodiments requires certain hardware-based cooperation (e.g, synchronization, data locality, messaging interconnections, etc.) between the various TPCs in a GPC that is to run a GPC CGA. Thus, there will be CGAs that can run on TPCs within the multi-TPC CGA Region of a Skyline but cannot run on a Singleton TPC. Meanwhile, the Singletons shown in FIG. 16 could be physically located in any GPC circuits on the chip—meaning that in the general case they are interconnected to one another in a way that provides the cooperative guarantees a TPC requires to participate in running a GPC CGA. On the other hand, this constraint may not be present for non-CGA based CTAs or in other implementations having different constraints.

In this particular example, the TPCs 3006 in the blended "mixed mode" cross-hatching are not used as Singletons because they are needed to be part of the multi-TPC CGA Region for the product SKU. Such configuring of TPCs as either Singletons or as part of multi-TPC GPCs in one embodiment are informed by how many Singletons are needed to fulfill the requirements of a particular product SKU. The TPCs will be mapped to virtual GPCs in both cases, but each TPC configured as a Singleton will be mapped to its own dedicated vGPC whereas TPCs not configured as Singletons will be mapped together with other TPCs to a vGPC containing a plurality of TPCs.

Such CWD reconfigurable CSM mapping provides a mechanism where a limited number of modules (CSMs) have the flexibility to be either configured to be mapped to a Singleton TPC or a TPC which is part of a non-Singleton group. This implementation saves considerable area when compared to having every CSM support Singleton and non-Singleton TPCs.

Figure 17:
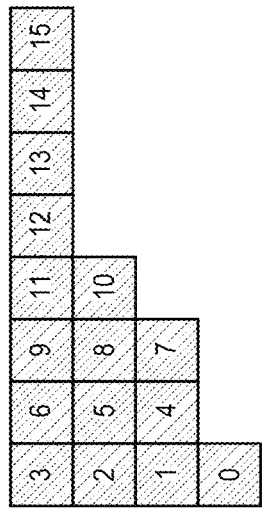
FIG. 17 shows an example Singleton numbering scheme.
Figure 18:
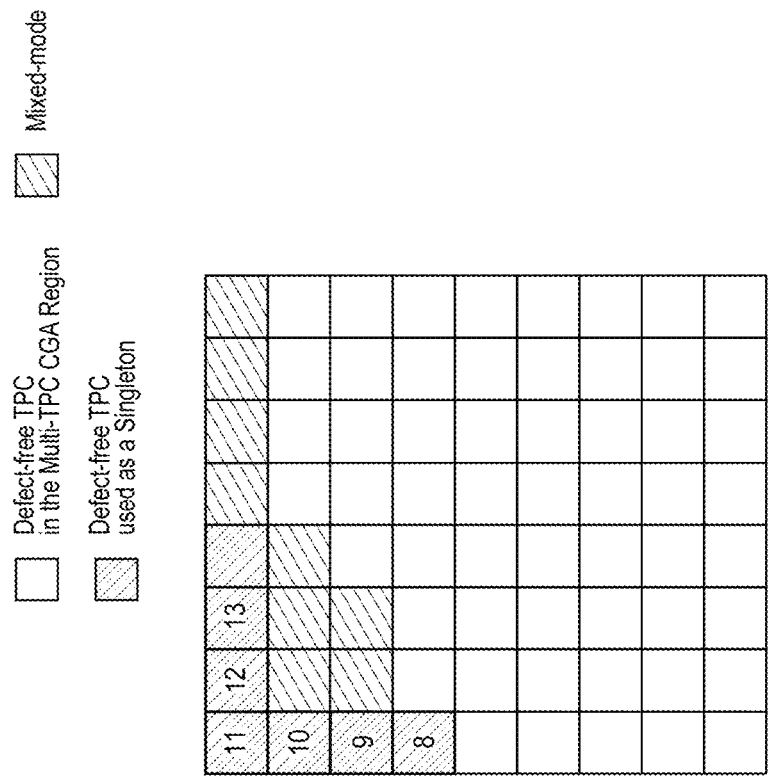
FIG. 18 shows an example incorporation of Singletons into a Skyline.
Figure 18A:
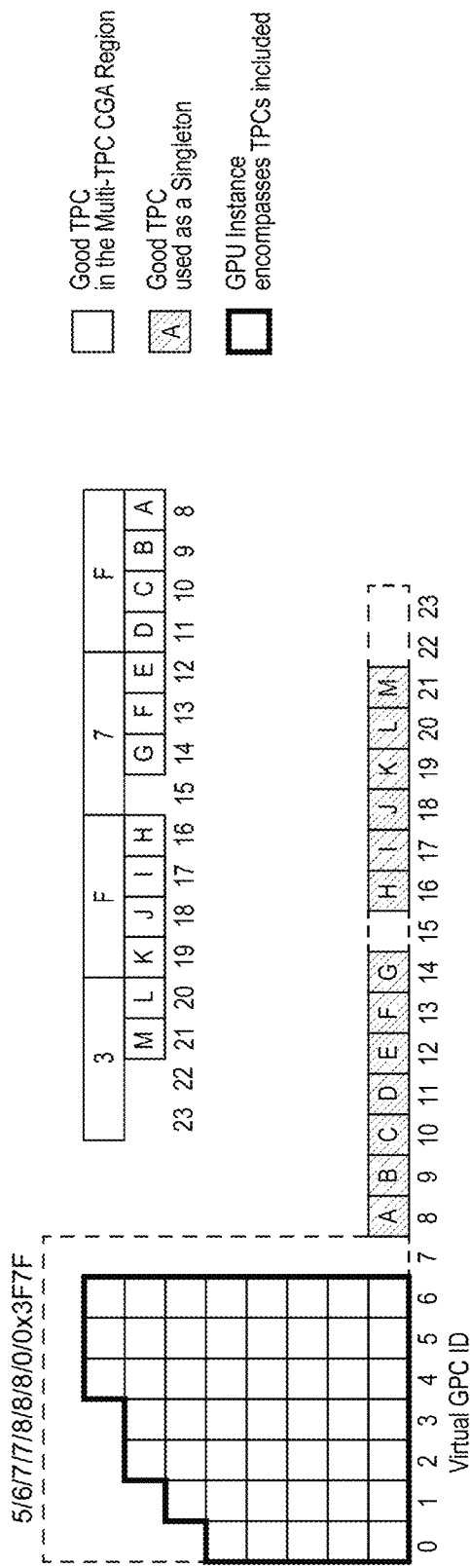
FIG. 18A shows an example Singleton mask.

In one embodiment, Singletons may be populated in a fixed order as shown in FIG. 17. For example, if a GPU chip is programmed for 6 Singletons, then the vGPC labeling as shown in FIG. 18 results. The rest of the chip and software need not know about this mapping internal to CWD 420; no changes to other units are required, and migration is supported. However, the above implies that in some embodiments, the Skyline for a product SKU is considered to also include the Singleton count. This Singleton count may be represented as a multibit mask that indicates which Singleton-capable CSMs of the CWD 420 on the GPU chip are enabled to support Singletons and which ones are not—Note that each of these Singleton enabled CSMs may be configured to statically map to any physical TPC in the GPU. This mask may be embedded in the firmware/hardware of a GPU chip, flashed at time of chip testing/binning, and used to program the combinatorial logic of the CWD 420 circuit. See FIG. 18A illustration of a Singleton mask layout in which bits in the mask correspond one-to-one with single-TPC vGPCs 8-21 (additional vGPCs 22, 23 can be used in some embodiments).

Figure 19:
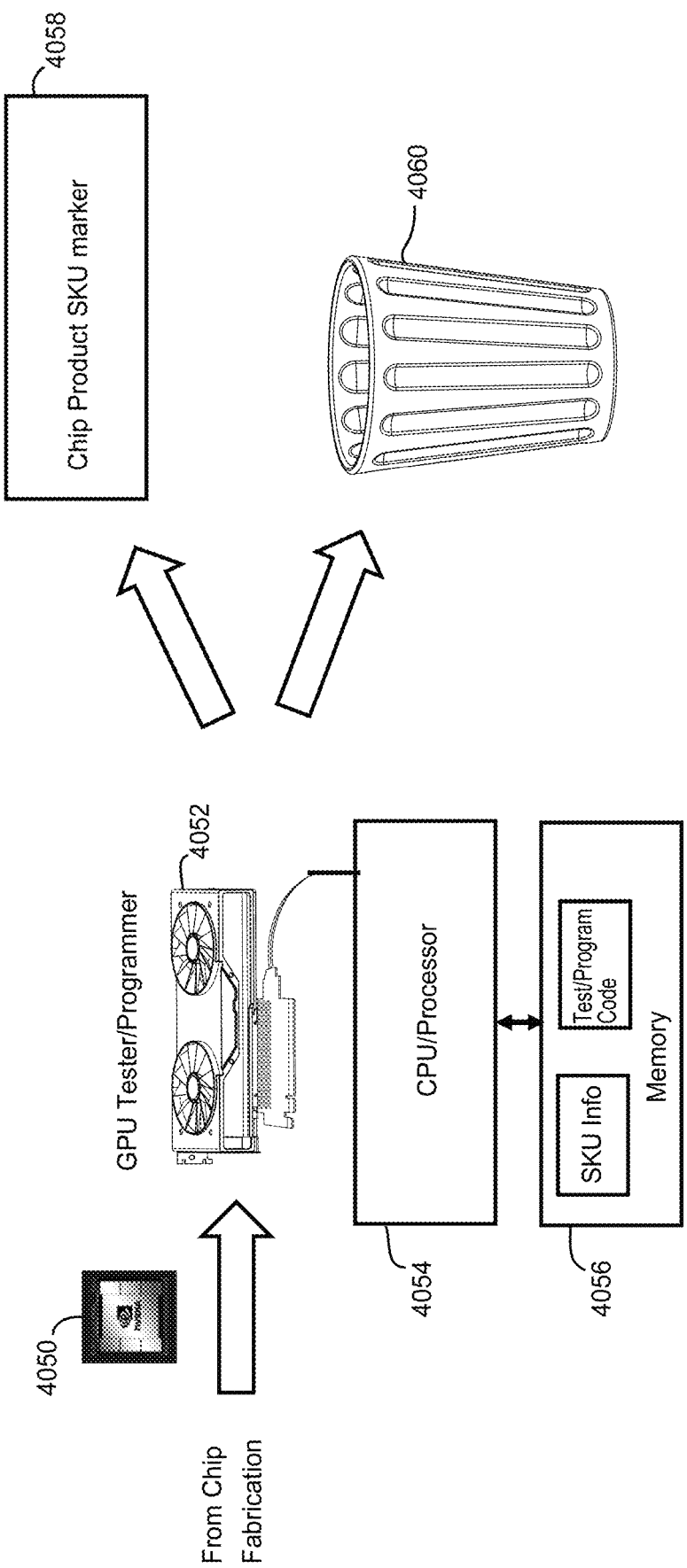
FIG. 19 shows an example GPU tester/programmer.
Figure 20:
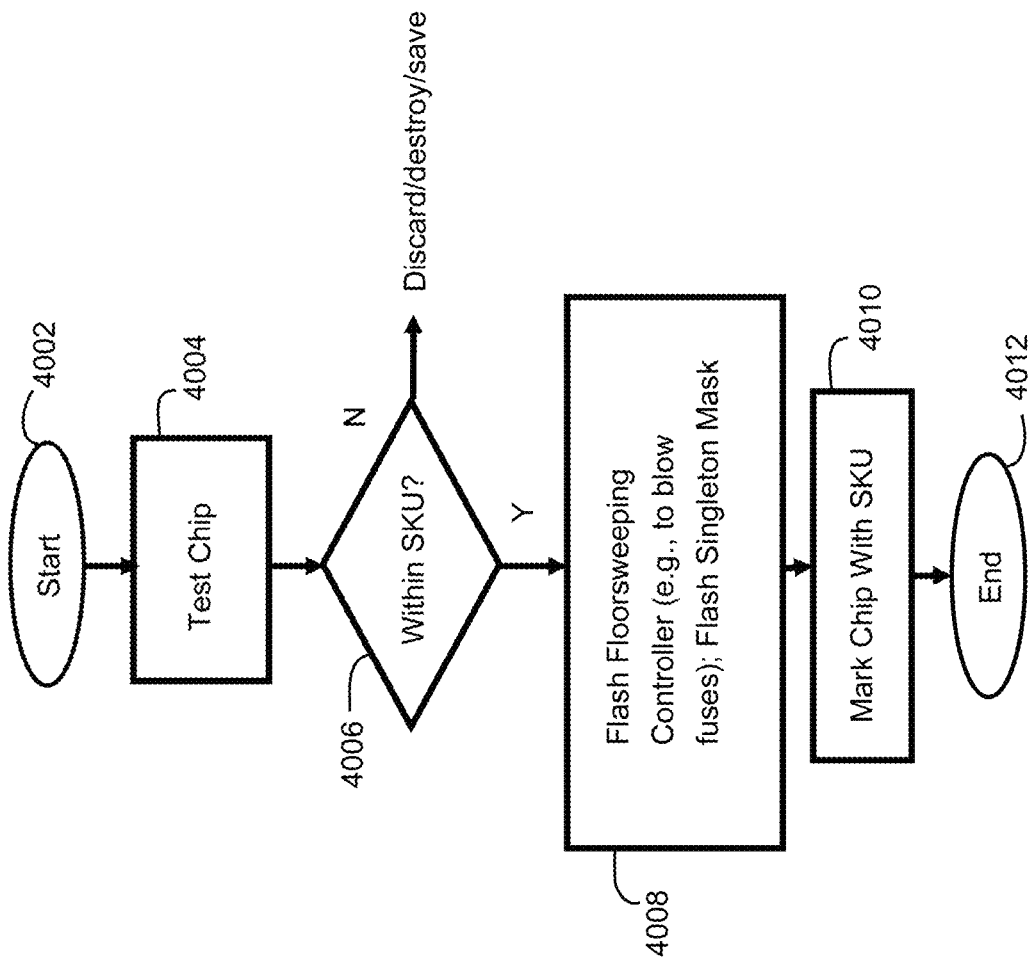
FIG. 20 shows an example GPU testing/programming process.

FIGS. 19 & 20 show an example chip programming arrangement and flowchart. In the example shown, a fabricated chip is tested (block 4002) using a chip tester/programmer 4052. When a processor 4054 that is connected to the chip tester/programmer 4052 determines, based on executing program control instructions stored in a non-transitory memory 4056 that test and exercise the chip using well known conventional testing/exercising algorithms, whether the manufactured chip 4050 has sufficient flaws so it does not meet the minimal functional requirements of any product SKU ("N" exit to decision block 4006), or whether it complies with a product SKU Skyline ("Y" exit to decision block 4006). If the chip is too defective, the chip is discarded/destroyed (4060). Note there can be multiple product SKUs. Discarded chips may be stored for future inclusion in lower-performance SKUs. Otherwise, the processor 4054 controls the tester/programmer 4052 to write floorsweeping instructions to the chip to blow certain fuses around the defective hardware portions to make those portions inaccessible (block 4008). In addition, based on a comparison between the chip configuration after floorsweeping with one or more stored product SKU definitions such as stored Skylines in memory 4056, the processor 4054 flashes the Singleton mask (see FIG. 18A) within the chip to indicate which TPCs are enabled to support Singletons (block 4008). The chip is then marked with the product SKU (block 4010)— which associates the chip with a Skyline for that particular product SKU. As described herein, any given chip can often be classified in a number of different product SKUs, and the processor 4054 can thus take customer demand into account when classifying the chip, floorsweeping the chip and flashing the chip's Singleton mask.

Example Hardware Implementation of Advanced Compute Work Distributor

In an example such GPU chip, the fabrication process is used to create a certain number Q (e.g., 72 total) of physical TPCs on the semiconductor substrate, with the physical TPCs clustered as physical GPCs (for example, 8 GPCs each comprising 9 TPCs). Similarly, the CWD 420 of the GPU chip could be fabricated to have Q CSM scheduling circuits—one for each TPC with a one-to-one correspondence between CSMs and TPCs. Within CWD 420, each SM or TPC is represented by a per SM hardware circuit called the CSM. The CSM contains a task selection state machine that selects between TASK_ASSIGN, STATE_SYNC and CTA_LAUNCH. In addition, the CWD 420 of the GPU could be fabricated to have R additional CSM scheduling circuits—one for each of a maximum number of Singletons the chip might need to accommodate. However, such an arrangement would take up a substantial amount of real estate.

Therefore, in one embodiment, each CSM portion of the CWD 420 could be structured to run in two alternative modes: either to schedule a Singleton TPC or to schedule a TPC that is part of a multi-TPC CGA Region. However, most CSMs in any given product SKU will never be called upon to schedule a Singleton TPC. Accordingly, (Q-R) CSMs within CWD 420 can be structured operate as single-mode CSMs to schedule work for TPCs that are part of a multi-TPC CGA Region, and the remaining R CSMs within CWD 420 can be structured as dual-mode circuits that can schedule work for a Singleton (first mode) or instead alternately schedule work for a Singleton-capable TPC that is grouped with at least one other TPC to form a multi-TPC CGA Region (second mode). Such modes can be controlled by the Singleton mask discussed above, in particular when the Singletons are placed as shown in a predetermined pattern with respect to the Skyline.

In an embodiment(s) shown in FIGS. 21A, 21B, 21C-1 & 21C-2, the main compute work distributor ("CWD") hardware circuit 420 is used to launch CGAs on the GPU while providing a hardware-based guarantee that all CTAs of a CGA can be launched at the same time and also implementing the virtual GPC mapping described above. Such arrangement enables floorsweeping of non-functional TPCs while ensuring that a dual-mode CSM will be connected to each TPC that will be allocated as a Singleton no matter which non-functional TPCs are floorswept. The resulting design not only saves chip area but also increases performance due to decreased distance between the CSM circuits and the rest of the CWD circuitry.

Figure 22:
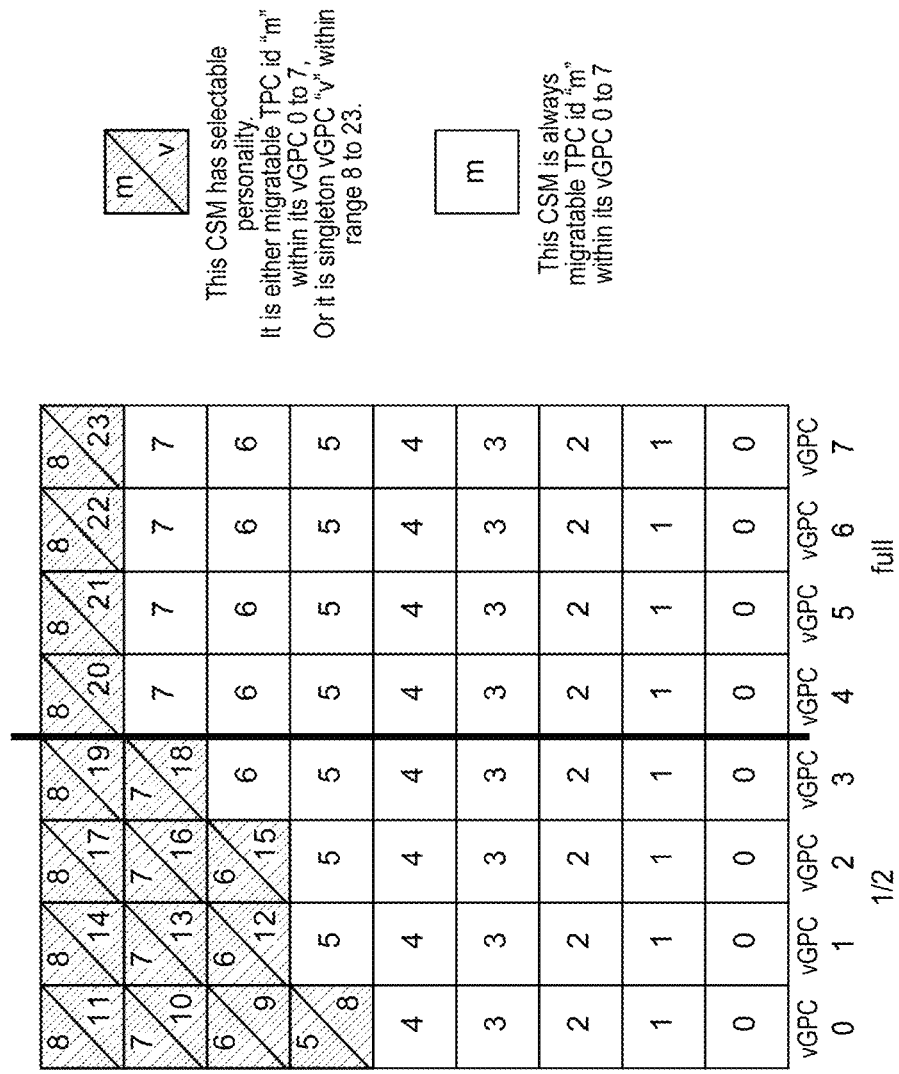
FIG. 22 shows example Skyline divisions for multiple GPU Instances.

In addition, in one embodiment, the CWD 420 circuit is designed to operate as a "full width" or "partial width" work distributor depending on the floor swept configuration of the GPU. As shown in FIG. 22, a full width CWD 420 supports 16 Singletons plus additional non-Singleton TPCs and a half width CWD supports 12 Singletons plus additional Non-Singleton TPCs. In still another embodiment, a quarter width CWD supports 7 Singletons plus additional Non-Singleton TPCs. This arrangement saves substrate area and also uses available substrate area to increase functionality where it is most needed—providing additional Singletons in more heavily floorswept GPUs. A single GPU chip could have multiple different versions of these CWD circuits to provide combinations of functionality.

For example, one version is called "full" build and supports distributing work to all 72 TPCs in the perfect GPU. The other is called "reduced" and supports distributing work to at most 36 TPCs in the GPU. This can work because CWD understands the 'virtual TPC' naming space via PM register programming that decouples CWD's view of TPCs in the GPU from the 'logical' or 'physical (and corresponding floorswept)' view.

Some example embodiments provide a ramchain feature—a ring-based backdoor access mechanism for copying internal pipeline registers and memory state from an SM executing a shader program to context state storage. See e.g., US20140184617. In one embodiment, the two versions discussed above can be context switched via a ramchain new feature (referred to as "subclass") where the ramchain query can specify which subset of state in CWD it seeks to switch out and/or restore—for CWD these are termed CWD CORE and CWD_EXTRA—where CWD CORE is the "core" state which exists in both cwd_full and cwd_reduced builds of CWD. The CWD_EXTRA state exists only in the cwd_full build.

For the MIG feature, only one physical MIG controller (internally called a "syspipe" of which one example embodiment has syspipe0 to syspipe7 instances) needs to support "unpartitioned" scheduling to all 8 GPCs in the GPU. All other syspipes need at most support "½" MIG instances so only syspipe0 (choice of instance is basically arbitrary) needs to support "cwd_full" version, and all other syspipes (syspipe1 to syspipe7) only have physical support provided by "cwd_reduced" to schedule only ½ of the total perfect TPCs in the GPU. The result of this 'scaling down' of physical implementation of the work distributor results in area and power savings for the GPU.

Concerning ramchain subclass, since we have two classes of TPCs in one embodiment—gfx capable and compute only (i.e., asymmetrical resources), an example implementation can have two types of MPC which is a TPC unit. We can have scenarios where state needs to migrate from gfx MPC→compute MPC (in compute applications where source and target TPC should have the same SM_ID). So it becomes necessary to have the ability to separate out gfx and compute state in the MPC which is gfx capable so it is possible to save and restore only compute state when running compute applications and both gfx and compute state when running graphics applications. The ramchain is pre-existing hardware that helps save and restore state during context switch/migration. The technology herein adds the notion of a subclass to the ramchain—which is a method of organizing and tagging state in a unit to be independently selectable for save and restore. In this example the gfx capable MPC has compute state which is tagged using a default subclass and hence saved and restored always. In addition it has gfx state which is tagged using a gfx subclass which is saved and restored only when running gfx applications.

Flexible Migration

As discussed above, the technology herein allows differing TPC per GPC profiles to be included in the same product SKU, to increase the yield and TPCs counts. But differing TPC per GPC profiles causes a huge problem for migration. This is problem is solved by a further improvement relating to Flexible TPC Migration (FTM). In particular, in some embodiments, when migrating work from a source GPU chip to a target GPU chip, all of the work performed by a given GPC of the source GPU chip may not necessarily stay together. Rather, work a particular TPC of the given GPC performs on the source GPU may after migration be performed by two or more TPCs of the target GPC. The work is thus saved out and restarted on a per TPC basis rather than on a per GPC basis. A TPC's work getting split to two TPCs may for example occur where in the original execution context, the TPC was part of a large CGA group and had graphics functionality. If the target GPU in contrast only has a large CGA group on a GPC without graphics, it may not be possible in some embodiments to place the original TPC's image on a specific TPC that is both part of a large CGA and has graphics capability. But now assume a different case where a source GPC physically has both Singletons and a large CGA. If there doesn't exist on the target a GPC with both the same CGA size and the same number of Singletons, then the source GPC's CGA TPCs and Singletons may need to be separated on the target in order to avoid a non-migratable scenario.

Figure 24:
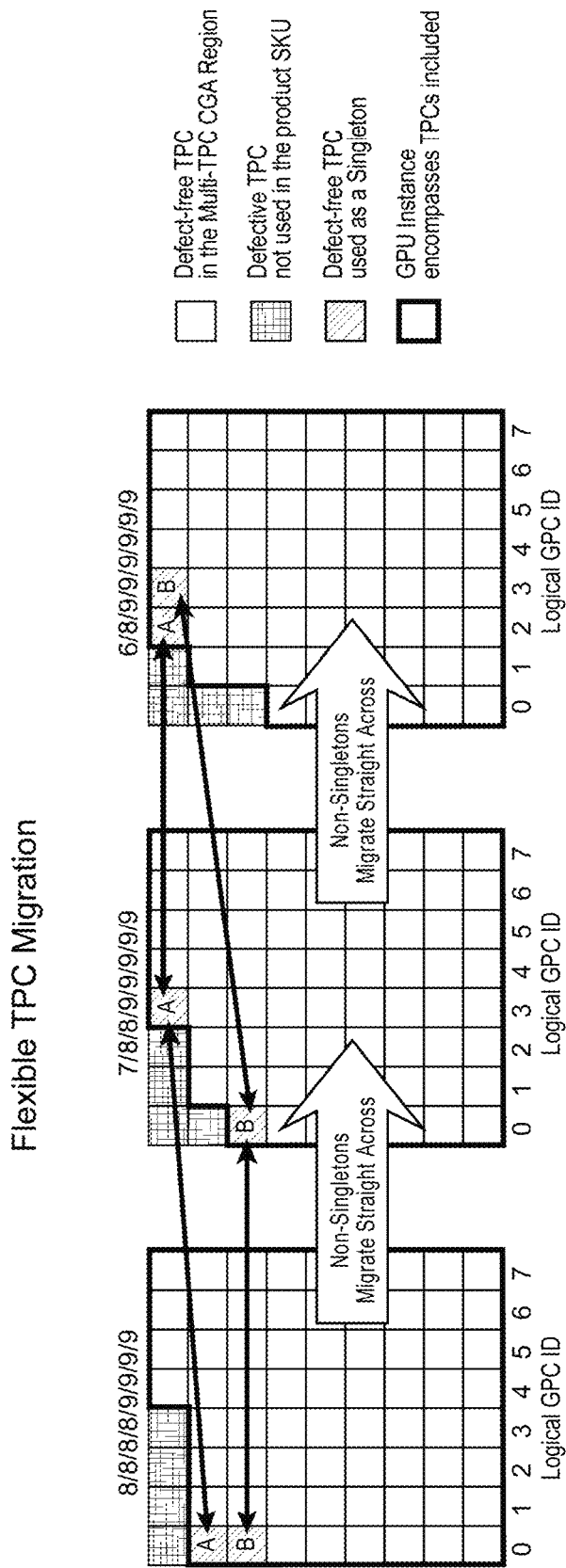
FIG. 24 illustrates flexible TPC migration.

FIG. 24 shows example flexible migration between Configurations shown in FIGS. 6A, 6B, 6C, 7A, 7B, 7C and 8. The group of non-Singletons (the Multi-TPC CGA Region 3000) migrate straight across (i.e., these TPCs do not change Logical GPC), but the Singletons can move between Logical GPCs. More precisely, when a Context save is done and then restored to a GPU with a different Configuration, the suspended work that was running on the Singletons can move from one Logical GPC to a different one. In the example of FIG. 24, in the leftmost Configuration, Singleton A is in Logical GPC 0, but its work migrates to/from Logical GPC 3 in the center Configuration, and can also move to/from Logical GPC 2 in the rightmost Configuration.

In prior chips, TPC Context state was saved on a per-GPC basis. In the present technology, to facilitate FTM, TPC Context state is saved on a per-TPC basis. There are also advantages to preserving the Virtual GPC IDs. Also, in addition to the per-TPC state, there is per-GPC state that is not part of the state of or in any TPCs, so special care must be taken there.

In addition to FTM, the present technology provides Flexible GPC Migration (FGM) that handles the case where the migration source and destination GPUs have a different number of GPCs. For example, migration could be between Configurations 6/9/9/9/9/9/9/0 and 5/7/8/8/8/8/8/8, where the "0" indicates a GPC that is floorswept away (i.e., the entire GPC is considered non-functional). The innovation of FGM includes generating GPC state for a GPC that does not exist in the source GPU.

Figure 25A:
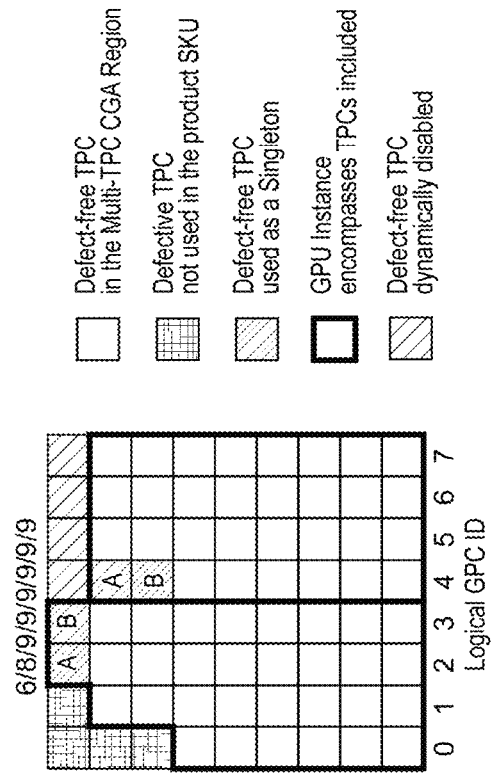
FIGS. 25A, 25B and 25C show an example multiple-Instanced GPU.
Figure 25B:
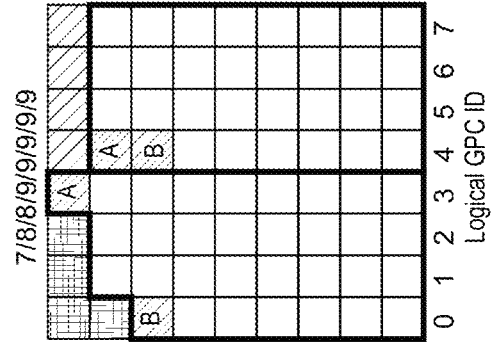
Figure 25C:
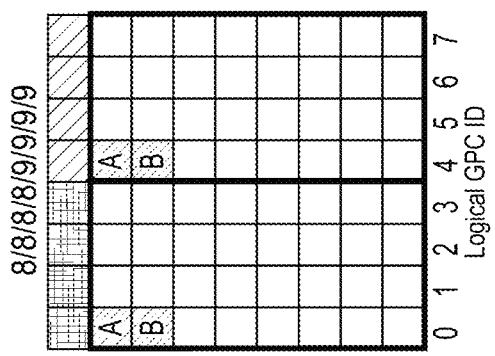

FIGS. 25A, 25B, 25C shows the same three 68-TPC Configurations, but where each is split into two 4-GPC GPU Instances. The TPC per GPC profile in the six 4-GPC GPU Instances are: four 8/8/8/8; one 7/8/8/9; and one 6/8/9/9. Migration must be able to take place any two of these 4-GPC TPC per GPC profiles. When multiple GPU Instances are in use, and migration of the work on a GPU is done, all the GPU Instances are independently migrated, and software running the GPU Instances on a source GPU can be distributed to and resumed on different destination GPU Instances on a destination GPU.

Figure 26:
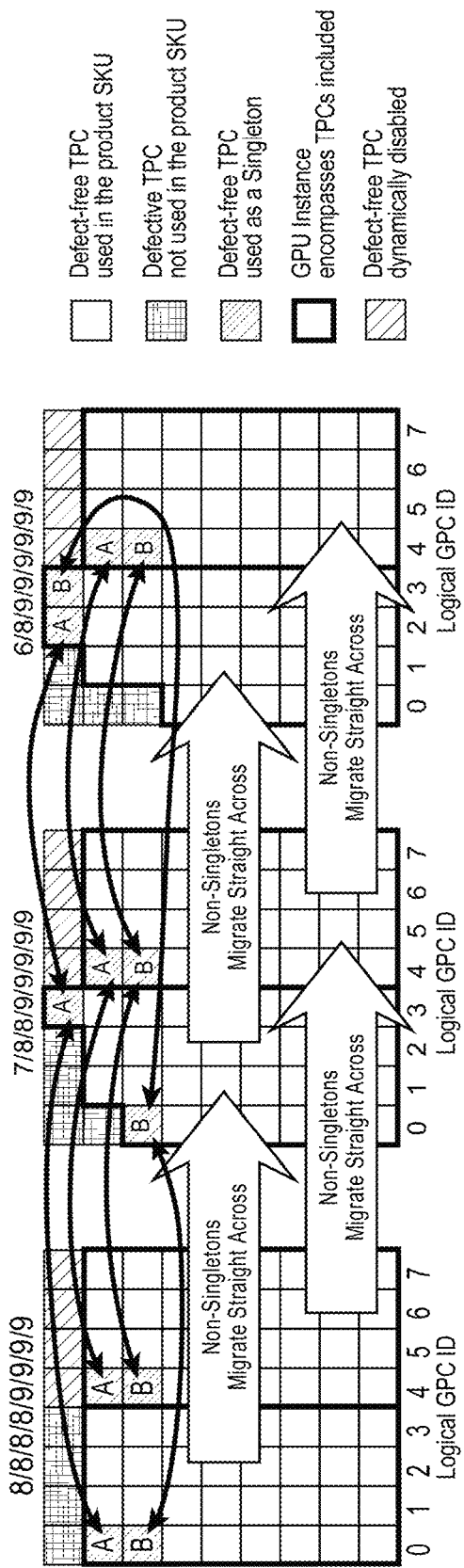
FIG. 26 shows an example multiple-Instanced GPU with migration.
Figure 26A:
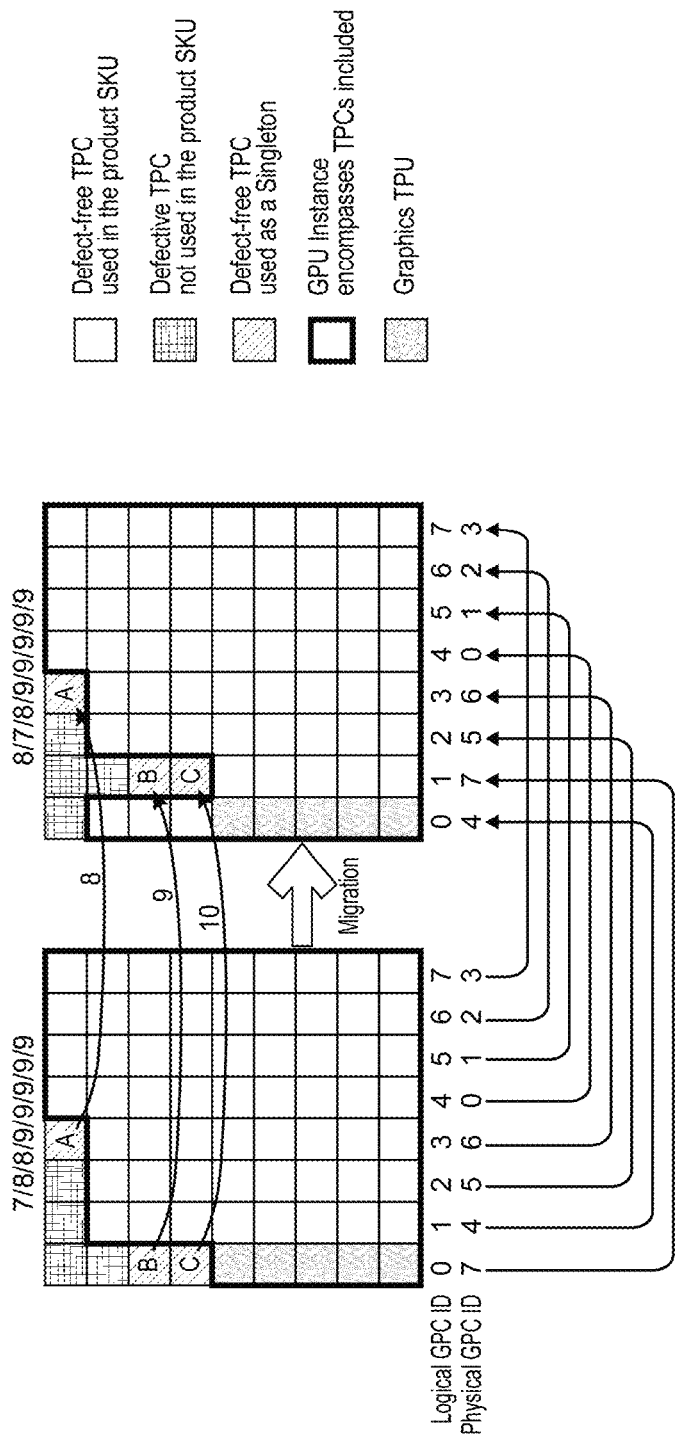
FIGS. 26A-26D show an example flexible migration.

The 4-GPC GPU Instances in FIG. 25 each have two Singletons. And, just as for the full GPU migration case, the GPU Instance cases have the same number of Singletons and non-Singletons at the migration source and destination. FIG. 26 shows some of the choices as to how Singletons and non-Singletons are migrated between the six 4-GPC GPU Instances.

FIGS. 26, 26A-26D show an example flexible migration in one embodiment. In the FIG. 26A migration example, migration matches Virtual GPC IDs and Logical-to-Physical mapping is thus arbitrary. In the example shown here, GPCs are left-to-right in Logical GPC Space and the lower numbers are in Virtual GPC Space. The blocks labelled "Graphics TPU" are the subset of TPCs in this example that support graphics. In one embodiment, the one GPC (GPC0) with graphics capability is given logical GPC 0. This is a modification to the skyline rules described earlier, which said the GPCs were sorted smallest to largest. GPC 0 thus has graphics, and the rest of the GPCs are sorted as before. See discussion below concerning graphics migration.

Figure 26B:
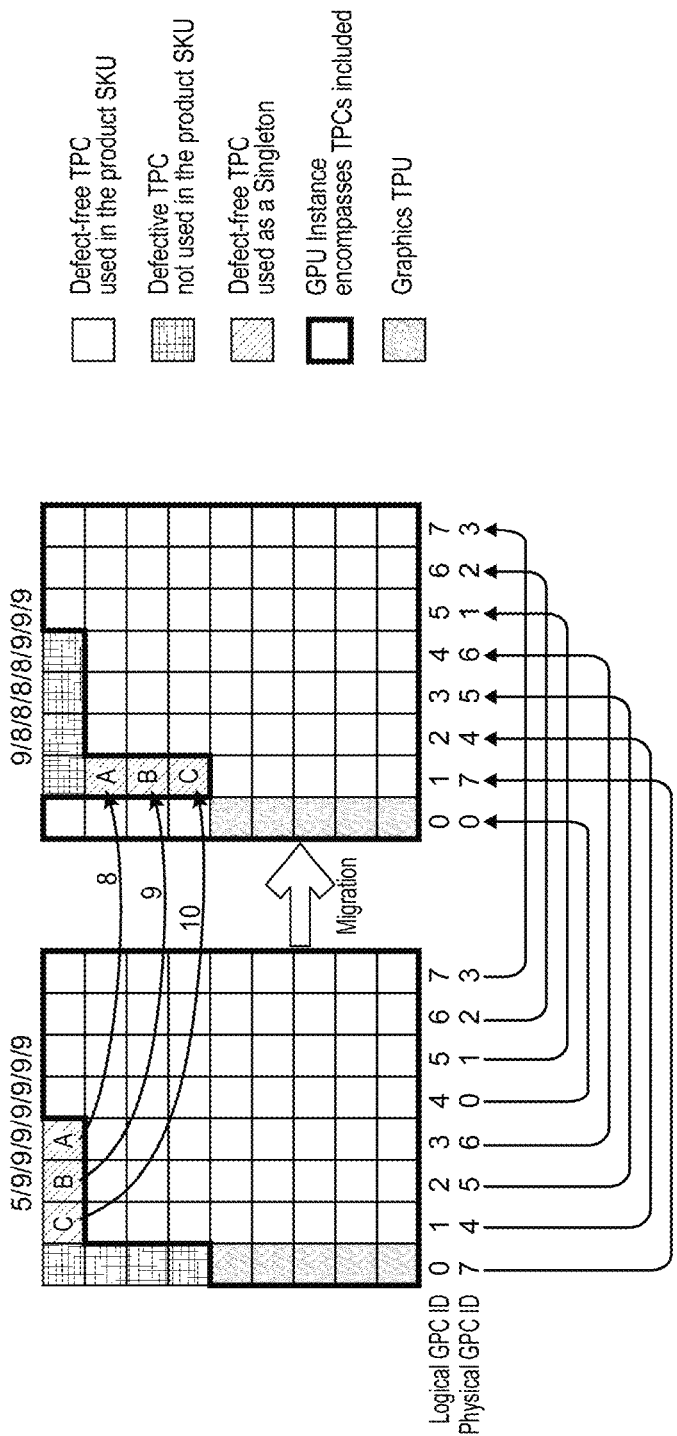

FIG. 26B shows that in a migration, a TPC could move within a Logical GPC ID.

Figure 26C:
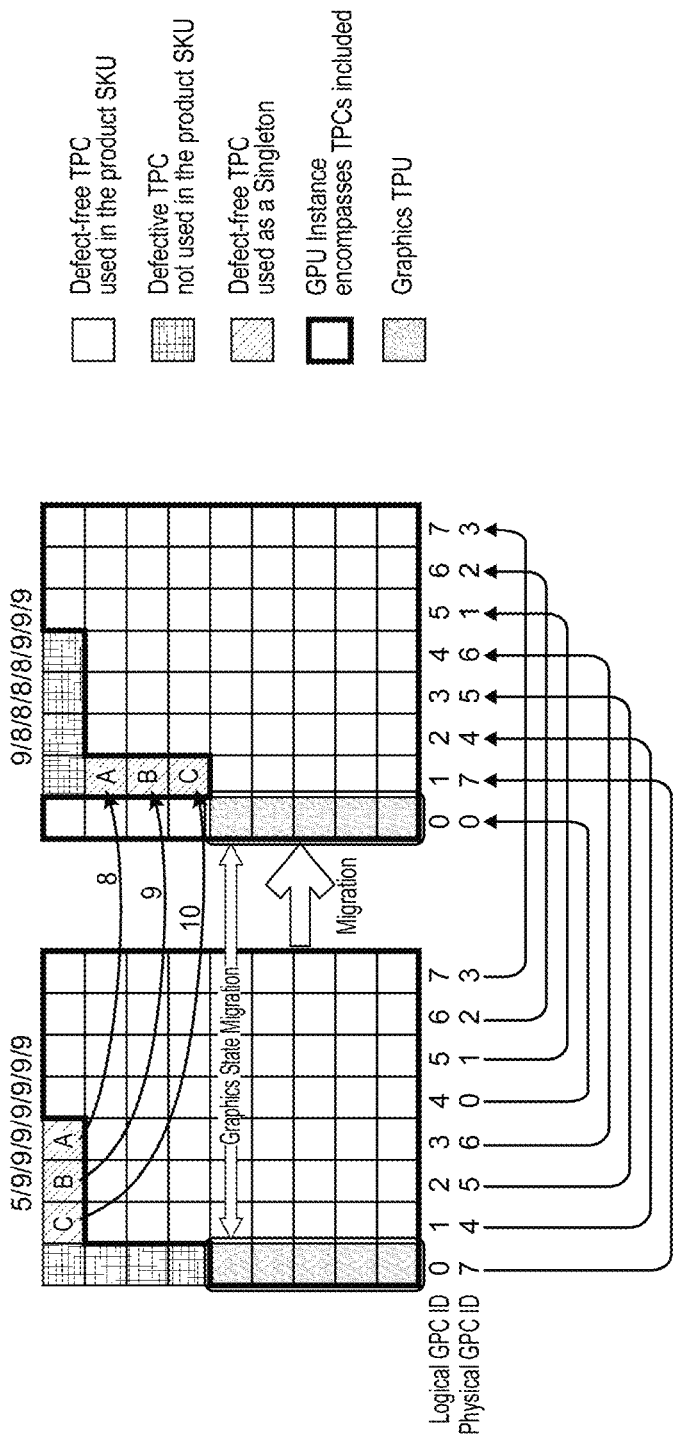
Figure 26D:
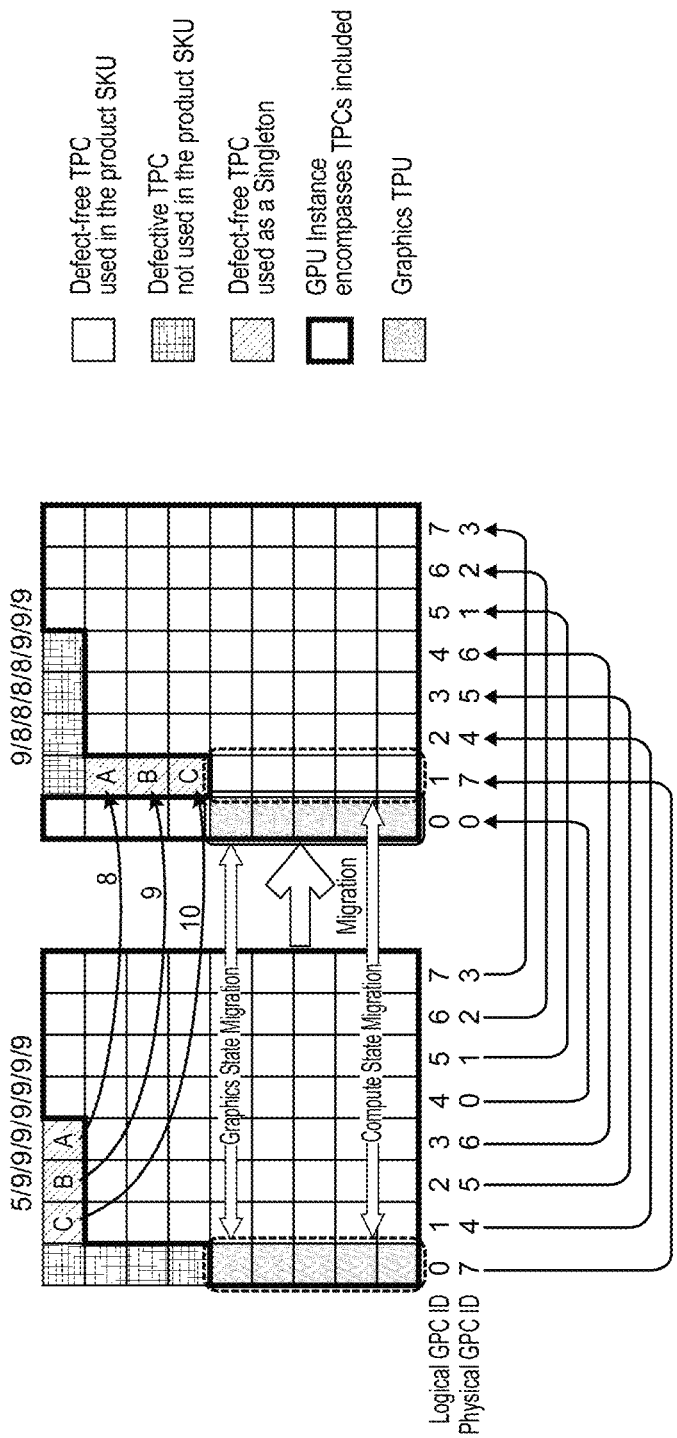

FIGS. 26C & 26D shows that compute state from GPC[0] can go to a different Logical GPC.

Figure 27:
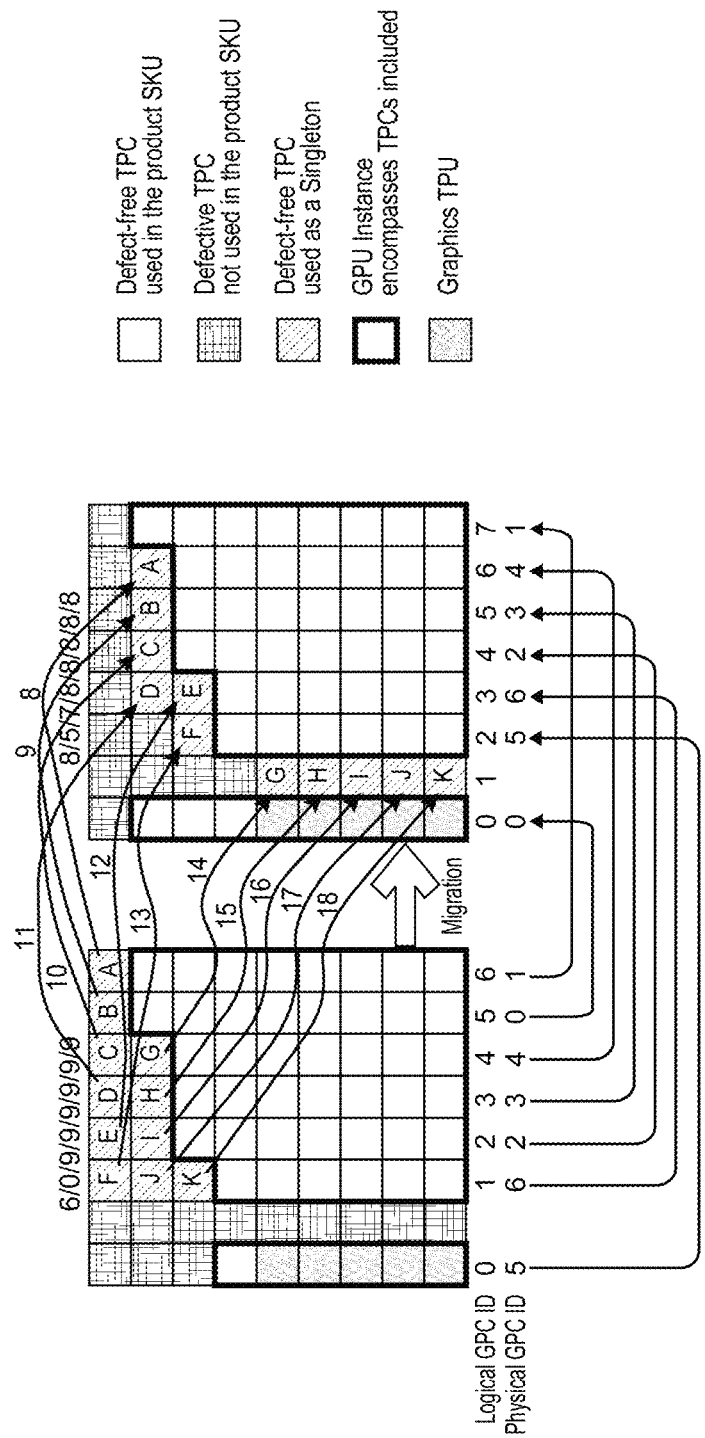
FIG. 27 shows a further example flexible migration.

FIG. 27 shows that some SKUs may floorsweep a whole GPC. In this example, virtual GPC ID 7 is not used in the SKU, even for chips that have 8 GPCs. When migrating from 7 GPCs to 8 GPCs, state for the 8th GPC is generated from the 7-GPC Context Image.

Further Compute Work Distributor Improvements to Support Migration

CWD 420 also includes other innovations, to make DTD, FTM, and FGM function properly and support thus migration. These include a means for determining which TPCs need to be treated as Singletons, and special case hardware to deal with Singletons. Innovative technical differences are:
  TPCs can be dynamically disabled
  Provides more GPU Instances than previous chip architectures
  Provides larger GPU Instances than previous chip architectures
  TPCs together in a GPC on one chip can be migrated to multiple GPCs on another chip
  Previously, TPCs in a GPC were migrated together
  TPCs together in a GPC can be moved to multiple GPCs in the same chip
  TPC State is stored on a per-TPC basis, rather than a per-GPC basis
  TPCs in the same source GPC can be migrated to different destination GPCs
  Allows chips with differing TPC per GPC profiles to be included in the same Product SKU Because migration is required for HPC installations
  Microcode uses pointer to TPC state to allow saved TPC work to be shuffled as necessary
  For FGM, GPC state for otherwise non-existent GPCs is created SM_ID Based TPC Context Save/Restore In the past, the state of TPCs in a GPC was saved in the region of the context buffer associated with that GPC. Moreover this state was indexed using the logical TPC ID of that TPC in that GPC—which no longer works with flexible TPC migration as TPC state might need to move between TPCs in different GPCs with different logical TPC IDs.

The example technology herein moves all TPC state out of the GPC into a separate contiguous region indexed by a unique pre-existing global identifier SM_ID. During CILP (compute preemption), work distributed to TPC with SM_ID 'n' in the source is expected to continue execution on the TPC with the same SM_ID 'n' in the target. By using SM_ID based indexing, TPC state gets restored to the correct TPC in the target regardless of which GPC it is in or which logical TPC ID it has.

GPC State Replication

With the relaxation of floorsweeping rules, we can have scenarios of migration between GPUs with different number of GPCs but same number of total TPCs.

This technology seeks to address this in both directions:
  When migrating from more GPCs to less GPCs, the extra GPC state from the source is automatically skipped for restore as there is no equivalent GPC in the target
  When migrating from less GPCs to more GPCs, the fact that the state of all GPC units is identical at the point of migration is leveraged—the state of any of the GPCs in the source is also restored to the extra GPC in the target.

Special handling of GFX capable TPCs and Compute only TPCs

In one example embodiment, there may be only a subset (e.g., 5) graphics capable TPCs in the entire GPU. All other TPCs are compute only and incapable of handling graphics work. Therefore, when running graphics applications in such example embodiments, during migration, state of the graphics TPCs in the source should be restored only to the graphics TPCs in the target. Note that this calls for an exception to the rule that TPC state should migrate only between TPCs with the same SM_ID—because the TPC with the same SM_ID could be a compute only TPC in the target and hence incompatible with the graphics TPC state being restored. The technology herein seeks to detect when a graphics application is being run and adds special firmware logic to identify the graphics TPCs in the source and target and move state between them. This is an example where a source TPC's state may in some embodiments be split to plural target TPCs' states. Also, any compute only TPC in the target which had the same SM_ID as a graphics capable TPC in the source gets its state restored from any other compute TPC—leveraging the fact that the compute pipeline is expected to be idle at the point of migration when running a graphics application and hence all compute only TPC state is guaranteed to be identical. This technology thus solves the problem of having to migrate between non-identical resources.

GPMPD Barrier Table

GPMPD is a GPC unit which contains compute work tracking information in a structure called the barrier table. See FIG. 28. Such a barrier table can thus be useful for TPC migration. The entries in the barrier table are associated with the TPCs in that GPC. Since the TPCs in a GPC can move to a different GPC during flexible TPC migration, there is a need to be able to isolate the entries of the barrier table on a per-TPC basis. In one embodiment, a solution to the TPC migration problem is to pick gpc_local_cga_ids such that they never change during migration. GPMPD can then index into its barrier table using the vgpc_id and gpc_local_cga_id, both of which never change during GPU migration. Packets received from MPC for things like barrier arrival and cta_completion will contain the gpc_local_cga_id as a new field. GPMPD infers the vgpc_id from the TPC that is the source of the packet (i.e. from the physical TPC interface that received the packet).

Figure 28:
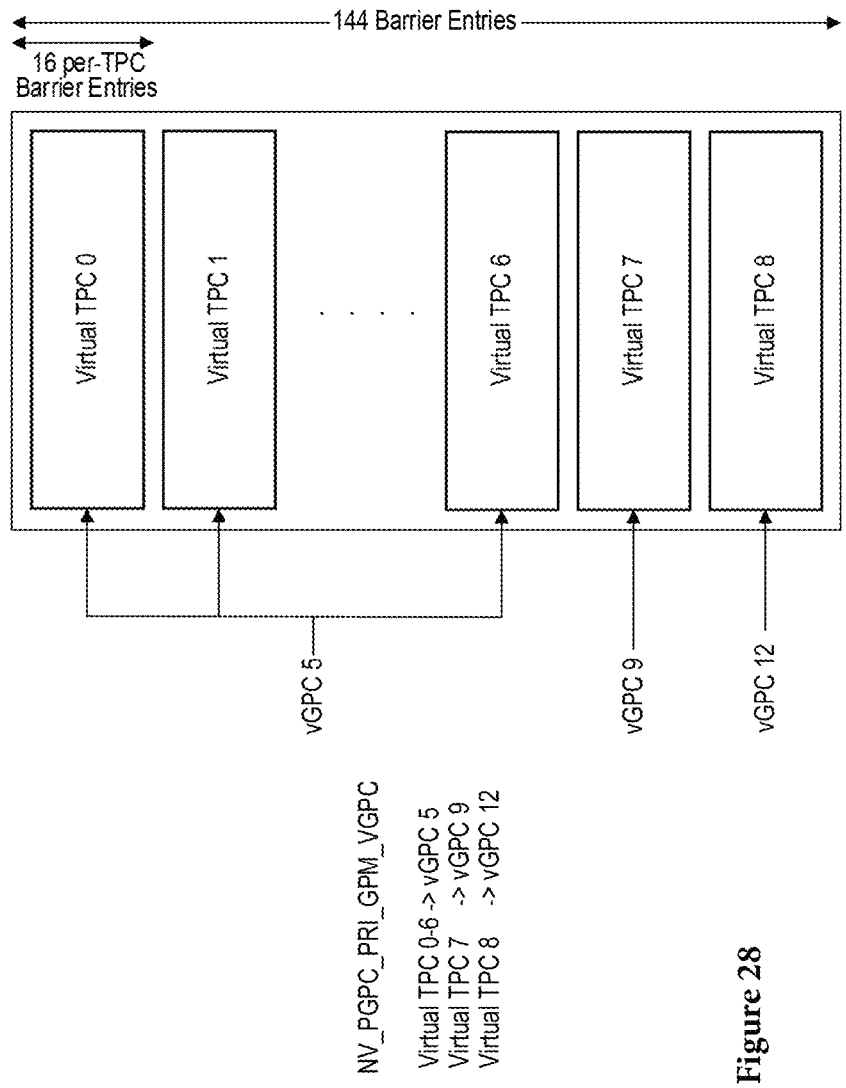
FIG. 28 shows an example barrier table organization.
Figure 29:
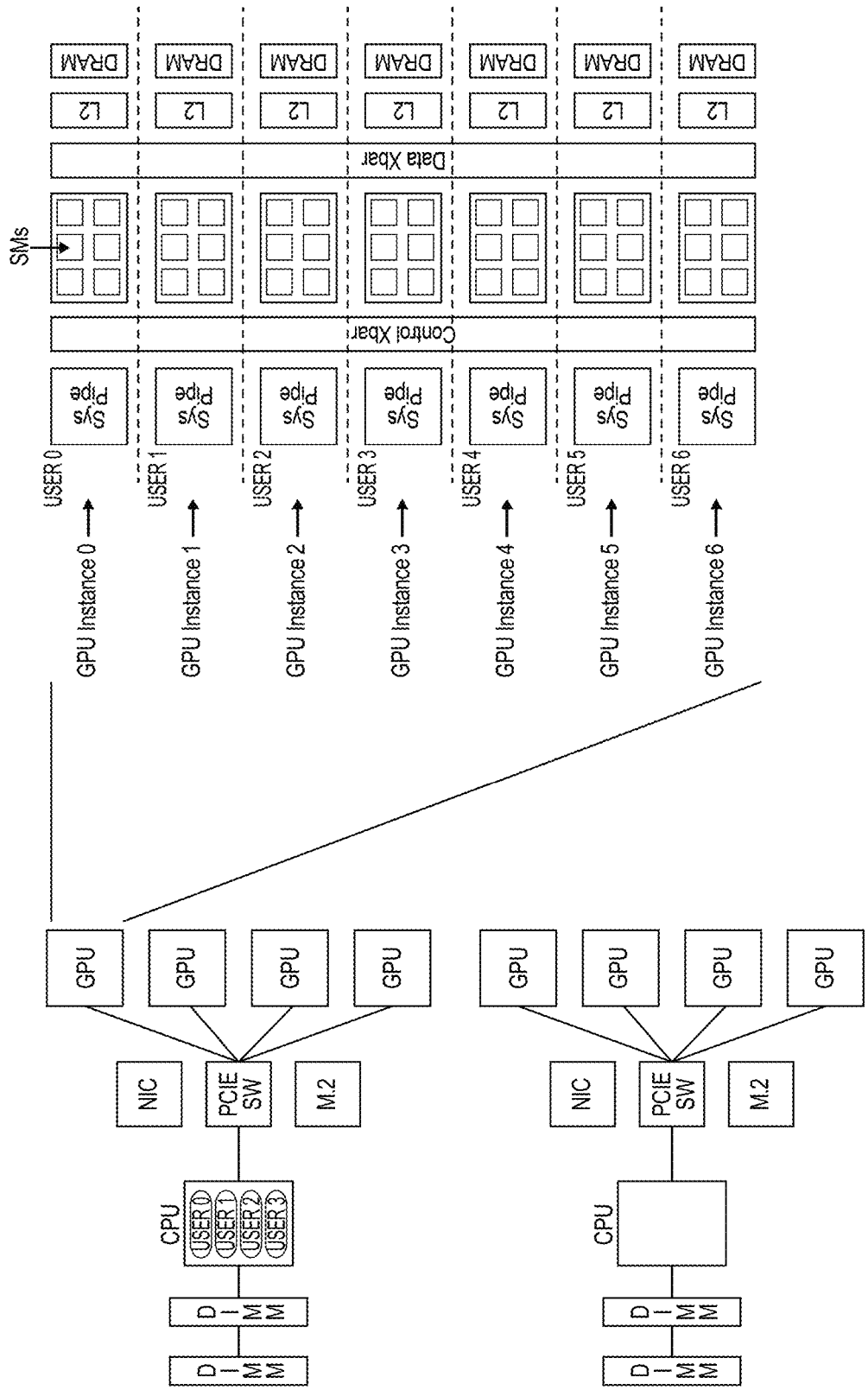
FIG. 29 shows an example multi-instance GPU architecture.

As FIG. 28 shows, the example technology organizes the barrier table into per-TPC chunks which can be saved and restored independent of each other. Again these entries are tagged using the SM_ID for save and restore thus ensuring that when the TPC state moves to a different GPC during migration, the barrier table state also moves to the GPMPD in that GPC. These per-TPC barrier table entries are also tagged using the ramchain subclass described above thus helping isolate them for the purpose of save and restore.

In more detail, the CGA barrier state table in GPM has an increased number of table entries, used as follows:

Half the entries are used by CGAs on TPCs that will never migrate between GPCs; and The other half of the entries are used for logical tables, one for each possible Singleton TPCs (in one embodiment, the barrier table need not be separated into two halves; instead, the entire table may be divided into N TPC chunks and N ramchain subclasses may be used to isolate them for save and restore). These logical tables are individually addressed on the ramchain (expanded to have new classes of state). Table images are also placed in the per-TPC state in the Context Image. For Migration, for the Singleton TPCs, TPC context images are shuffled between GPCs. In one embodiment, microcode performs the shuffling by virtue of using the SM_ID to tag these per TPC barrier table chunks such that the barrier table chunks of the multi-TPC CGAs will be individually saved and restored to the same target GPC. The chunks of the Singleton TPCs will thus be individually saved and restored to the GPC the Singletons are flexibly migrating to.

Additionally, a bit is added to gpc_local_cga_id, to differentiate between Singletons and Non-Singletons. For Singletons, the Virtual GPC ID (which is unique across entire GPU) and a multi-bit barrier ID are included.

Compute Work Throttling to TPCs

In MIG mode, by virtue of the difference in floorsweeping and the GPCs selected to form a simultaneous multiple context ("SMC") engine (see e.g., US20210073035), there can be a difference in the total number of TPCs or the TPC per GPC count across GPUs in a product line. Prior art has sought to resolve this by "soft" floorsweeping where some good TPCs are floorswept using registers in the fuse block thus guaranteeing constant TPC counts across similarly sized SMC engines across all GPUs in a product line. Any changes to "soft" floorsweeping require a full chip reset which is disruptive especially in the MIG use case as a different user on the same GPU will have his work interrupted. Again prior art addressed this by keeping the "soft" TPC floorsweeping unchanged and therefore sub-optimally using the available TPCs in the GPU.

Instead of trying to keep the number of TPCs constant, the technology herein instead aims to keep the number of TPCs used for work constant. Without altering any floorsweeping, technology herein instead programs registers in Compute Work Distributor 420 to only distribute work to a subset of available TPCs. Thus when migrating from higher number of TPCs to lower number of TPCs, the extra TPCs in the source have been programmatically excluded for work distribution and hence have no active state that needs to be restored. Any reprogramming to these registers requires only a local reset and is not disruptive. Moreover this allows maximizing the use of available TPCs in the GPU.

Handling Different Number of TPCs Between Source and Target

The example non-limiting technology provides firmware to handle migration between source and target with different number of TPCs. Migration from more to less is handled by skipping the restore of the extra TPC state in the source as anyway these TPCs were excluded for work. When migrating from less to more, firmware disables the restore of the extra TPCs in the target and they continue to stay in the initialized state. Again these extra TPCs will be programmatically excluded for work distribution in the target. In another embodiment, it is possible to clone the state of an original TPC(s) for application to plural target TPCs when migrating from less TPCs to more TPCs.

Example Improved CWD Circuit Implementation

In an embodiment herein, the CWD 420 comprises registers, combinatorial logic and a hardware state machine. See for example 20200043123 and in particular FIG. 7 of that patent publication and associated description for more information on an example GPU CWD and MPC for scheduling work. Its functionality is expanded/enhanced to provide a shadow state simulated CGA launch capability to confirm that resources are available to launch all CTAs in a CGA. If all CTAs of a CGA cannot be launched at the same time, then the CWD 420 does not launch any of the CTAs of the CGA, but instead waits until sufficient resources of the relevant GPU hardware domain become available so that all CTAs of the CGA can be launched so they run concurrently. In example embodiments, the CWD 420 supports nesting of multiple levels of CGAs (e.g., multiple GPC-CGAs within a GPU-CGA) using a multi-level work distribution architecture to provide CGA launch on associated hardware affinity/domain.

In more detail, CWD 420 shown in FIG. 21A launches the CTAs in a CGA after determining, using a simulation technique, that all CTAs of the CGA can fit on the hardware resources available in the specified hardware domain. In this way, CWD 420 in one example mode makes sure there are enough resources across all GPCs or other relevant hardware domain for all CTAs of the CGA before launching any. In one embodiment, the algorithm to launch CTAs of a CGA can borrow some techniques from legacy (non CGA) grid launch while first confirming that all CTAs of a CGA can be launched in a way that ensures they will run simultaneously.

FIG. 21A shows the basic architecture of CWD 420, which includes a load balancer 422, resource trackers (TRTs) 425(0), 425(1), . . . 425(N−1), a TPC enable table 430, a local memory (LMEM) block index table 432, credit counters 434, a task table 436, and a priority-sorted task table 438. Each of the TRTs 425(0), 425(1), . . . 425(N−1) communicates with a corresponding TPC 340(0), 340(1), . . . 340(N−1). For more detail concerning legacy operation of these structures, see e.g., U.S. Pat. No. 10,817,338; US20200043123; US20150178879; and U.S. Pat. No. 10,217,183. In this example, CWD is enhanced to provide, among other things, new GPC per TPC numbering.

In one embodiment, CWD 420 receives tasks from a CPU 212 that is cooperating with the GPU for various processes executing on the CPU 212. In example embodiments, each compute task to be performed by the GPU may correspond to a CGA (although non-CGA tasks may also be accommodated). Each process or application executing on the CPU 212 can issues such tasks. For example, the CPU 212 can execute one or more programs stored in non-transitory memory such as global memory to generate CGA launch commands that command the GPU to launch CGA grids.

In operation, CPU 212 executes a driver program (see FIG. 21C-2) that generates "grid launch" (and other) commands for the GPU. The grid launch command has associated state parameters that define a grid of CGAs to be executed by the GPU. See for example U.S. Pat. Nos. 7,937,567; 9,513,975; and 9,928,109 for background on how the CPU can launch grids using for example a thread-oriented programming environment such as the CUDA™ programming environment from NVIDIA™. The CPU 212 also arranges for the threads to be executed by the SMs to be stored e.g., in global memory such that direct memory access hardware of the GPU can retrieve the threads through the system's memory management unit (MMU) for the SMs to execute (see FIG. 21A).

Example CGA Launch Command

In example embodiments, a launch command from the CPU 212 to CWD 420 may specify a CGA grid, which includes an enumeration of the various dimensions of the composite thread blocks and CGAs. As one example, a CGA grid launch command could specify to run 10240 CGAs, where each CGA is 8 CTAs, where each CTA has 256 threads, where each thread has (needs) 64 registers, and where each CTA allocates 128 KB of shared memory, etc. These numbers are encoded into a launch command like {10240, 8, 256, 64, 128}, and that is the information which the hardware work distributor CWD 420 processes when launching threads or CTAs on SMs. The CPU 212 sends such launch commands to a scheduler 410 within the GPU (FIG. 21C-2, block 558).

Using the above technique, the application program can launch many small CGAs in a GPC or other hardware partition but the number diminishes as the size of the CGA grows. At a certain point (depending on the hardware platform), no CGA can fit in the GPC or other hardware partition anymore, which may compromise code portability. If one assumes that every platform has at least one GPC with 4 TPCs, the maximum CGA size that guarantees compatibility across future architectures is 8 CTAs. A given application program could dynamically adjust CGA size based on querying the platform to determine the number of CGAs that can run concurrently in the GPU as a function of 1) CTA resource requirements and 2) number of CTAs per CGA.

GPU CGA Scheduling & Launch

Figure 1:
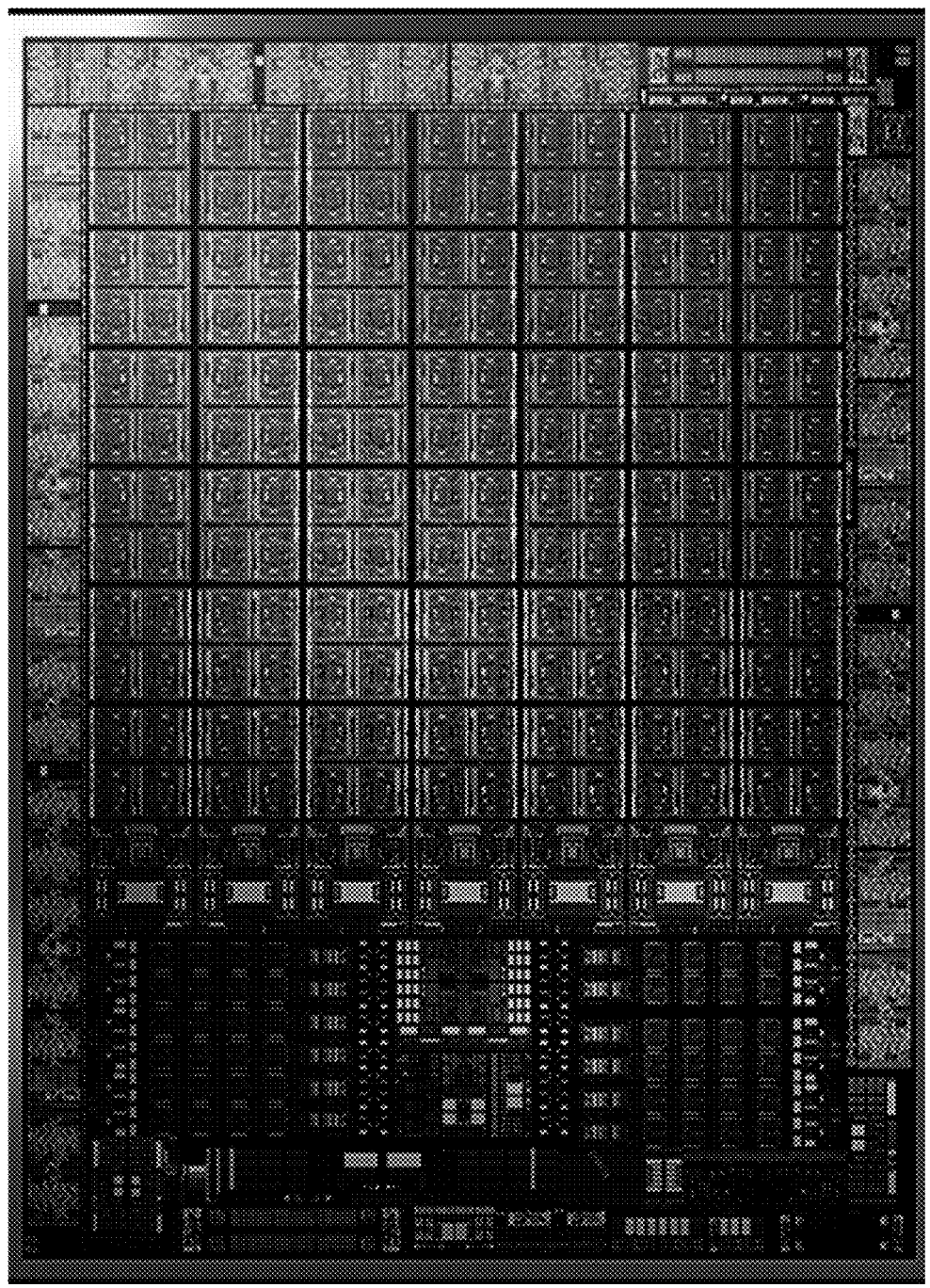
FIG. 1 shows an example GPU chip layout.

In example embodiments, a scheduler 410 within the GPU receives tasks from the CPU 212 and sends them to the CWD 420 (FIG. 21C-1, blocks 502, 504). The CWD 420 queries and launches CTAs from multiple CGAs. In one embodiment, it works on one CGA at a time. For each CGA, CWD 420 simulates launching of all of the CTAs in the CGA, incrementing the "launch" registers to store the simulated launch. If all free slots in SMs or other processors in the hardware domain are exhausted before all CTAs of the CGA are launched in the simulation, the CWD 420 terminates the launch and may try again later. If, in contrast, there are sufficient free slots for all CTAs in the CGA, the CWD 420 generates sm_masks from the "launch" registers accumulated in the simulated launch process (this sm_masks data structure stores reservation information for the number of CTAs to be run on each SM in the relevant hardware domain for the CGA launch), and moves on to a next CGA. The hardware allocates a CGA sequential number and attaches it to each sm_mask. It also attaches an end_of_CGA bit to the last one to prevent interleaving of sm_masks from different CGAs.

Example CGA Launch Packet

Based on a successful simulated launch, CWD 420 sends launch packets such as the following (which specifies a virtual GPC ID) to the GPCs (SMs). Such launch packets may for example include the following fields:

| | |
|---|---|
| cwd2pdb_grid_cga_launch_sm_mask | // launch GPC CGA CTAs |
| task_id | // task identifier |
| vgpc_id | // virtual GPC ID, which may be based on the number of non-floorswept TPCs that exist per GPC |
| sm_mask | // bitmask of SMs; each bit signifies a CTA launch to a corresponding SM; also includes a GPU CGA sequential number as discussed above |
| sm_mask1, sm_mask2, . . . | // further SM bitmask(s) if more than one CTA of the specified CGA is assigned to run on the same SM |
| num_ctas | // # of 1's in sm_mask i.e. CTAs first least significant bit with "1" in sm_mask corresponds to first CTA of GPC CGA and most significant bit with "1" in sm_mask corresponds to last CTA of GPC CGA |
| last_gpu_cga | // last packet of GPU CGA |

Broadcasting the launch packets to all SMs allows all MPCs within SMs to observe the entire sequence of CGA/CTA launches. By observing the stream of CGAs and CTAs, every SM's MPC (to which the grid is currently assigned) is able to carry out rasterization redundantly and independently. Also broadcast are lmem_blk_idx packets which carry lmem_blk_idx (see LMEM block index table 432 of FIG. 21A) from CWD 420 to the SMs.

In one embodiment, during CGA launch, after load balancing, CWD emits CTAs to the tuple <migratable TPC ID, virtual GPC ID>. GPM decodes this tuple and relates it to actual "physical" TPC ID. In one embodiment, a new CWD PRI-NV_PGRAPH_PRI_CWD_VGPC_MTPC_ID is the mapping of SM_ID to <Virtual GPC ID, Migratable TPC ID>, and may be stored in both forward and reverse forms to speed up translation at run time. A new NV_PGRAPH_PRI_CWD_SM_ID_SINGLETON_TPC may provide reverse mapping from <Virtual GPC ID, Migratable TPC ID> to SM_ID for virtual GPC IDs 8-23. In one embodiment, Virtual GPC ID 0~7 can receive legacy CTAs and CGAs whereas Virtual GPC ID 8~23 can receive legacy CTAs and 1-TPC sized CGAs only. Additionally, CWD's unique TPC (represented by <Virtual GPC ID, Migratable TPC ID>) is converted to the tuple <Logical GPC ID, Virtual TPC ID> while sending TPC requests upstream to the front end (FE), as FIG. 23 shows, for communication back to the host CPU.

In one embodiment, when the CWD performs load balancing, the 16 TPCs in virtual GPC 8-23 are prioritized over virtual GPC 0-7. Thus the CSMs corresponding to virtual GPC 8-23 are mapped to WD snapped state indices that are lower than the TPCs in GPC 0-7. Lower indices of the WD snapped state are higher priority, thus single-TPC CGAs will prefer to use GPC 8-23 and preserve GPC 0-7 for multi-TPC CGAs. In other words, the CWD load balancing algorithm will try to assign smaller CGAs to Singletons that can "fit" on those Singletons, and preserve the non-Singleton virtual GPCs for CGAs that require more than one TPC to launch.

Multi-Level Unified Work Distributor

FIG. 21B shows that in one embodiment, the CWD 420 comprises several levels of work distributors (WDs) to distribute CGA work. For example in the case of GPU CGAs made up of GPC CGAs, CWD 420 may implement two levels of work distributors:

a GPU2GPC work distributor 420a a plurality of GPC2SM work distributors 420b(0), 420b(1), 420b(2), . . . .

The GPU2SM Work Distributor (GPU2SM WD) handles CTAs and GPU CGAs made up of CTAs.

The GPU2GPC Work Distributor (GPU2GPC WD) orchestrates the load balancing of GPC CGAs and GPU CGAs made up of GPC CGAs. It talks to the lowest level of work distributor—GPC2SM WD The GPC2SM Work Distributor (GPC2SM WD) handles the actual load balancing for GPC CGAs. There are N GPC2SM WDs in the UWD, one for each virtual GPC in the GPU.

The UWD in one embodiment is thus aware of the GPC per TPC hierarchy in order to facilitate the spatial affinity of CGAs (e.g. all CTAs from a GPC CGA are to be launched on the same GPC).

As mentioned above, at time of GPU chip testing, each individual GPU chip is classified into a particular product SKU and is then floorswept to disable (in this case permanently turn off) faulty circuits. Such floorsweeping involves writing to a floorsweeping configuration circuit within the chip (see FIG. 5B and e.g., US20150200020). In addition, CWD is programmed to configure itself for the particular floorswept Skyline of the chip including the number of Singletons as well as any dynamic TPC disabling that may be in effect.

In one example embodiment, the CWD programming is simplified by providing a register interface such as the following that provides self-configuration in response to a single register poke for dynamic (re)configuration:

| | |
|---|---|
| NV_PGRAPH_PRI_CWD_SINGLETON_CFG_INITIATE | pokes INITIATE, and this auto clears when self-configuration is complete |
| NV_PGRAPH_PRI_CWD_SINGLETON_CFG_MASK | This is a read only field to show which Singleton supporting CSMs are enabled |
| NV_PGRAPH_PRI_CWD_SINGLETON CFG_COUNT | This is a read only field to show the configured count of Singletons |
| NV_PGRAPH_PRI_CWD_NUM_SINGLETON_TPC_COUNT | |
| NV_PGRAPH_PRI_CWD_NUM_MTPC_PER_VGPC | |

The first level 420a distributes GPC CGAs across GPCs. The second level (GPC-to-SM work distributors 420b) distributes CTAs to SMs within the GPCs.

Another level that precedes or is higher than the GPU-to-GPC level may be used to distribute μGPU CGAs to μGPUs (in one embodiment when there is μGPU, a GPU is made up of μGPUs, μGPUs are made up of GPCs, and GPCs are made up of TPCs or SMs). In particular, the GPU2GPC WD 420a distributes the potentially numerous (1 or more) constituent GPC CGAs of a GPU CGA to corresponding GPC2SM work distributors (FIG. 21C-2, block 506). The GPC2SM work distributors 420b each distribute the CTAs of a GPC CGAs to SMs within the GPC (using for example a load balance mode or multi-cast mode, as described below). The unified work distributor (UWD) 420a/420b of FIG. 21B guarantees that all GPC CGAs in a GPU CGA can be launched together and that all CTAs in each GPC CGAs can be launched together.

In other embodiments supporting deeper nesting of CGAs, this UWD can be expanded to any number of levels needed. In more detail, the CWD 420 in one embodiment may include or activate a hierarchical three-level unified work distributor (UWD) for CGA grids that require such functionality:

In some embodiments, to accommodate MIG, CWD is built in two configurations—a full CWD with 8 GPCs plus all 16 Singleton support, and a reduced CWD that has 4 GPCs plus 12 Singleton support.

Other Example Implementations

The above implementations use the concept of "Singleton" TPCs—namely, a TPC that is allocated to its own dedicated virtual GPC. However, in other embodiments, it may be desirable to combine such TPCs into "dualtons". In such a variation, two TPCs are together allocated to each virtual GPC. Dualtons might have some benefit in product SKUs where many TPCs are being floorswept. Dualtons can support larger CGAs (for example, in one embodiment, a dualton would support CTAs within a GPC CGA running concurrently across four SMs rather than two SMs in the case of a virtual GPC based on a Singleton. However, the two TPCs that make up a dualton need to be able to communicate with one another so they support distributed shared memory, messaging between one another, and the like and can thus support a full set of functions that a physical GPC can support. This also implies that there may be some TPCs that could function as Singletons but cannot be paired with another TPC as a dualton, and so would need to be floorswept in a dualton-only implementation. It could also be possible to provide a mixed implementation that supports both dualtons and Singletons to reduce additional necessary floorsweeping, at the cost of additional CWD complexity.

Although the technology herein is particularly useful to classify into a common product SKU, a set of chips that were designed to be identical but turn out to be non-identical due to manufacturing defects, the technology could also be used to provide compatibility between chips designed to have different functions and configurations.

The examples above may refer to a specific chip configuration such as 8 GPCs each including 9 TPCs each including 2 SMs, but such configuration is non-limiting and is presented only by way of example. Different chips may have different numbers of GPC, TPCs and SMs, and/or they may use hardware partitions and processing cores that are named and structured differently from GPCs, TPCs and SMs. Accordingly, the technology herein is not limited such implementation details.

The above-description refers to GPU integrated circuit designators as "product stock keeping units" or "product SKUs." An example of such a product SKU is the ASIC code "XY102-300-A1" found imprinted or stamped on an integrated circuit. In this case, "XY102" may for example refer to series number ("Y") and the schedule of the project for that generation (e.g., "102"). The number "300" part of the product SKU may refer to for example feature set, processing capabilities and/or other technical specifications of the chip. Chips stamped or otherwise labeled or designated with different product SKUs are generally considered by customers to be different technological products. Thus, a chip designated "XY102-225-A1" may have different specifications/processing capabilities as compared to a chip designated "XY102-300-A1". Unless specifically stated otherwise, the technology herein is not limited to what one skilled in the art may term a "product SKU" but may extend for example to any designation or appellation such as model number(s), feature descriptors, references to processing specifications, or other designator(s) in any combination(s) used in conjunction with a chip, its packaging, or product(s) in which it is or will be incorporated, for supply/ordering, warehousing or other purpose(s), that reflect or define expectations in terms of technologic capabilities, functions, feature sets, specifications, compatibilities, or other technologic aspects or characteristics of a chip.

All patents, patent applications and publications cited herein are incorporated by reference for all purposes as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A process for testing integrated circuits comprising:
   determining whether hardware processors of an integrated circuit are defective;
   based on the determining, modifying the integrated circuit to selectively make hardware processors of the integrated circuit inaccessible; and
   based on the determining and the modifying, programming the integrated circuit to designate non-defective hardware processors with virtual identifiers, including classifying, based on the determining, the integrated circuit in accordance with a Skyline representing a population of integrated circuits to be included in a product designator, wherein the Skyline includes (a) a declared quantity of virtual processing clusters, and (b) a declared quantity of processors for each declared virtual processing cluster, wherein different virtual processing clusters declared for the same processor, processing chip or other processing arrangement may have the same or different declared quantities of processors, wherein the Skyline is a representation declaring processing capabilities of the integrated circuit.

2. The process of claim 1 wherein determining comprises testing the integrated circuit for defects.

3. The process of claim 1 wherein modifying includes making functional hardware processors inaccessible based on the classifying.

4. The process of claim 1 wherein the programming includes programming a work distributor within the integrated circuit to provide a façade of virtual identifiers that hides determined defects to thereby present a consistent and uniform work distribution interface across a population of integrated circuits which differ in technological capabilities.

5. The process of claim 1 further including determining a degree of balance of non-defective hardware processors across the integrated circuit and the programming selectively makes hardware processors inaccessible based on the determined degree.

6. The process of claim 5 further including culling the integrated circuit based on the determined degree of balance.

7. A process for testing integrated circuits comprising:
   determining whether hardware processors of an integrated circuit are defective;
   based on the determining, designating non-defective hardware processors that can serve as Singletons;
   classifying, based on the determining, the integrated circuit in accordance with a Skyline representing a population of integrated circuits to be included in a product designator, wherein the Skyline includes (a) a declared quantity of virtual processing clusters, and (b) a declared quantity of processors for each declared virtual processing cluster, wherein different virtual processing clusters declared for the same processor, processing chip or other processing arrangement may have the same or different declared quantities of processors; and
   selectively programming the integrated circuit to use the designated non-defective hardware processors as Singletons or instead for use together with other non-defective hardware processors on the integrated circuit to match processing capabilities across the Skyline representing the population of integrated circuits to be included in the product designator.

8. The process of claim 7 wherein the determining comprises testing the integrated circuit for defects.

9. The process of claim 7 wherein modifying includes making functional hardware processors inaccessible based on the classifying.

10. The process of claim 7 wherein the programming includes programming a work distributor within the integrated circuit to provide a façade of virtual identifiers that hides determined defects to thereby present a consistent and uniform work distribution interface across a population of integrated circuits which differ in technological capabilities.

11. The process of claim 7 wherein the determining further includes determining a degree of balance of non-defective hardware processors across the integrated circuit and the programming makes hardware processors inaccessible based on the determined degree.

12. The process of claim 11 further including culling the integrated circuit based on the determined degree.

* * * * *